US011380019B2

(12) United States Patent
Oh et al.

(10) Patent No.: US 11,380,019 B2
(45) Date of Patent: Jul. 5, 2022

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Sejin Oh, Seoul (KR); Yousun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/064,855

(22) Filed: Oct. 7, 2020

(65) Prior Publication Data

US 2021/0209806 A1 Jul. 8, 2021

Related U.S. Application Data

(60) Provisional application No. 62/911,939, filed on Oct. 7, 2019, provisional application No. 62/959,130, filed on Jan. 9, 2020, provisional application No. 62/990,434, filed on Mar. 16, 2020.

(51) Int. Cl.
*G06T 9/00* (2006.01)

(52) U.S. Cl.
CPC ..................... *G06T 9/00* (2013.01)

(58) Field of Classification Search
CPC ................ G06T 9/00; H04L 65/1006; H04L 65/1069; H04L 65/607; H04L 65/608; H04L 65/80; H04L 67/38; H04N 19/597; H04N 19/70; H04N 21/6437
See application file for complete search history.

(56) References Cited

U.S. PATENT DOCUMENTS

| | | | |
|---|---|---|---|
| 8,731,313 B2 * | 5/2014 | Thiyanaratnam | G06T 9/00 382/240 |
| 11,170,556 B2 * | 11/2021 | Oh | G06T 15/04 |
| 11,200,700 B2 * | 12/2021 | Wang | G06T 9/00 |
| 2018/0091735 A1 * | 3/2018 | Wang | H04N 19/597 |
| 2018/0192001 A1 * | 7/2018 | Boyce | H04N 19/46 |
| 2018/0376126 A1 * | 12/2018 | Hannuksela | H04N 5/23238 |
| 2019/0087979 A1 | 3/2019 | Mammou et al. | |
| 2019/0197739 A1 | 6/2019 | Sinharoy et al. | |

(Continued)

FOREIGN PATENT DOCUMENTS

| | | | | |
|---|---|---|---|---|
| KR | 20190053129 A | * | 5/2019 | H04N 19/503 |
| WO | 2019158821 A1 | | 8/2019 | |
| WO | WO-2019199092 A1 | * | 10/2019 | H04L 67/10 |

OTHER PUBLICATIONS

Ozgur Oyman "SDP and RTP-Based Methods for Streaming of Volumetric Poin", U.S. Appl. No. 62/874,873, filed Jul. 16, 2019, (Year: 2019).*

(Continued)

*Primary Examiner* — Mekonen T Bekele
(74) *Attorney, Agent, or Firm* — Dentons US LLP

(57) ABSTRACT

Disclosed herein is a transmitting method and a receiving method of point cloud data. The transmitting method may include encoding point cloud data, and transmitting a bitstream that includes the point cloud data and signaling information. The receiving method may include receiving a bitstream that includes point cloud data and signaling information, decoding the point cloud data, and rendering the decoded point cloud data.

20 Claims, 63 Drawing Sheets

(56) References Cited

U.S. PATENT DOCUMENTS

| | | | |
|---|---|---|---|
| 2019/0304139 A1* | 10/2019 | Joshi | G06T 17/20 |
| 2019/0373245 A1* | 12/2019 | Lee | H04N 13/194 |
| 2019/0377894 A1* | 12/2019 | Jang | H04L 67/38 |
| 2020/0045285 A1* | 2/2020 | Varerkar | H04N 19/29 |
| 2020/0120360 A1* | 4/2020 | Rassool | H04N 21/816 |
| 2020/0154121 A1* | 5/2020 | Boyce | H04N 21/4402 |
| 2020/0226792 A1* | 7/2020 | Wang | G06T 9/00 |
| 2020/0366962 A1* | 11/2020 | Lim | H04N 21/44008 |
| 2020/0382764 A1* | 12/2020 | Oyman | H04N 13/282 |
| 2021/0021664 A1* | 1/2021 | Oyman | H04L 65/1006 |

OTHER PUBLICATIONS

Eurico Manuel Rodrigues Lopes, "Adaptive Plane Projection for Video-based Point Cloud Coding," Electrical and Computer Engineering, Nov. 2018, (115 pages).

* cited by examiner

FIG. 2
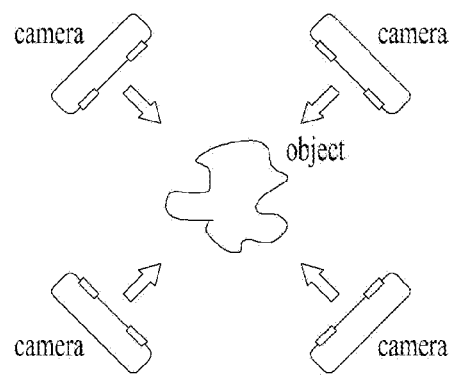
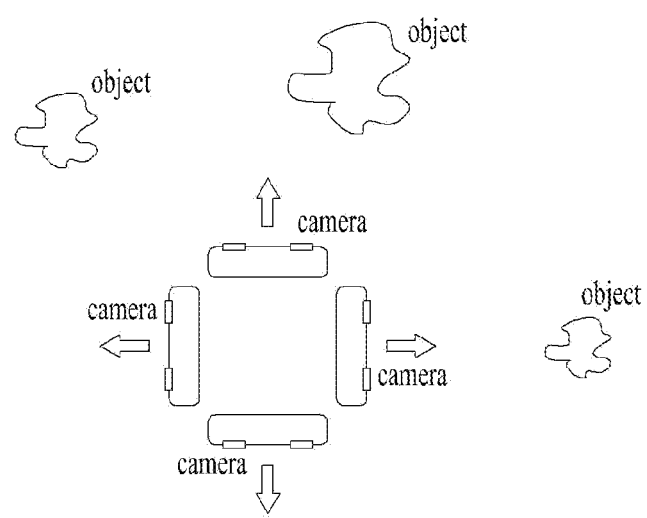

FIG. 3
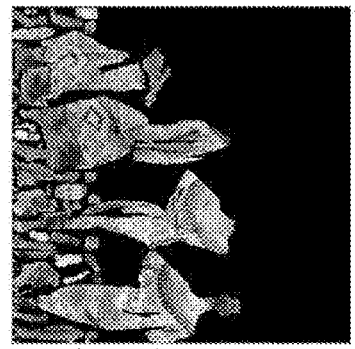
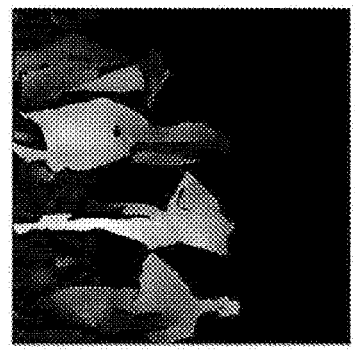
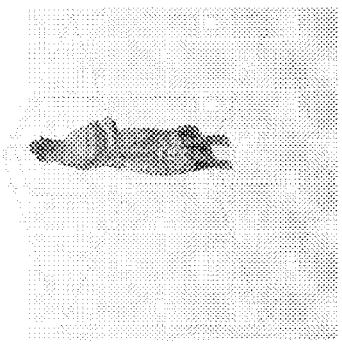

FIG. 26

| Value | Data type |
|---|---|
| 0 | reserved for ISO use |
| 1 | V-PCC track |
| 2 | geometry video track |
| 3 | attribute video track |
| 4 | occupancy video track |
| 5~15 | reserved for ISO use |

FIG. 27

| attribute_type | Attribute type |
|---|---|
| 0 | Texture |
| 1 | Material ID |
| 2 | Transparency |
| 3 | Reflectance |
| 4 | Normals |
| 5...14 | Reserved |
| 15 | Unspecified |

FIG. 28

| profile_tier_level( ) { | Descriptor |
|---|---|
|    ptl_tier_flag | u(1) |
|    ptl_profile_idc | u(7) |
|    ptl_level_idc | u(8) |
| } | |

FIG. 29

| Value | Data type |
|---|---|
| 0 | reserved for ISO use |
| 1 | V-PCC track |
| 2 | geometry video track |
| 3 | attribute video track |
| 4 | occupancy video track |
| 5~15 | reserved for ISO use |

FIG. 30

| attribute_type | Attribute type |
|---|---|
| 0 | Texture |
| 1 | Material ID |
| 2 | Transparency |
| 3 | Reflectance |
| 4 | Normals |
| 5...14 | Reserved |
| 15 | Unspecified |

FIG. 31

| attribute_type | Attribute type |
|---|---|
| 0 | Texture |
| 1 | Material ID |
| 2 | Transparency |
| 3 | Reflectance |
| 4 | Normals |
| 5...14 | Reserved |
| 15 | Unspecified |

FIG. 33

| vpcc_unit( numBytesInVPCCUnit) { | Descriptor |
|---|---|
|     vpcc_unit_header( ) | |
|     vpcc_unit_payload( ) | |
|     while( more_data_in_vpcc_unit ) | |
|         trailing_zero_8bits /* equal to 0x00 */ | f(8) |
| } | |

FIG. 34

| vpcc_unit_header( ) { | Descriptor |
|---|---|
| vpcc_unit_type | u(5) |
| if( vpcc_unit_type == VPCC_AVD \|\| vpcc_unit_type == VPCC_GVD \|\| | |
|     vpcc_unit_type == VPCC_OVD \|\| vpcc_unit_type == VPCC_PDG ) | |
|     vpcc_sequence_parameter_set_id | u(4) |
| if( vpcc_unit_type == VPCC_AVD ) { | |
|     vpcc_attribute_index | u(7) |
|     vpcc_attribute_dimension_index | u(7) |
|     if( sps_multiple_layer_streams_present_flag ) { | |
|         vpcc_layer_index | u(4) |
|         pcm_separate_video_data( 11 ) | |
|     } | |
|     else | |
|         pcm_separate_video_data( 15 ) | |
| } else if( vpcc_unit_type == VPCC_GVD ) { | |
|     if( sps_multiple_layer_streams_present_flag ) { | |
|         vpcc_layer_index | u(4) |
|         pcm_separate_video_data( 18 ) | |
|     } | |
|     else | |
|         pcm_separate_video_data( 22 ) | |
| }else if( vpcc_unit_type == VPCC_OVD    vpcc_unit_type == VPCC_PDG ) | |
| { | |
|     vpcc_reserved_zero_23bits | u(23) |
| } else | |
|     vpcc_reserved_zero_27bits | u(27) |
| } | |

FIG. 35

| vpcc_unit_type | Identifier | V-PCC Unit Type | Description |
|---|---|---|---|
| 0 | VPCC_SPS | Sequence parameter set | Sequence level parameters |
| 1 | VPCC_PDG | Patch Data Group | Patch group information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5...31 | VPCC_RSVD | Reserved | - |

FIG. 36

| pcm_separate_video_data(bitCount) { | Descriptor |
|---|---|
|     if( sps_pcm_separate_video_present_flag && !vpcc_layer_index ) { | |
|         vpcc_pcm_video_flag | u(1) |
|         vpcc_reserved_zero_bitcount_bits<br>    } | u(bitCount) |
|     else | |
|         vpcc_reserved_zero_bitcountplus1_bits | u(bitCount + 1) |
| } | |

FIG. 37

| vpcc_unit_payload( ) { | Descriptor |
|---|---|
|     if( vpcc_unit_type == VPCC_SPS ) | |
|         sequence_parameter_set( ) | |
|     else if( vpcc_unit_type == VPCC_PDG ) | |
|         patch_data_group( ) | |
|     else if( vpcc_unit_type == VPCC_OVD \|\| vpcc_unit_type == VPCC_GVD \|\| vpcc_unit_type == VPCC_AVD) | |
|         video_data_unit( ) | |
| } | |

FIG. 38

| sequence_parameter_set( ) { | Descriptor |
|---|---|
| profile_tier_level() | |
| sps_sequence_parameter_set_id | u(4) |
| sps_frame_width | u(16) |
| sps_frame_height | u(16) |
| sps_avg_frame_rate_present_flag | u(1) |
| if( sps_avg_frame_rate_present_flag ) | |
| sps_avg_frame_rate | u(16) |
| sps_enhanced_occupancy_map_for_depth_flag | u(1) |
| sps_geometry_attribute_different_layer_flag | u(4) |
| if(sps_geometry_attribute_different_layer_flag ) | |
| sps_layer_count_geometry_minus1 | u(4) |
| else | |
| sps_layer_count_minus1 | u(4) |
| if( sps_layer_count_minus1 > 0 ) | |
| sps_multiple_layer_streams_present_flag | u(1) |
| sps_layer_absolute_coding_enabled_flag[ 0 ] = 1 | |
| for( i = 0; i < sps_layer_count_minus1 ; i++ ) { | |
| sps_layer_absolute_coding_enabled_flag[ i + 1 ] | u(1) |
| if( sps_layer_absolute_coding_enabled_flag[ i + 1 ] == 0 ) { | |
| if( i > 0 ) | |
| sps_layer_predictor_index_diff[ i + 1 ] | ue(v) |
| else | |
| sps_layer_predictor_index_diff[ i + 1 ] = 0 | |
| } | |
| } | |
| sps_pcm_patch_enabled_flag | u(1) |
| if( sps_pcm_patch_enabled_flag ) | |
| sps_pcm_separate_video_present_flag | u(1) |
| occupancy_parameter_set( ) | |
| geometry_parameter_set( ) | |
| sps_attribute_count | u(16) |
| for( i = 0; i < sps_attribute_count; i++ ) | |
| { | |
| if(sps_geometry_attribute_different_layer_flag ) | |
| sps_layer_count_attribute_minus1[i] | u(4) |
| attribute_parameter_set( i ) | |
| } | |
| sps_patch_sequence_orientation_enabled_flag | u(1) |
| sps_patch_inter_prediction_enabled_flag | u(1) |
| sps_pixel_deinterleaving_flag | u(1) |
| sps_point_local_reconstruction_enabled_flag | u(1) |
| sps_remove_duplicate_point_enabled_flag | u(1) |
| byte_alignment( ) | |
| } | |

FIG. 39

| patch_data_group( ) { | Descriptor |
|---|---|
|    do { | |
|       pdg_unit_type | ue(v) |
|       patch_data_group_unit_payload( pdg_unit_type ) | |
|       pdg_terminate_patch_data_group_flag | u(1) |
|    } while( !pdg_terminate_patch_data_group_flag ) | |
|    byte_alignment( ) | |
| } | |

FIG. 40

| pdg_unit_type | Identifier | Patch Data Group Unit Type | Description |
|---|---|---|---|
| 0 | PDG_PSPS | Patch sequence parameter set | Sequence level parameters |
| 1 | PDG_PFPS | Patch frame parameter set | Frame level parameters |
| 2 | PDG_PFGPS | Patch frame geometry parameter set | Frame level geometry type parameters |
| 3 | PDG_PFAPS | Patch frame attribute parameter set | Frame level attribute type parameters |
| 4 | PDG_GPPS | Geometry patch parameter set | Patch level geometry type parameters |
| 5 | PDG_APPS | Attribute patch parameter set | Patch level attribute type parameters |
| 6 | PDG_PTGLU | Patch tile group layer unit | Patch tile group layer unit |
| 7 | PDG_PREFIX_SEI | Prefix SEI message | Prefix SEI message |
| 8 | PDG_SUFFIX_SEI | Suffix SEI message | Suffix SEI message |
| 9...31 | PDG_RSVD | Reserved | - |

FIG. 41

| patch_data_group_unit_payload(pdg_unit_type) { | Descriptor |
|---|---|
|    if(pdg_unit_type == PDG_PSPS ) { | |
|       patch_sequence_parameter_set( ) | |
|    else if(pdg_unit_type == PDG_GPPS ) { | |
|       geometry_patch_parameter_set( ) | |
|    } else if(pdg_unit_type == PDG_APPS ) { | |
|       attribute_patch_parameter_set( ) | |
|    } else if(pdg_unit_type == PDG_PFPS ) { | |
|       patch_frame_parameter_set( ) | |
|    } else if(pdg_unit_type == PDG_PFAPS ) { | |
|       patch_frame_attribute_parameter_set( ) | |
|    } else if(pdg_unit_type == PDG_PFGPS ) { | |
|       patch_frame_geometry_parameter_set( ) | |
|    } else if(pdg_unit_type == PDG_PTGLU ) { | |
|       patch_tile_group_layer_unit( ) | |
|    } else if(pdg_unit_type == PDG_PREFIX_SEI ) { | |
|       sei_message( ) | |
|    } else if(pdg_unit_type == PDG_SUFFIX_SEI ) { | |
|       sei_message( ) | |
|    } | |
| } | |

FIG. 42

| sei_message( ) { | Descriptor |
|---|---|
|     payloadType = 0 | |
|     do { | |
|         sm_payload_type_byte | u(8) |
|         payloadType += sm_payload_type_byte | |
|     } while( sm_payload_type_byte == 0xFF ) | |
|     payloadSize = 0 | |
|     do { | |
|         sm_payload_size_byte | u(8) |
|         payloadSize += sm_payload_size_byte | |
|     } while( sm_payload_size_byte == 0xFF ) | |
|     sei_payload( payloadType, payloadSize ) | |
| } | |

FIG. 45

| sample_stream_vpcc_header ( ) { | Descriptor |
|---|---|
| ssvh_unit_size_precision_bytes_minus1 | u(3) |
| ssvh_reserved_zero_5bits | u(5) |
| } | |

FIG. 46

| sample_stream_vpcc_unit( ) { | Descriptor |
|---|---|
|     ssvu_vpcc_unit_size | u(v) |
|     vpcc_unit( ssvu_vpcc_unit_size ) | |
| } | |

FIG. 47

| vpcc_unit( numBytesInVPCCUnit) { | Descriptor |
|---|---|
|    vpcc_unit_header( ) | |
|    vpcc_unit_payload( ) | |
|    while( more_data_in_vpcc_unit ) | |
|       trailing_zero_8bits /* equal to 0x00 */ | u(8) |
| } | |

FIG. 48

| vpcc_unit_header( ) { | Descriptor |
|---|---|
| vuh_unit_type | u(5) |
| if( vuh_unit_type = = VPCC_AVD || vuh_unit_type = = VPCC_GVD || | |
| ( vuh_unit_type = = VPCC_AVD || vuh_unit_type = = VPCC_AD ) { | |
| vuh_vpcc_parameter_set_id | u(4) |
| vuh_atlas_id | u(6) |
| } | |
| if( vuh_unit_type = = VPCC_AVD ) { | |
| vuh_attribute_index | u(7) |
| vuh_attribute_dimension_index | u(5) |
| vuh_map_index | u(4) |
| vuh_raw_video_flag | u(1) |
| } else if( vuh_unit_type = = VPCC_GVD ) { | |
| vuh_map_index | u(4) |
| vuh_raw_video_flag | u(1) |
| vuh_reserved_zero_12bits | u(12) |
| } else if( vuh_unit_type = = VPCC_OVD || vuh_unit_type = = VPCC_AD ) | |
| vuh_reserved_zero_17bits | i(17) |
| else | |
| vuh_reserved_zero_27bits | i(27) |
| } | |

FIG. 49

| vuh_unit_type | Identifier | V-PCC Unit Type | Description |
|---|---|---|---|
| 0 | V-PCC_VPS | V-PCC parameter set | V-PCC level parameters |
| 1 | V-PCC_AD | Atlas data | Atlas information |
| 2 | V-PCC_OVD | Occupancy Video Data | Occupancy information |
| 3 | V-PCC_GVD | Geometry Video Data | Geometry information |
| 4 | V-PCC_AVD | attribute Video Data | Attribute information |
| 5...31 | V-PCC_RSVD | Reserved | - |

FIG. 50

| vpcc_unit_payload( ) { | Descriptor |
|---|---|
|     if( vuh_unit_type = = VPCC_VPS ) | |
|         vpcc_parameter_set( ) | |
|     else if( vuh_unit_type = = VPCC_AD ) | |
|         atlas_sub_bitstream( ) | |
|     else if( vuh_unit_type = = VPCC_OVD \|\| <br>         vuh_unit_type = = VPCC_GVD \|\| <br>         vuh_unit_type = = VPCC_AVD ) | |
|         video_sub_bitstream( ) | |
| } | |

FIG. 52

| sample_stream_nal_header( ) { | Descriptor |
|---|---|
| ssnh_unit_size_precision_bytes_minus1 | u(3) |
| ssnh_reserved_zero_5bits | u(5) |
| } | |

FIG. 53

| sample_stream_nal_unit( ) { | Descriptor |
|---|---|
| ssnu_nal_unit_size | u(v) |
| nal_unit( ssnu_nal_unit_size ) | |
| } | |

FIG. 54

```
sei_payload( payloadType, payloadSize ) {
    if( psd_unit_type = = PSD_PREFIX_SEI ) {
        if( payloadType = = 0 )
            buffering_period( payloadSize )
        else if( payloadType = = 1 )
            pic_timing( payloadSize )
        else if( payloadType = = 2 )
            filler_payload( payloadSize )
        else if( payloadType = = 10 )
            sei_prefix_indication( payloadSize )
        else if( payloadType = = 13 )
            3d_region_mapping( payloadSize )
        else
            reserved_sei_message( payloadSize )
    }
    else { /* psd_unit_type = = PSD_SUFFIX_SEI */
        if( payloadType = = 2 )
            filler_payload( payloadSize )
        else if( payloadType = = 3 )
            user_data_registered_itu_t_t35( payloadSize )
        else if( payloadType = = 4 )
            user_data_unregistered( payloadSize )
        else if( payloadType = = 11 )
            decoded_pcc_hash( payloadSize )
        else
            reserved_sei_message( payloadSize )
    }
    if( more_data_in_payload( ) ) {
        if( payload_extension_present( ) )
            sp_reserved_payload_extension_data
        byte_alignment( )
    }
}
```

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application claims the benefit of U.S. provisional application No. 62/911,939, filed on Oct. 7, 2019, 62/959,130, filed on Jan. 9, 2020 and 62/990,434, filed on Mar. 16, 2020 which is hereby incorporated by reference in its entirety.

BACKGROUND OF THE INVENTION

Field of the Invention

Embodiments provide a method for providing point cloud contents to provide a user with various services such as virtual reality (VR), augmented reality (AR), mixed reality (MR), and autonomous driving services.

Discussion of the Related Art

A point cloud is a set of points in a three-dimensional (3D) space. It is difficult to generate point cloud data because the number of points in the 3D space is large.

A large throughput is required to transmit and receive data of a point cloud.

SUMMARY OF THE INVENTION

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for providing optimized point cloud content to a user by signaling viewport related information of the point cloud data.

Another object of the present disclosure is to provide a point cloud data transmission device, a point cloud data transmission method, a point cloud data reception device, and a point cloud data reception method for providing optimized point cloud content to a user by allowing viewport information, recommended viewport information, and initial viewing orientation (i.e., viewpoint) for data processing and rendering in a V-PCC bitstream to be transmitted in a bitstream.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of transmitting point cloud data may include encoding point cloud data and transmitting a bitstream that includes the point cloud data and signaling information.

According to embodiments, the point cloud data may include geometry data, attribute data, and occupancy map data, which are encoded by a video based point cloud compression (V-PCC) scheme.

According to embodiments, the signaling information may include viewport-related information for a viewport that is determined according to a position and an orientation of a camera or a user.

According to embodiments, the viewport-related information may include at least one of coordinate information in a 3 dimension (3D) space of the camera or the user, direction vector information for indicating a direction at which the camera or the user is looking, up vector information for indicating a upward direction of the camera or the user, and right vector information for indicating a rightward direction of the camera or the user.

According to embodiments, the viewport-related information may include horizontal field of view (FOV) information and vertical FOV information for generating the viewport.

According to embodiments, a point cloud data transmission apparatus may include an encoder for encoding point cloud data and a transmitter for transmitting a bitstream that includes the point cloud data and signaling information.

According to embodiments, the point cloud data may include geometry data, attribute data, and occupancy map data, which are encoded by a video based point cloud compression (V-PCC) scheme.

According to embodiments, the signaling information may include viewport-related information for a viewport that is determined according to a position and an orientation of a camera or a user.

According to embodiments, the viewport-related information may include at least one of coordinate information in a 3 dimension (3D) space of the camera or the user, direction vector information for indicating a direction at which the camera or the user is looking, up vector information for indicating a upward direction of the camera or the user, and right vector information for indicating a rightward direction of the camera or the user.

According to embodiments, the viewport-related information may include horizontal field of view (FOV) information and vertical FOV information for generating the viewport.

According to embodiments, a point cloud data reception method may include receiving a bitstream that includes point cloud data and signaling information, decoding the point cloud data, and rendering the decoded point cloud data.

According to embodiments, the signaling information may include viewport-related information for a viewport that is determined according to a position and an orientation of a camera or a user.

According to embodiments, the viewport-related information may include at least one of coordinate information in a 3 dimension (3D) space of the camera or the user, direction vector information for indicating a direction at which the camera or the user is looking, up vector information for indicating a upward direction of the camera or the user, and right vector information for indicating a rightward direction of the camera or the user.

According to embodiments, the viewport-related information may include horizontal field of view (FOV) information and vertical FOV information for generating the viewport.

According to embodiments, the decoded point cloud data may be rendered based on the viewport-related information.

According to embodiments, a point cloud data reception apparatus may include a receiver for receiving a bitstream that includes point cloud data and signaling information, a decoder for decoding the point cloud data, and a renderer for rendering the decoded point cloud data.

According to embodiments, the signaling information may include viewport-related information for a viewport that is determined according to a position and an orientation of a camera or a user.

According to embodiments, the viewport-related information may include at least one of coordinate information in a 3 dimension (3D) space of the camera or the user, direction vector information for indicating a direction at which the camera or the user is looking, up vector information for indicating a upward direction of the camera or the user, and right vector information for indicating a rightward direction of the camera or the user.

According to embodiments, the viewport-related information may include horizontal field of view (FOV) information and vertical FOV information for generating the viewport.

According to embodiments, the decoded point cloud data may be rendered based on the viewport-related information.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data according to embodiments;

FIG. 3 illustrates an exemplary point cloud, geometry, and texture image according to embodiments;

FIG. 26 is a table showing an example of track types of PCC data assigned to a data_type according to embodiments;

FIG. 27 is a table showing an example of attribute types assigned to an attribute_type according to embodiments;

FIG. 28 shows an example of a syntax structure of profile_tier_level( ) according to embodiments;

FIG. 29 is a table showing an example of types of PCC data in a referenced track according to embodiments;

FIG. 30 is a table showing an example of attribute types according to embodiments;

FIG. 31 is a table showing an example of attribute types according to embodiments;

FIG. 33 shows an example of a syntax structure of each V-PCC unit according to embodiments;

FIG. 34 shows an example of a syntax structure of a V-PCC unit header according to embodiments;

FIG. 35 shows an example of types of V-PCC units assigned to a vpcc_unit_type field according to embodiments;

FIG. 36 shows an example of a syntax structure of pcm_separate_video_data( ) included in a V-PCC unit header according to embodiments;

FIG. 37 shows an example of a syntax structure of a V-PCC unit payload according to embodiments;

FIG. 38 shows an example of a syntax structure of sequence_parameter_set( ) contained in a V-PCC unit payload according to embodiments;

FIG. 39 shows an example of a syntax structure of a patch data group according to embodiments;

FIG. 40 is a table showing an example of types of a patch data group assigned to a pdg_unit_type field of a patch data group according to embodiments;

FIG. 41 shows an example of a syntax structure of a patch data group unit payload according to embodiments;

FIG. 42 shows an example of a syntax structure of a supplemental enhancement information (SEI) message (sei_message( ) according to embodiments;

FIG. 45 shows an example of a syntax structure of a sample stream V-PCC header contained in a V-PCC bitstream according to embodiments;

FIG. 46 shows an example of a syntax structure of a sample stream V-PCC unit according to embodiments;

FIG. 47 shows an example of a syntax structure of a V-PCC unit according to embodiments;

FIG. 48 shows an example of a syntax structure of a V-PCC unit header according to embodiments;

FIG. 49 shows an example of V-PCC unit types assigned to a vuh_unit_type field according to embodiments;

FIG. 50 shows an example of a syntax structure of a V-PCC unit payload (vpcc_unit_payload( ) according to embodiments;

FIG. 52 shows an example of a syntax structure of a sample stream NAL header (sample_stream_nal_header( )) contained in an atlas substream according to embodiments;

FIG. 53 shows an example of a syntax structure of a sample stream NAL unit according to embodiments;

FIG. 54 shows an example of a syntax structure of an SEI message payload (sei_payload( )) according to embodiments;

DETAILED DESCRIPTION OF THE INVENTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
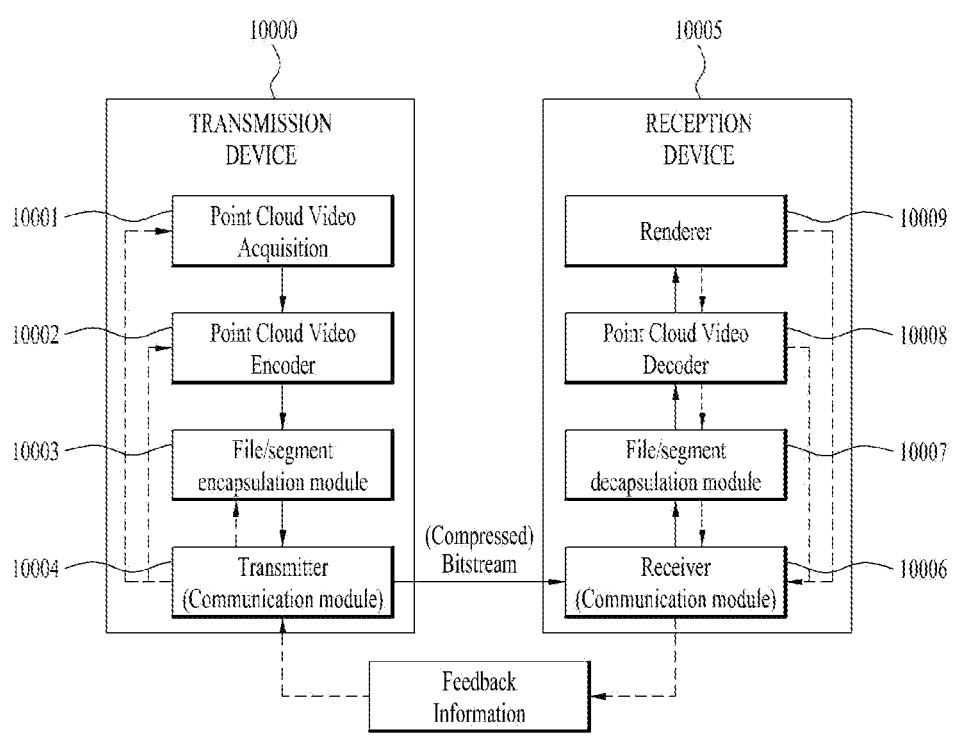
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and autonomous driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquisition unit 10001, a point cloud video encoder 10002, a file/segment encapsulation module (or file/segment encapsulator) 10003, and/or a transmitter (or communication module) 10004. The transmission device according to the embodiments may secure and process point cloud video (or point cloud content) and transmit the same.

According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquisition unit 10001 according to the embodiments acquires a point cloud video through a process of capturing, synthesizing, or generating a point cloud video.

The point cloud video encoder 10002 according to the embodiments encodes the point cloud video data acquired from the point cloud video acquisition unit 10001. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream including the encoded point cloud video data. The bitstream may include not only the encoded point cloud video data, but also signaling information related to encoding of the point cloud video data.

The point cloud video encoder 10002 according to the embodiments may support both the geometry-based point cloud compression (G-PCC) encoding scheme and/or the video-based point cloud compression (V-PCC) encoding scheme. In addition, the point cloud video encoder 10002 may encode a point cloud (referring to either point cloud data or points) and/or signaling data related to the point cloud.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulator (or file/segment decapsulation module) 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data.

The point cloud video decoder 10008 decodes the received point cloud video data. The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver 10006. According to embodiments, the feedback information received by the point cloud transmission device may be provided to the point cloud video encoder 10002.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., autonomous driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint (or orientation) is a point where a user is viewing a point cloud video, and may refer to a center point of the viewport region. That is, the viewport is a region centered on the viewpoint, and the size and shape of the region may be determined by a field of view (FOV). In other words, a viewport is determined according to a position and a viewpoint (or orientation) of a virtual camera or a user, point cloud data is rendered in the viewport based on viewport information. Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video decoder 10008 may perform a decoding operation based on the feedback information. The reception device 10005 may transmit the feedback information to the transmission device. The transmission device (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10005 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and autonomous driving.

In order to provide a point cloud content service, a point cloud video may be acquired first. The acquired point cloud video may be transmitted to a reception side through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a video-based point cloud compression (V-PCC) process.

Each element of the point cloud data transmission device and the point cloud data reception device according to the embodiments may be hardware, software, a processor, and/ or a combination thereof.

The point cloud compression system may include a transmission device and a reception device. According to embodiments, the transmission device may be called an encoder, a transmission apparatus, a transmitter, a point cloud transmission apparatus and so on. According to embodiments, the reception device may be called a decoder, a reception apparatus, a receiver, a point cloud reception apparatus and so on. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquisition unit, a point cloud video encoder, a file/segment encapsulator, and a transmitting unit (or transmitter) as shown in FIG. 1. The reception device may include a receiver, a file/segment decapsulator, a point cloud video decoder, and a renderer as shown in FIG. 1. The encoder may be referred to as a point cloud video/picture/picture/ frame encoder, and the decoder may be referred to as a point cloud video/picture/picture/frame decoding device. The renderer may include a display. The renderer and/or the display may be configured as separate devices or external components. The transmission device and the reception device may further include a separate internal or external module/unit/ component for the feedback process. According to embodiments, each element in a transmission device and a reception device may be configured of hardware, software and/or processor.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the stanford triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data or a bitstream including the point cloud data.

A point cloud data reception device according to embodiments may include a receiver configured to receive a bitstream including point cloud data, a decoder configured to decode the point cloud data, and a renderer configured to render the point cloud data.

The method/device according to the embodiments represents the point cloud data transmission device and/or the point cloud data reception device.

FIG. 2 illustrates capture of point cloud data according to embodiments.

Point cloud data (or point cloud video data) according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

An equipment for capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as autonomous driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder 10002 may encode the input point cloud video into one or more video streams. One point cloud video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder 10002 may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information (or auxiliary data), which will be described later. The geometry video may include a geometry image, the attribute video may include an attribute image, and the occupancy map video may include an occupancy map image. The auxiliary information may include auxiliary patch information. The attribute video/image may include a texture video/image.

The file/segment encapsulator (file/segment encapsulation module) 10003 may encapsulate the encoded point cloud video data and/or metadata related to the point cloud video in the form of, for example, a file. Here, the metadata related to the point cloud video may be received from the metadata processor. The metadata processor may be included in the point cloud video encoder 10002 or may be configured as a separate component/module. The file/segment encapsulator 10003 may encapsulate the data in a file format such as ISOBMFF or process the same in the form of a DASH segment or the like. According to an embodiment, the file/segment encapsulator 10003 may include the point cloud video-related metadata in the file format. The point cloud video metadata may be included, for example, in boxes at various levels on the ISOBMFF file format or as data in a separate track within the file. According to an embodiment, the file/segment encapsulator 10003 may encapsulate the point cloud video-related metadata into a file. The transmission processor may perform processing for transmission on the point cloud video data encapsulated according to the file format. The transmission processor may be included in the transmitter 10004 or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 10004 may transmit the encoded video/image information or data that is output in the form of a bitstream to the receiver 10006 of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 10006 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver 10006 or may be configured as a separate component/module. The reception processor may reversely perform the above-described process of the transmission processor such that the processing corresponds to the processing for transmission performed at the transmission side. The reception processor may deliver the acquired point cloud video data to the file/segment decapsulator 10007, and the acquired point cloud video-related metadata to the metadata processor (not shown). The point cloud video-related metadata acquired by the reception processor may take the form of a signaling table.

The file/segment decapsulator (file/segment decapsulation module) 10007 may decapsulate the point cloud video data received in the form of a file from the reception processor. The file/segment decapsulator 10007 may decapsulate the files according to ISOBMFF or the like, and may acquire a point cloud video bitstream or point cloud video-related metadata (a metadata bitstream). The acquired point cloud video bitstream may be delivered to the point cloud video decoder 10008, and the acquired point cloud video-related metadata (metadata bitstream) may be delivered to the metadata processor (not shown). The point cloud video bitstream may include the metadata (metadata bitstream). The metadata processor may be included in the point cloud video decoder 10008 or may be configured as a separate component/module. The point cloud video-related metadata acquired by the file/segment decapsulator 10007 may take the form of a box or a track in the file format. The file/segment decapsulator 10007 may receive metadata necessary for decapsulation from the metadata processor, when necessary. The point cloud video-related metadata may be delivered to the point cloud video decoder 10008 and used in a point cloud video decoding procedure, or may be transferred to the renderer 10009 and used in a point cloud video rendering procedure.

The point cloud video decoder 10008 may receive the bitstream and decode the video/image by performing an operation corresponding to the operation of the point cloud video encoder. In this case, the point cloud video decoder 10008 may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer 10009 may render the reconstructed geometry and the color point cloud image/picture. The rendered video/image may be displayed through the display (not shown). The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/autonomous driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area or module in some cases. In a general case, an M×N block may include samples (or a sample array) or a set (or array) of transform coefficients configured in M columns and N rows.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the FIG. 3, the left part shows a point cloud, in which a point cloud object is positioned in a 3D space and may be represented by a bounding box or the like. The middle part in FIG. 3 shows a geometry image, and the right part in FIG. 3 shows a texture image (non-padded image). In the present disclosure, a geometry image may be called a geometry patch frame/picture or a geometry frame/picture and a texture image may be called an attribute patch frame/picture or an attribute frame/picture.

A video-based point cloud compression (V-PCC) according to embodiments is a method of compressing 3D point cloud data based on a 2D video codec such as High Efficiency Video Coding (HEVC) or Versatile Video Coding (VVC). Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to atlas, and the values of the occupancy map may indicate whether each sample position in the atlas corresponds to a 3D point. Atlas means an object including information about 2D patches for each point cloud frame. For example, atlas may include 2D arrangement and size of patches, the position of a corresponding 3D region within a 3D point, a projection plan, and a level of detail parameters.

Patch: A set of points constituting a point cloud, which indicates that points belonging to the same patch are adjacent to each other in 3D space and are mapped in the same direction among 6-face bounding box planes in the process of mapping to a 2D image.

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch information may include information about the position, size, and the like of a patch in a 2D/3D space.

Point cloud data according to the embodiments, for example, V-PCC components may include an atlas, an occupancy map, geometry, and attributes.

Atlas represents a collection of 2D bounding boxes. It may be a group of patches, for example, patches projected into a rectangular frame that correspond to a 3-dimensional bounding box in 3D space, which may represent a subset of a point cloud. In this case, a patch may represent a rectangular region in the atlas corresponding to a rectangular region in a planar projection. In addition, patch data may represent data in which transformation of patches included in the atlas needs to be performed from 2D to 3D. Additionally, a patch data group is also referred to as an atlas.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
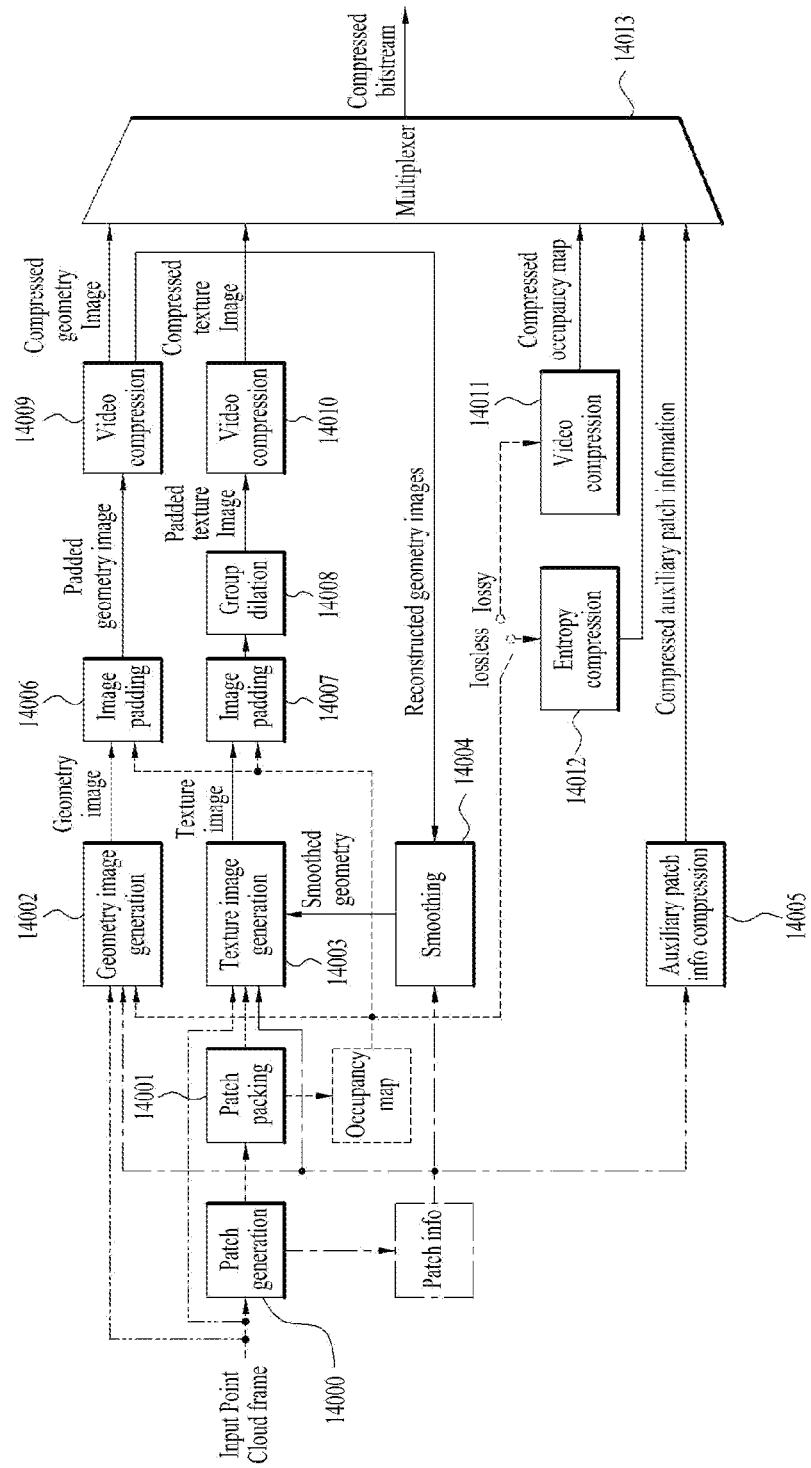
FIG. 4 illustrates an exemplary V-PCC encoding process according to embodiments.

FIG. 4 illustrates an example of a point cloud video encoder according to embodiments. FIG. 4 illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs one or more patches. In addition, the patch packer 40001 generates an occupancy map containing information about patch packing.

The geometry image generation or geometry image generator 40002 generates a geometry image based on the point cloud data, patch information (or auxiliary information), and/or occupancy map information. The geometry image means data (i.e., 3D coordinate values of points) containing geometry related to the point cloud data and refers as to a geometry frame.

The texture image generation or texture image generator 40003 generates a texture image based on the point cloud data, patches, packed patches, patch information (or auxiliary information) and/or the smoothed geometry. The texture image refers as to an attribute frame. That is, the texture image may be generated further based on smoothed geometry generated by smoothing processing of smoothing based on the patch information.

The smoothing or smoother 40004 may mitigate or eliminate errors contained in the image data. For example, the reconstructed geometry images are smothered based on the patch information. That is, portions that may cause errors between data may be smoothly filtered out to generate smoothed geometry.

The auxiliary patch information compression or auxiliary patch information compressor 40005 may compress auxiliary patch information related to the patch information generated in the patch generation. In addition, the compressed auxiliary patch information in the auxiliary patch information compressor 40005 may be transmitted to the multiplexer 40013. The auxiliary patch information may be used in the geometry image generator 40002.

The image padding or image padders 40006 and 40007 may pad the geometry image and the texture image, respectively. The padding data may be padded to the geometry image and the texture image.

The group dilation or group dilator 40008 may add data to the texture image in a similar manner to image padding. The auxiliary patch information may be inserted into the texture image.

The video compression or video compressors 40009, 40010, and 40011 may compress the padded geometry image, the padded texture image, and/or the occupancy map, respectively. In other words, the video compressors 40009, 40010, and 40011 may compress the input geometry frame, attribute frame, and/or occupancy map frame, respectively, to output a video bitstream of the geometry image, a video bitstream of the texture image, a video bitstream of the occupancy map. The video compression may encode geometry information, texture information, and occupancy information.

The entropy compression or entropy compressor 40012 may compress the occupancy map based on an entropy scheme.

According to embodiments, the entropy compression and/or video compression may be performed on an occupancy map frame depending on whether the point cloud data is lossless and/or lossy.

The multiplexer 40013 multiplexes the video bitstream of the compressed geometry, the video bitstream of the compressed texture image, the video bitstream of the compressed occupancy map, and the bitstream of compressed auxiliary patch information from the respective compressors into one bitstream.

The blocks described above may be omitted or may be replaced by blocks having similar or identical functions. In addition, each of the blocks shown in FIG. 4 may operate as at least one of a processor, software, and hardware.

Detailed operations of each process of FIG. 4 according to embodiments are described below.

Patch generation (40000) The patch generation process refers to a process of dividing a point cloud into patches, which are mapping units, in order to map the point cloud to the 2D image. The patch generation process may be divided into three steps: normal value calculation, segmentation, and patch segmentation.

Figure 5:
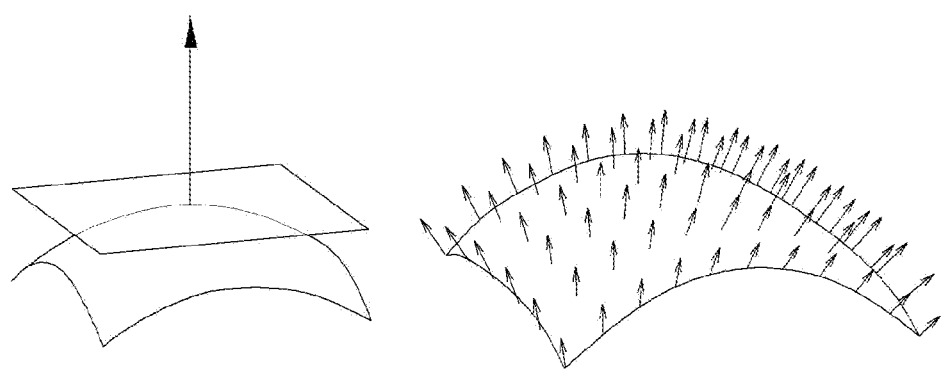
FIG. 5 illustrates an example of a tangent plane and a normal vector of a surface according to embodiments.

The normal value calculation process will be described in detail with reference to FIG. 5. FIG. 5 illustrates an example of a tangent plane and a normal vector of a surface according to embodiments.

The surface of FIG. 5 is used in the patch generator 40000 of the V-PCC encoding process of FIG. 4 as follows.

Normal Calculation Related to Patch Generation

Each point of a point cloud has its own direction, which is represented by a 3D vector called a normal vector. Using the neighbors of each point obtained using a K-D tree or the like, a tangent plane and a normal vector of each point constituting the surface of the point cloud as shown in FIG. 5 may be obtained. The search range applied to the process of searching for neighbors may be defined by the user.

The tangent plane refers to a plane that passes through a point on the surface and completely includes a tangent line to the curve on the surface.

Figure 6:
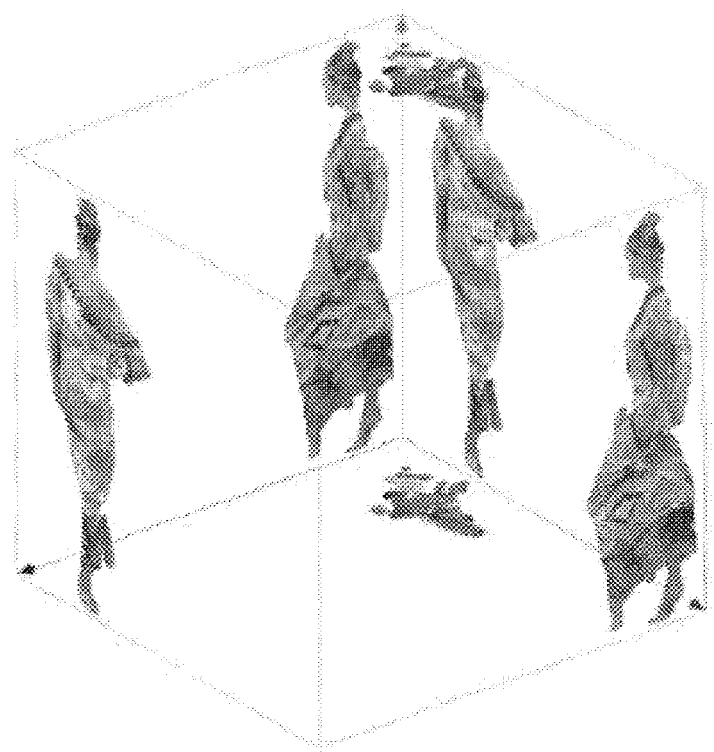
FIG. 6 illustrates an exemplary bounding box of a point cloud according to embodiments.

FIG. 6 illustrates an exemplary bounding box of a point cloud according to embodiments.

The bounding box according to the embodiments refers to a box of a unit for dividing point cloud data based on a hexahedron in a 3D space.

A method/device according to embodiments, for example, patch generator 40000 may use a bounding box in a process generating a patch from point cloud data.

The bounding box may be used in the process of projecting a target object of the point cloud data onto a plane of each planar face of a hexahedron in a 3D space. The bounding box may be generated and processed by the point cloud video acquisition unit 10001 and the point cloud video encoder 10002 of FIG. 1. Further, based on the bounding box, the patch generation 40000, patch packing 40001, geometry image generation 40002, and texture image generation 40003 of the V-PCC encoding process of FIG. 4 may be performed.

Segmentation Related to Patch Generation

Segmentation is divided into two processes: initial segmentation and refine segmentation. The point cloud video encoder 10002 according to the embodiments projects a point onto one face of a bounding box. Specifically, each point constituting a point cloud is projected onto one of the six faces of a bounding box surrounding the point cloud as shown in FIG. 6. Initial segmentation is a process of determining one of the planar faces of the bounding box onto which each point is to be projected.

$\vec{n}_{p_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{p_i}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}} \{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch segmentation related to patch generation Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch.

4) Repeat operations 2) to 3) until there is no unextracted point.

The occupancy map, geometry image and texture image for each patch as well as the size of each patch are determined through the patch segmentation process.

Figure 7:
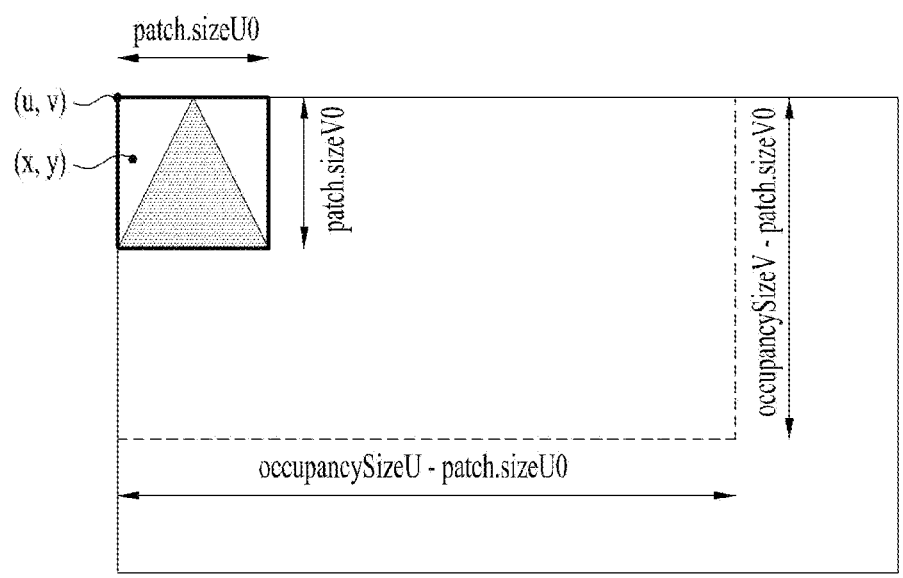
FIG. 7 illustrates an example of determination of individual patch positions on an occupancy map according to embodiments.

FIG. 7 illustrates an example of determination of individual patch positions on an occupancy map according to embodiments.

The point cloud video encoder 10002 according to the embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU−patch.sizeU0) and a vertical coordinate within the range of (0, occupancySizeV−patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y)

on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 6) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
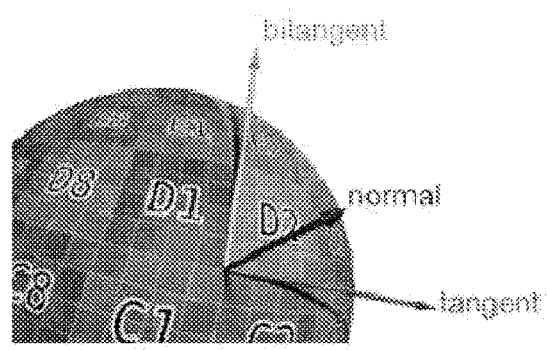
FIG. 8 shows an exemplary relationship among normal, tangent, and bitangent axes according to embodiments.

FIG. 8 shows an exemplary relationship among normal, tangent, and bitangent axes according to embodiments.

The point cloud video encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information. According to an embodiment, a position of a patch is included in patch information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in FIG. 8.

Figure 9:
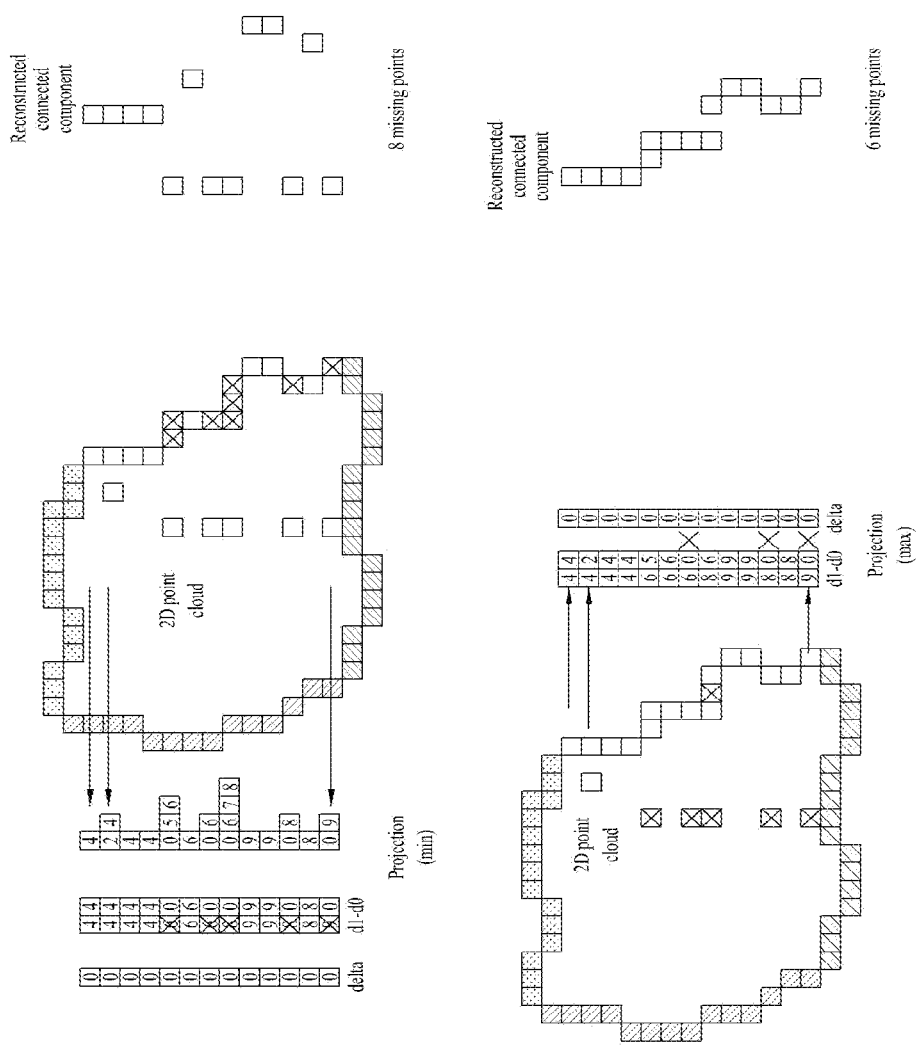
FIG. 9 shows an exemplary configuration of minimum mode and maximum mode of a projection mode according to embodiments.

FIG. 9 shows an exemplary configuration of the minimum mode and maximum mode of a projection mode according to embodiments.

The point cloud video encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in FIG. 9.

For example, when a point cloud is located in 2D as illustrated in FIG. 9, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1.

Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 encoding method) is to encode the depth values of the previously generated image d1. A second method (differential encoding method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
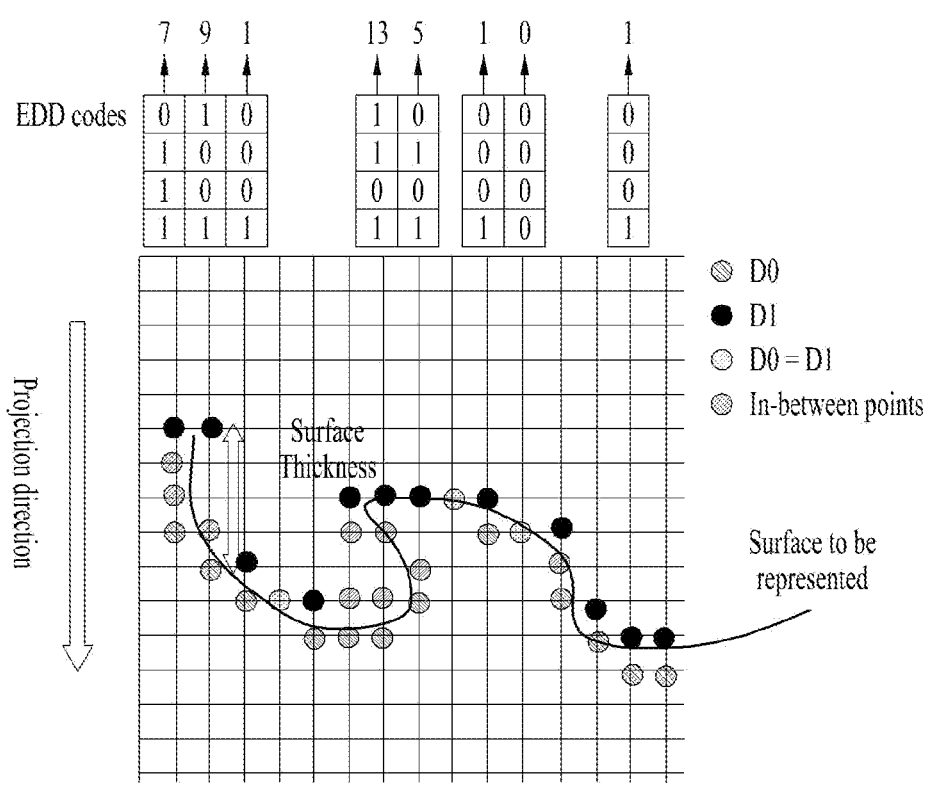
FIG. 10 illustrates an exemplary EDD code according to embodiments.

FIG. 10 illustrates an exemplary EDD code according to embodiments.

In some/all processes of the point cloud video encoder 10002 and/or V-PCC encoding (e.g., video compression 40009), the geometry information about points may be encoded based on the EOD code.

As shown in FIG. 10, the EDD code is used for binary encoding of the positions of all points within the range of surface thickness including d1. For example, in FIG. 10, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud video encoder 10002 or smoother 40004:

1) Reconstruct the point cloud from the geometry image. This operation may be the reverse of the geometry image generation described above. For example, the reverse process of encoding may be reconstructed;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
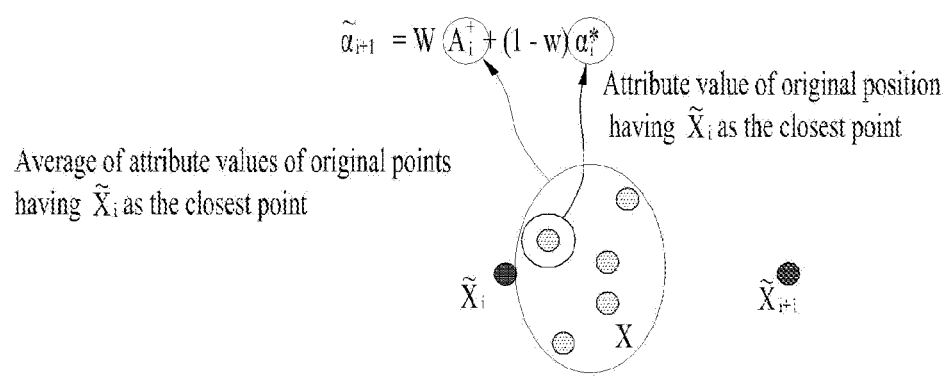
FIG. 11 illustrates an example of recoloring based on color values of neighboring points according to embodiments.

FIG. 11 illustrates an example of recoloring based on color values of neighboring points according to embodiments.

The point cloud video encoder 10002 or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in FIG. 11, a new color value may be calculated in consideration of the color value of the nearest neighboring point and the color values of the neighboring points.

For example, referring to FIG. 11, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images generated in two layers of d0 and d1.

Auxiliary Patch Information Compression (40005)

The point cloud video encoder 10002 or the auxiliary patch information compressor 40005 according to the embodiments may compress the auxiliary patch information (auxiliary information about the point cloud).

The auxiliary patch information compressor 40005 compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table 1 shows a pseudo code representing the process of matching between blocks and patches based on the candidate list and the local patch indexes.

The maximum number of candidate lists may be defined by a user.

TABLE 1

```
for( i = 0; i < BlockCount; i++ ) {
    if( candidatePatches[ i ].size( ) == 1 ) {
        blockToPatch[ i ] = candidatePatches[ i ][ 0 ]
    } else {
        candidate_index
        if( candidate_index == max_candidate_count ) {
            blockToPatch[ i ] = local_patch_index
        } else {
            blockToPatch[ i ]          =
candidatePatches[ i ][ candidate_index ]
        }
    }
}
```

Figure 12:
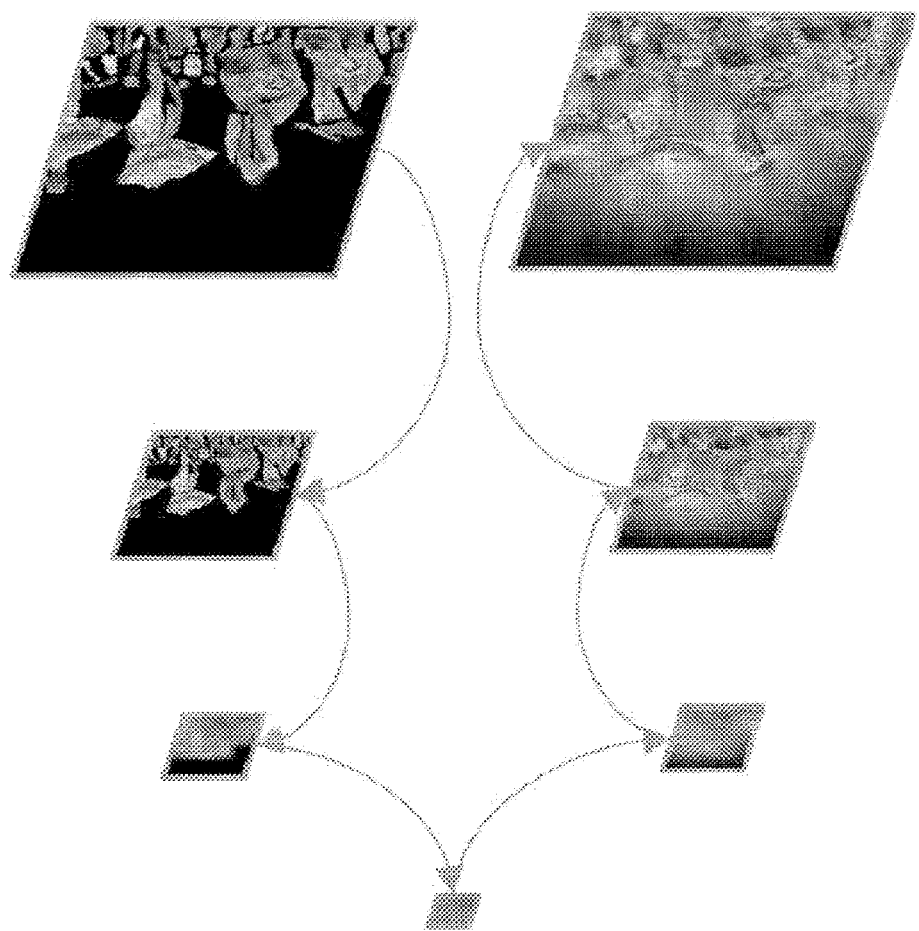
FIG. 12 illustrates an example of push-pull background filling according to embodiments.

FIG. 12 illustrates push-pull background filling according to embodiments.

Image Padding and Group Dilation (40006, 40007, 40008)

The image padder according to the embodiments may fill the space except the patch area with meaningless supplemental data based on the push-pull background filling technique.

Image padding 40006 and 40007 is a process of filling the space other than the patch region with meaningless data to improve compression efficiency. For image padding, pixel values in columns or rows close to a boundary in the patch may be copied to fill the empty space. Alternatively, as shown in FIG. 12, a push-pull background filling method may be used. According to this method, the empty space is filled with pixel values from a low resolution image in the process of gradually reducing the resolution of a non-padded image and increasing the resolution again.

Group dilation 40008 is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
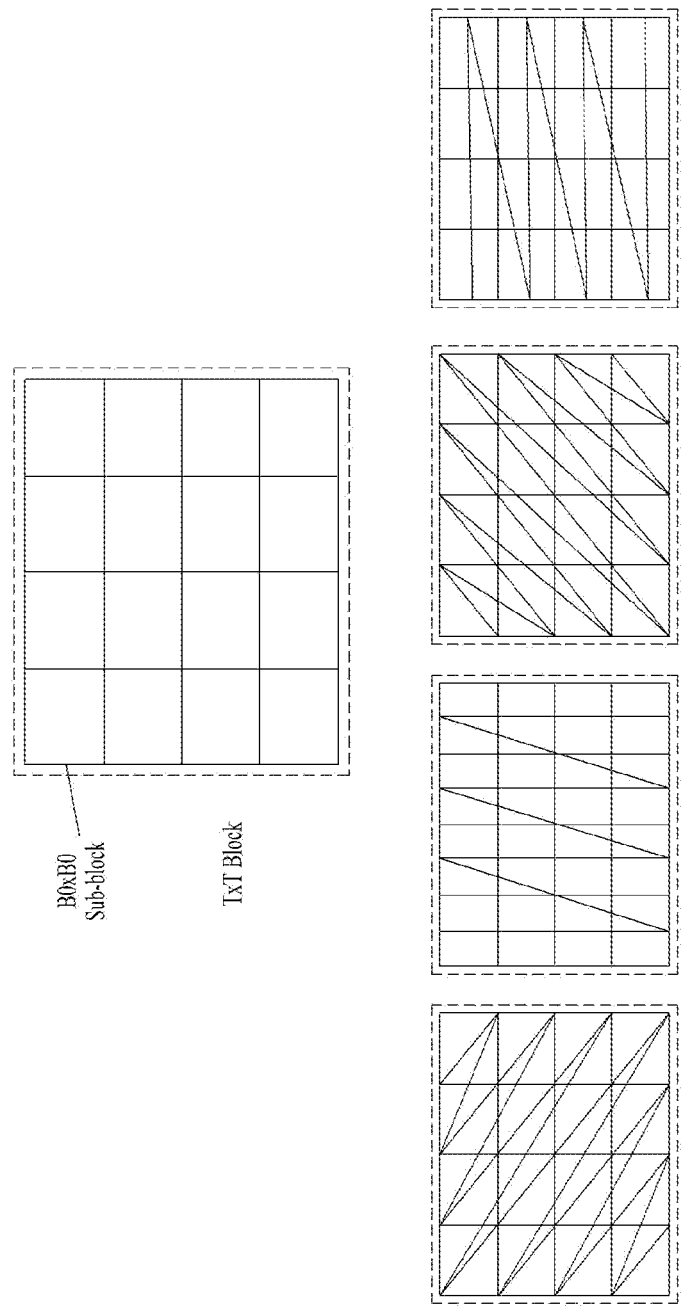
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. FIG. 13 shows four possible traversal orders for a 4*4 block.

Figure 14:
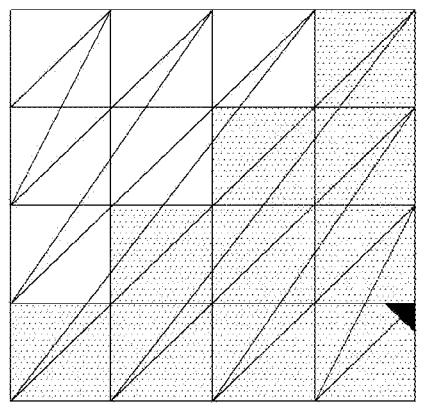
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as shown in FIG. 14.

For example, the best traversal order with the minimum number of runs is selected from among the possible traversal orders and the index thereof is encoded. FIG. 14 illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressors 40009, 40010, and 40011 according to the embodiments encodes a sequence of a geometry image, a texture image, an occupancy map image, and the like generated in the above-described operations, using a 2D video codec such as HEVC or VVC.

Figure 15:
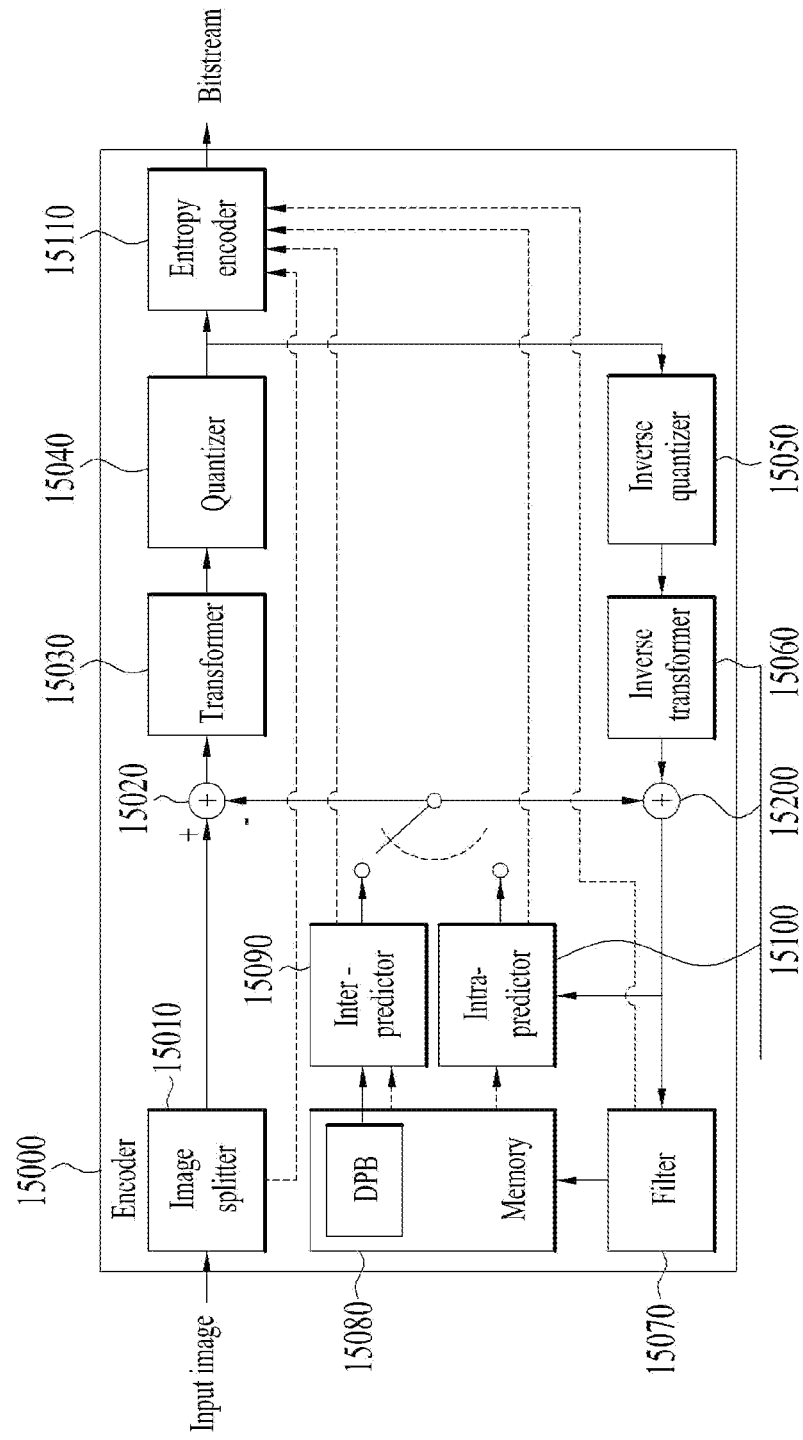
FIG. 15 illustrates an exemplary 2D video/image encoder according to embodiments.

FIG. 15 illustrates an exemplary 2D video/image encoder according to embodiments. According to embodiments, the 2D video/image encoder may be called an encoding device.

FIG. 15, which represents an embodiment to which the video compressors 40009, 40010, and 40011 described above is applied, is a schematic block diagram of a 2D video/image encoder 15000 configured to encode a video/image signal. The 2D video/image encoder 15000 may be included in the point cloud video encoder 10002 described above or may be configured as an internal/external component. Each component of FIG. 15 may correspond to software, hardware, processor and/or a combination thereof.

Here, the input image may be one of the geometry image, the texture image (attribute(s) image), and the occupancy map image described above. When the 2D video/image encoder of FIG. 15 is applied to the video compressor 40009, the image input to the 2D video/image encoder 15000 is a padded geometry image, and the bitstream output from the 2D video/image encoder 15000 is a bitstream of a compressed geometry image. When the 2D video/image encoder of FIG. 15 is applied to the video compressor 40010, the image input to the 2D video/image encoder 15000 is a padded texture image, and the bitstream output from the 2D video/image encoder 15000 is a bitstream of a compressed texture image. When the 2D video/image encoder of FIG. 15 is applied to the video compressor 40011, the image input to the 2D video/image encoder 15000 is an occupancy map image, and the bitstream output from the 2D video/image encoder 15000 is a bitstream of a compressed occupancy map image.

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be collectively called a residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 15200, the filter 15070, the inter-predictor 15090, the intra-predictor 15100, and the entropy encoder 15110 of FIG. 15 may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area or modle. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The subtractor 15020 of the encoding device 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoding device 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 of the predictor may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 of the predictor may derive a predicted block for the current block based on a reference block (reference sample array) specified by a motion vector on the reference picture. In this case, in order to reduce the amount of motion information transmitted in the inter-prediction mode, the motion information may be predicted on a per block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block.

The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loéve transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector.

The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis.

The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 15200 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 15200 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal output from the adder 15200. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture stored in the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse code modulation (PCM) is applied, the prediction, transform, and quantization procedures may be skipped, and the value of the original sample may be encoded and output in the form of a bitstream.

Figure 16:
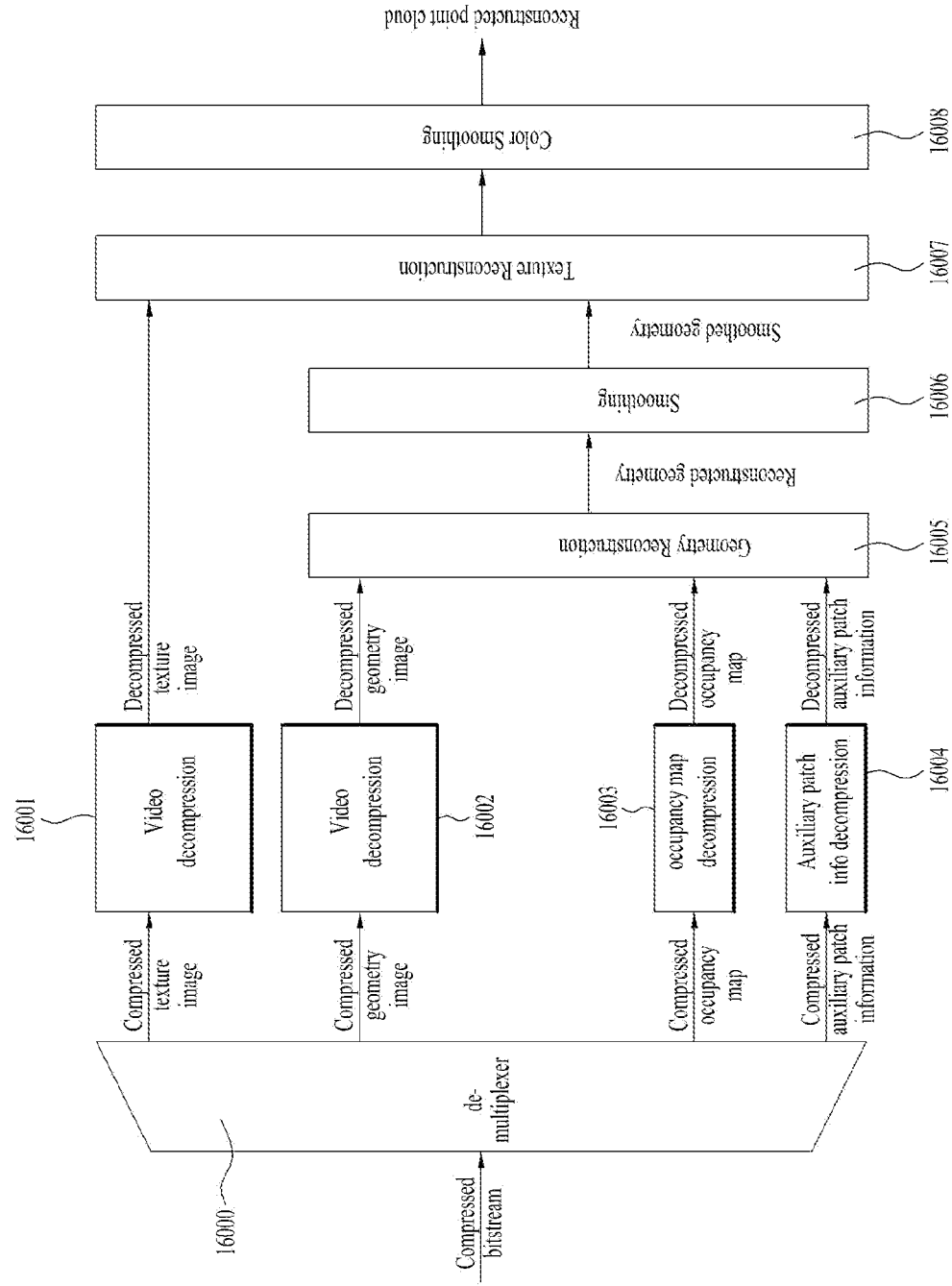
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and a compressed auxiliary patch information, respectively.

The video decompression or video decompressors 16001 and 16002 decompress each of the compressed texture image and the compressed geometry image.

The occupancy map decompression or occupancy map decompressor 16003 decompresses the compressed occupancy map image.

The auxiliary patch information decompression or auxiliary patch information decompressor 16004 decompresses the compressed auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smooths color values from the reconstructed texture. For example, smoothing filtering may be applied.

As a result, reconstructed point cloud data may be generated.

FIG. 16 illustrates a decoding process of the V-PCC for reconstructing a point cloud by decompressing (decoding) the compressed occupancy map, geometry image, texture image, and auxiliary patch information.

Each of the units illustrated in FIG. 16 may operate as at least one of a processor, software, and hardware. Detailed operations of each unit of FIG. 16 according to embodiments are described below.

Video Decompression (16001, 16002)

Video decompression is a reverse process of the video compression described above. It is a process of decoding the bitstream of a geometry image, the bitstream of a compressed texture image, and/or the bitstream of a compressed occupancy map image generated in the above-described process, using a 2D video codec such as HEVC and VVC.

Figure 17:
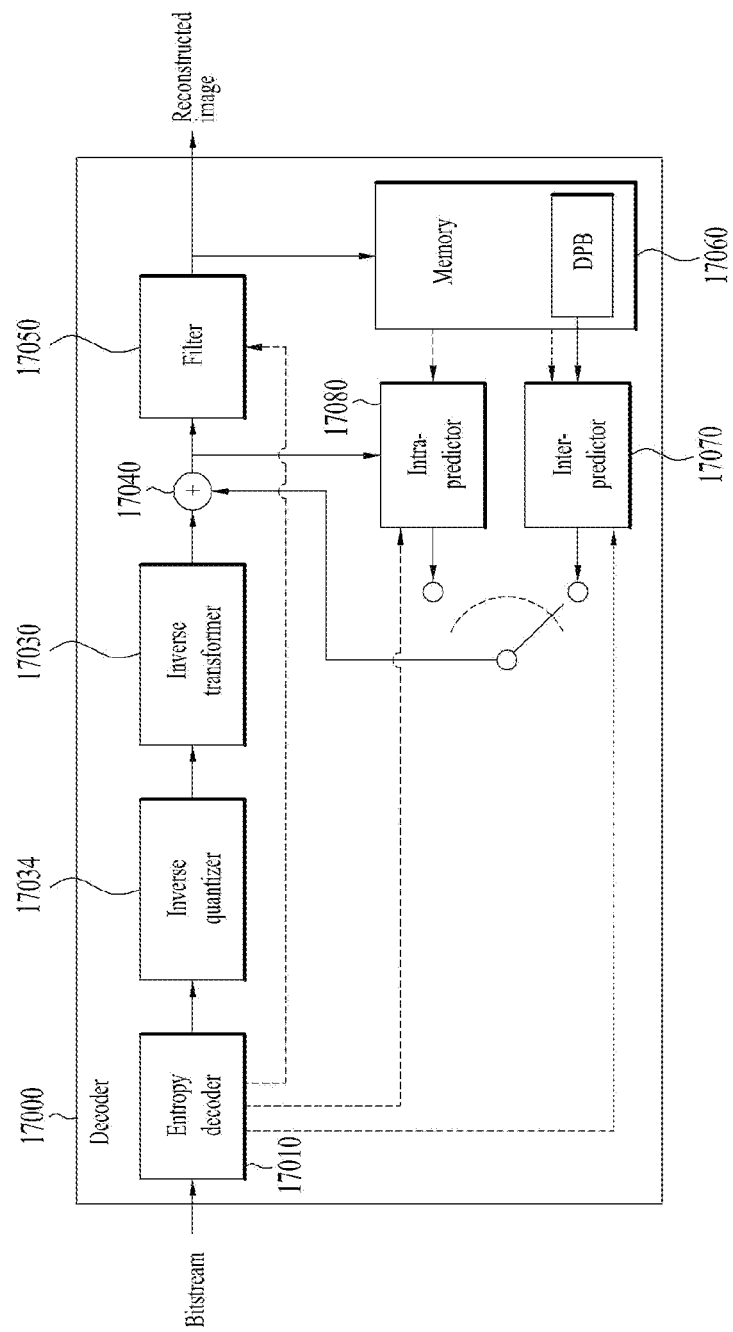
FIG. 17 shows an exemplary 2D video/image decoder according to embodiments.

FIG. 17 illustrates an exemplary 2D video/image decoder according to embodiments, which is also referred to as a decoding device.

The 2D video/image decoder may follow the reverse process of the operation of the 2D video/image encoder of FIG. 15.

The 2D video/image decoder of FIG. 17 is an embodiment of the video decompressors 16001 and 16002 of FIG. 16. FIG. 17 is a schematic block diagram of a 2D video/image decoder 17000 by which a video/image signal is decoded. The 2D video/image decoder 17000 may be included in the point cloud video decoder 10008 described above, or may be configured as an internal/external component. Each component in FIG. 17 may correspond to software, hardware, a processor, and/or a combination thereof.

Here, the input bitstream may be one of a bitstream of a geometry image, a bitstream of a texture image (attribute(s) image), and a bitstream of an occupancy map image. When the 2D video/image decoder of FIG. 17 is applied to the video decompressor 16001, the bitstream input to the 2D video/image decoder is a bitstream of a compressed texture image, and the reconstructed image output from the 2D video/image decoder is a decompressed texture image. When the 2D video/image decoder of FIG. 17 is applied to the video decompressor 16002, the bitstream input to the 2D video/image decoder is a bitstream of a compressed geometry image, and the reconstructed image output from the 2D video/image decoder is a decompressed geometry image. The 2D video/image decoder of FIG. 17 may receive a bitstream of a compressed occupancy map image and decompress the same. The reconstructed image (or the output image or decoded image) may represent a reconstructed image for the above-described geometry image, texture image (attribute(s) image), and occupancy map image.

Referring to FIG. 17, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 of FIG. 17 may be configured by one hardware component (e.g., a decoder or a processor) according to an embodiment. In addition, the memory 17060 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 15. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 17080 of the predictor may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 of the predictor may derive a predicted block for the current block based on a reference block (reference sample array) specified by a motion vector on the reference picture. In this case, in order to reduce the amount of motion information transmitted in the inter-prediction mode, the motion information may be predicted on per a block, subblock, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal in the inverse transformer 17030 to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal output from the adder 17040. For example, the filter 17050 may generate a modified reconstructed picture by applying various filtering techniques to the reconstructed picture, and may transmit the modified reconstructed picture to the memory 17060, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 15070, the inter-predictor 15090, and the intra-predictor 15100 of the encoder 15000 of FIG. 15 may be applied to the filter 17050, the inter-predictor 17070 and the intra-predictor 17080 of the decoder 17000, respectively, in the same or corresponding manner.

At least one of the prediction, inverse transform, and inverse quantization procedures described above may be skipped. For example, for a block to which the pulse code modulation (PCM) is applied, the prediction, inverse transform, and inverse quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Information Decompression (16004)

The auxiliary patch information may be reconstructed by performing the reverse process of the aforementioned auxiliary patch information compression and decoding the compressed auxiliary patch information bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch information, and the information about mapping between a block and the patch. Then, a point cloud is reconstructed in a 3D space based on the geometry image of the extracted patch and the 3D position information about the patch included in the auxiliary patch information. When the geometry value corresponding to a point (u, v) within the patch is g(u, v), and the coordinates of the position of the patch on the normal, tangent and bitangent axes of the 3D space are ($\delta 0$, s0, r0), $\delta$(u, v), s(u, v), and r(u, v), which are the normal, tangent, and bitangent coordinates in the 3D space of a position mapped to point (u, v) may be expressed as follows:

$$\delta(u,v)=\delta 0+g(u,v)$$

$$s(u,v)=s0+u$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the geometry image reconstructed in the geometry reconstruction process and the mapping information of the point cloud described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described above may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
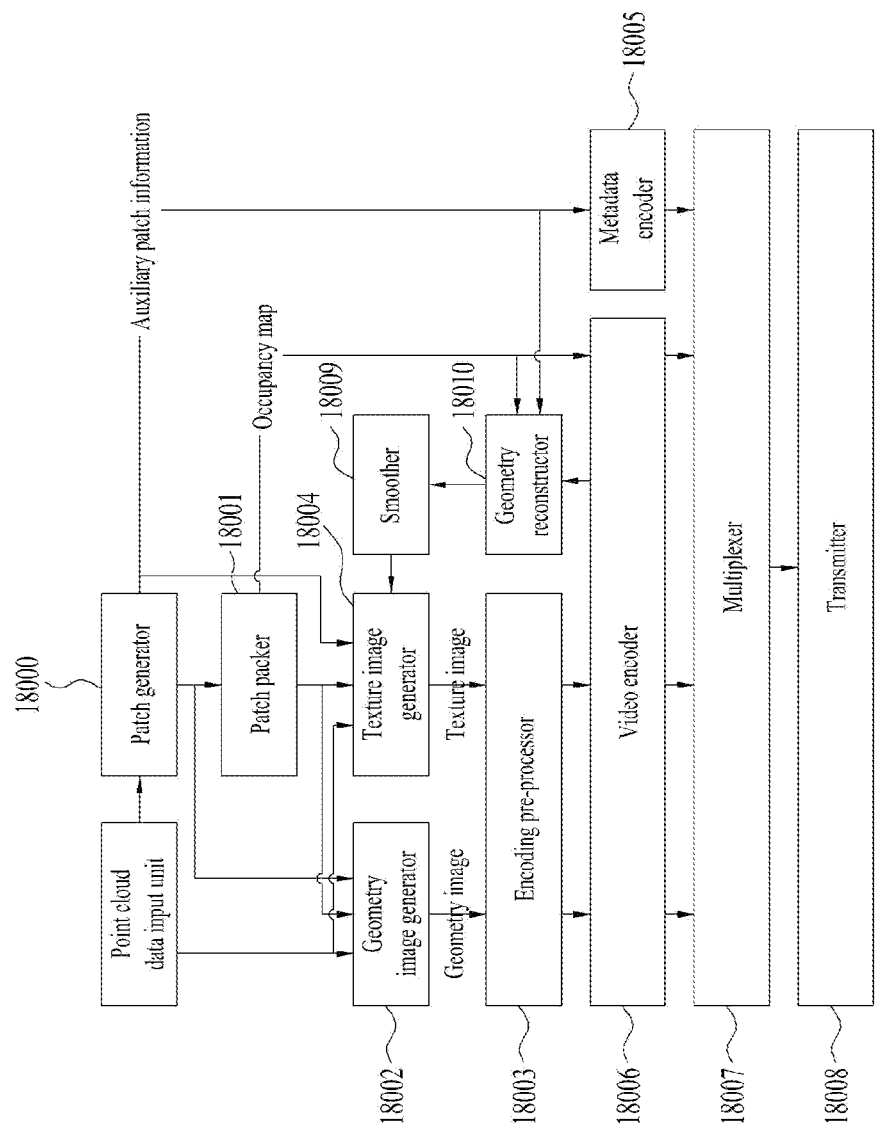
FIG. 18 is a flowchart illustrating operation of a transmission device according to embodiments of the present disclosure.

FIG. 18 is a flowchart illustrating operation of a transmission device for compression and transmission of V-PCC based point cloud data according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device or a transmission system.

Regarding a patch generator 18000, a patch for 2D image mapping of a point cloud is generated based on input point cloud data. Patch information and/or auxiliary patch information is generated as a result of the patch generation. The generated patch information and/or auxiliary patch information may be used in the processes of geometry image generation, texture image generation, smoothing, and geometry reconstruction for smoothing.

The patch packer 18001 performs a patch packing process of mapping the patches generated by the patch generator 18000 into a 2D image. For example, one or more patches may be packed. An occupancy map may be generated as a result of the patch packing. The occupancy map may be used in the processes of geometry image generation, geometry image padding, texture image padding, and/or geometry reconstruction for smoothing.

The geometry image generator 18002 generates a geometry image based on the point cloud data, the patch information (or auxiliary patch information), and/or the occupancy map. The generated geometry image is pre-processed by the encoding pre-processor 18003 and then encoded into one bitstream by the video encoder 18006.

The encoding pre-processor 18003 may include an image padding procedure. In other words, the generated geometry image and some spaces in the generated texture image may be padded with meaningless data. The encoding pre-processor 18003 may further include a group dilation procedure for the generated texture image or the texture image on which image padding has been performed.

The geometry reconstructor 18010 reconstructs a 3D geometry image based on the geometry bitstream, auxiliary patch information, and/or occupancy map encoded by the video encoder 18006.

The smoother 18009 smoothes the 3D geometry image reconstructed and output by the geometry reconstructor 18010 based on the auxiliary patch information, and outputs the smoothed 3D geometry image to the texture image generator 18004.

The texture image generator 18004 may generate a texture image based on the smoothed 3D geometry, point cloud data, patch (or packed patch), patch information (or auxiliary patch information), and/or occupancy map. The generated texture image may be pre-processed by the encoding pre-processor 18003 and then encoded into one video bitstream by the video encoder 18006.

The metadata encoder 18005 may encode the auxiliary patch information into one metadata bitstream.

The video encoder 18006 may encode the geometry image and the texture image output from the encoding pre-processor 18003 into respective video bitstreams, and may encode the occupancy map into one video bitstream. According to an embodiment, the video encoder 18006 encodes each input image by applying the 2D video/image encoder of FIG. 15.

The multiplexer 18007 multiplexes the video bitstream of geometry, the video bitstream of the texture image, the video bitstream of the occupancy map, which are output from the video encoder 18006, and the bitstream of the metadata (including auxiliary patch information), which is output from the metadata encoder 18005, into one bitstream.

The transmitter 18008 transmits the bitstream output from the multiplexer 18007 to the receiving side. Alternatively, a file/segment encapsulator may be further provided between the multiplexer 18007 and the transmitter 18008, and the bitstream output from the multiplexer 18007 may be encapsulated in the form of a file and/or segment and output to the transmitter 18008.

The patch generator 18000, the patch packer 18001, the geometry image generator 18002, the texture image generator 18004, the metadata encoder 18005, and the smoother 18009 of FIG. 18 may correspond to the patch generation 40000, the patch packing 40001, the geometry image generation 40002, the texture image generation 40003, the auxiliary patch information compression 40005, and the smoothing 40004, respectively. The encoding pre-processor 18003 of FIG. 18 may include the image padders 40006 and 40007 and the group dilator 40008 of FIG. 4, and the video encoder 18006 of FIG. 18 may include the video compressors 40009, 40010, and 40011 and/or the entropy compressor 40012 of FIG. 4. For parts not described with reference to FIG. 18, refer to the description of FIGS. 4 to 15. The above-described blocks may be omitted or may be replaced by blocks having similar or identical functions. In addition, each of the blocks shown in FIG. 18 may operate as at least one of a processor, software, or hardware. Alternatively, the generated video bitstreams of the geometry, the texture image, and the occupancy map and the metadata bitstream of the auxiliary patch information may be formed into one or more track data in a file or encapsulated into segments and transmitted to the receiving side through a transmitter.

Procedure of Operating the Reception Device

Figure 19:
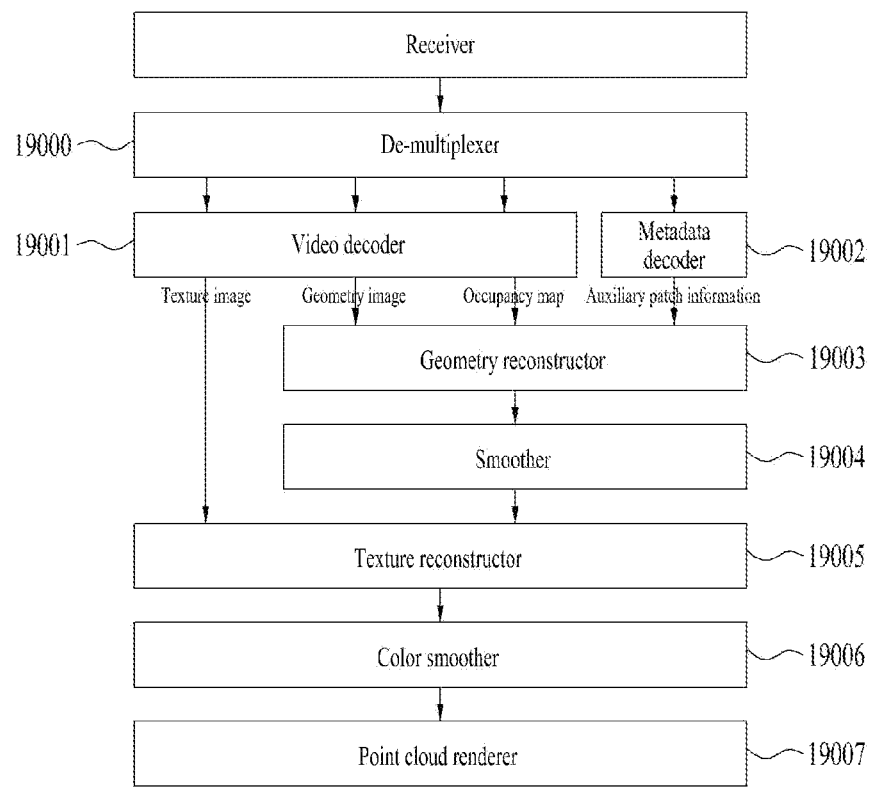
FIG. 19 is a flowchart illustrating operation of a reception device according to embodiments.

FIG. 19 is a flowchart illustrating operation of a reception device for receiving and restoring V-PCC-based point cloud data according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device, a reception system, or the like.

The receiver receives a bitstream (i.e., compressed bitstream) of a point cloud, and the demultiplexer 19000 demultiplexes a bitstream of a texture image, a bitstream of a geometry image, and a bitstream of an occupancy map image, and a bitstream of metadata (i.e., auxiliary patch information) from the received point cloud bitstream. The demultiplexed bitstreams of the texture image, the geometry image, and the occupancy map image are output to the video decoder 19001, and the bitstream of the metadata is output to the metadata decoder 19002.

According to an embodiment, when the transmission device of FIG. 18 is provided with a file/segment encapsulator, a file/segment decapsulator is provided between the receiver and the demultiplexer 19000 of the receiving device of FIG. 19 as. In this case, the transmission device encapsulates and transmits the point cloud bitstream in the form of a file and/or segment, and the reception device receives and decapsulates the file and/or segment containing the point cloud bitstream.

The video decoder 19001 decodes the bitstream of the geometry image, the bitstream of the texture image, and the bitstream of the occupancy map image into the geometry image, the texture image, and the occupancy map image, respectively. According to an embodiment, the video decoder 19001 performs the decoding operation by applying the 2D video/image decoder of FIG. 17 to each input bitstream. The metadata decoder 19002 decodes the bitstream of metadata into auxiliary patch information, and outputs the information to the geometry reconstructor 19003.

The geometry reconstructor 19003 reconstructs the 3D geometry based on the geometry image, the occupancy map, and/or auxiliary patch information output from the video decoder 19001 and the metadata decoder 19002.

The smoother 19004 smoothes the 3D geometry reconstructed by the geometry reconstructor 19003.

The texture reconstructor 19005 reconstruct the texture using the texture image output from the video decoder 19001 and/or the smoothed 3D geometry. That is, the texture reconstructor 19005 reconstructs the color point cloud image/picture by assigning color values to the smoothed 3D geometry using the texture image. Thereafter, in order to improve objective/subjective visual quality, a color smoothing process may be additionally performed on the color point cloud image/picture by the color smoother 19006. The modified point cloud image/picture derived through the operation above is displayed to the user after the rendering process in the point cloud renderer 19007. In some cases, the color smoothing process may be omitted.

The above-described blocks may be omitted or may be replaced by blocks having similar or identical functions. In addition, each of the blocks shown in FIG. 19 may operate as at least one of a processor, software, and hardware.

Figure 20:
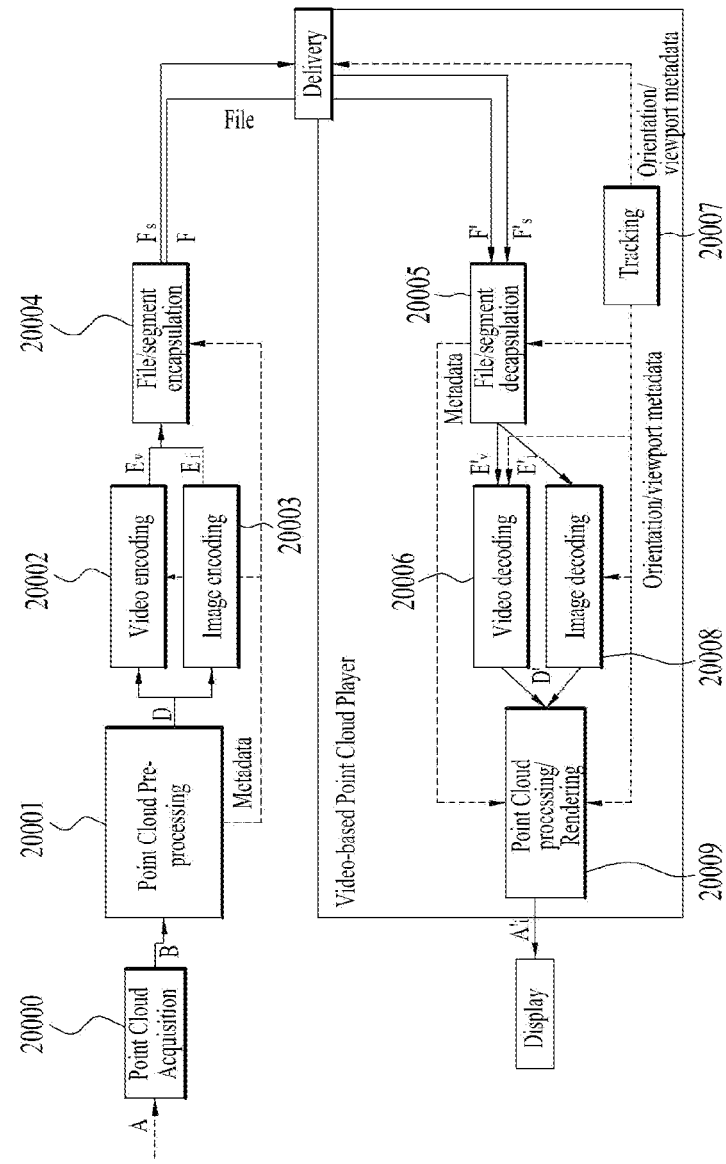
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

FIG. 20 shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames for the point cloud video. Generally, a picture/frame may be a unit representing one image in a specific time interval. In addition, in dividing the points constituting the point cloud video into one or more patches and mapping the same to a 2D plane, the point cloud pre-processor 20001 may generate an occupancy map picture/frame, which is a binary map indicating presence or absence of data at the corresponding position in the 2D plane with a value of 0 or 1. Here, a patch is a set of points that constitute the point cloud video, wherein the points belonging to the same patch are adjacent to each other in the 3D space and are mapped to the same face among the planar faces of a 6-face bounding box in mapping to a 2D image). In addition, the point cloud pre-processor 20001 may generate a geometry picture/frame, which is in the form of a depth map that represents the information about the position (geometry) of each point constituting the point cloud video on a patch-by-patch basis. The point cloud pre-processor 20001 may also generate a texture picture/frame, which represents the color information about each point constituting the point cloud video on a patch-by-patch basis. In this process, metadata needed to reconstruct the point cloud from the individual patches may be generated. The metadata may contain information (auxiliary information or auxiliary patch information) about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder 20002 may perform a video-based point cloud compression (V-PCC) procedure. The point cloud video encoder 20002 may perform a series of procedures such as prediction, transform, quantization, and entropy coding for compression and coding efficiency. The encoded data (encoded video/image information) may be output in the form of a bitstream. Based on the V-PCC procedure, the point cloud video encoder 20002 may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder 20003 may perform a video-based point cloud compression (V-PCC) procedure. The point cloud image encoder 20003 may perform a series of procedures such as prediction, transform, quantization, and entropy coding for compression and coding efficiency. The encoded image may be output in the form of a bitstream. Based on the V-PCC procedure, the point cloud image encoder 20003 may encode the point cloud image by dividing the same into a geometry image, an attribute image, an occupancy map image, and metadata, for example, information about patches, as described below.

According to embodiments, the point cloud video encoder 20002, the point cloud image encoder 20003, the point cloud video decoder 20006, and the point cloud image decoder 20008 may be performed by one encoder/decoder as described above, and may be performed along separate paths as shown in the figure.

In file/segment encapsulator 20004, the encoded point cloud data and/or point cloud-related metadata may be encapsulated into a file or a segment for streaming. Here, the point cloud-related metadata may be received from the metadata processor (not shown) or the like. The metadata processor may be included in the point cloud video/image encoders 20002/20003 or may be configured as a separate component/module. The file/segment encapsulator 20004 may encapsulate the corresponding video/image/metadata in a file format such as ISOBMFF or in the form of a DASH segment or the like. According to an embodiment, the file/segment encapsulator 20004 may include the point cloud metadata in the file format. The point cloud-related metadata may be included, for example, in boxes at various levels on the ISOBMFF file format or as data in a separate track within the file. According to an embodiment, the file/segment encapsulator 20004 may encapsulate the point cloud-related metadata into a file.

The file/segment encapsulator 20004 according to the embodiments may store one bitstream or individually bitstreams into one or multiple tracks in a file, and may also encapsulate signaling information for this operation. In addition, an atlas stream (or patch stream) included on the bitstream may be stored as a track in the file, and related signaling information may be stored. Furthermore, an SEI message present in the bitstream may be stored in a track in the file and related signaling information may be stored.

A transmission processor (not shown) may perform processing of the encapsulated point cloud data for transmission according to the file format. The transmission processor may be included in the transmitter (not shown) or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver (not shown) of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor (not shown) may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a file/segment decapsulator 20005, and the acquired point cloud-related metadata to a metadata parser.

The file/segment decapsulator 20005 may decapsulate the point cloud data received in the form of a file from the reception processor. The file/segment decapsulator 20005 may decapsulate files according to ISOBMFF or the like, and may acquire a point cloud bitstream or point cloud-related metadata (or a separate metadata bitstream). The acquired point cloud bitstream may be delivered to the point cloud video decoder 20006 and the point cloud image decoder 20008, and the acquired point cloud video-related metadata (metadata bitstream) may be delivered to the metadata processor (not shown). The point cloud bitstream may include the metadata (metadata bitstream). The metadata processor may be included in the point cloud video decoder 20006 or may be configured as a separate component/module. The point cloud video-related metadata acquired by the file/segment decapsulator 20005 may take the form of a box or track in the file format. The file/segment decapsulator 20005 may receive metadata necessary for decapsulation from the metadata processor, when necessary. The point cloud-related metadata may be delivered to the point cloud video decoder 20006 and/or the point cloud image decoder 20008 and used in a point cloud decoding procedure, or may be transferred to the renderer 20009 and used in a point cloud rendering procedure.

The point cloud video decoder 20006 may receive the bitstream and decode the video/image by performing an operation corresponding to the operation of the point cloud video encoder 20002. In this case, the point cloud video decoder 20006 may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The point cloud image decoder 20008 may receive a bitstream and perform a reverse process corresponding to the operation of the point cloud image encoder 20003. In this case, the point cloud image decoder 20008 may partition the point cloud image into a geometry image, an attribute image, an occupancy map image, and metadata, which is, for example, auxiliary patch information, to decode the same.

The 3D geometry may be reconstructed based on the decoded geometry video/image, the occupancy map, and auxiliary patch information, and then may be subjected to a smoothing process. The color point cloud image/picture may be reconstructed by assigning a color value to the smoothed 3D geometry based on the texture video/image. The renderer 20009 may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker 20007 and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker 20007, the transmitter may efficiently encode only the media data of the specific area, that is, the area indicated by the orientation information and/or the viewport information, or generate and transmit a file therefor.

The renderer 20009 may render the decoded point cloud data in a 3D space. The rendered video/image may be displayed through the display. The user may view all or part of the rendered result through a VR/AR display or a typical display.

The feedback process may include transferring various feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/autonomous driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

Figure 21:
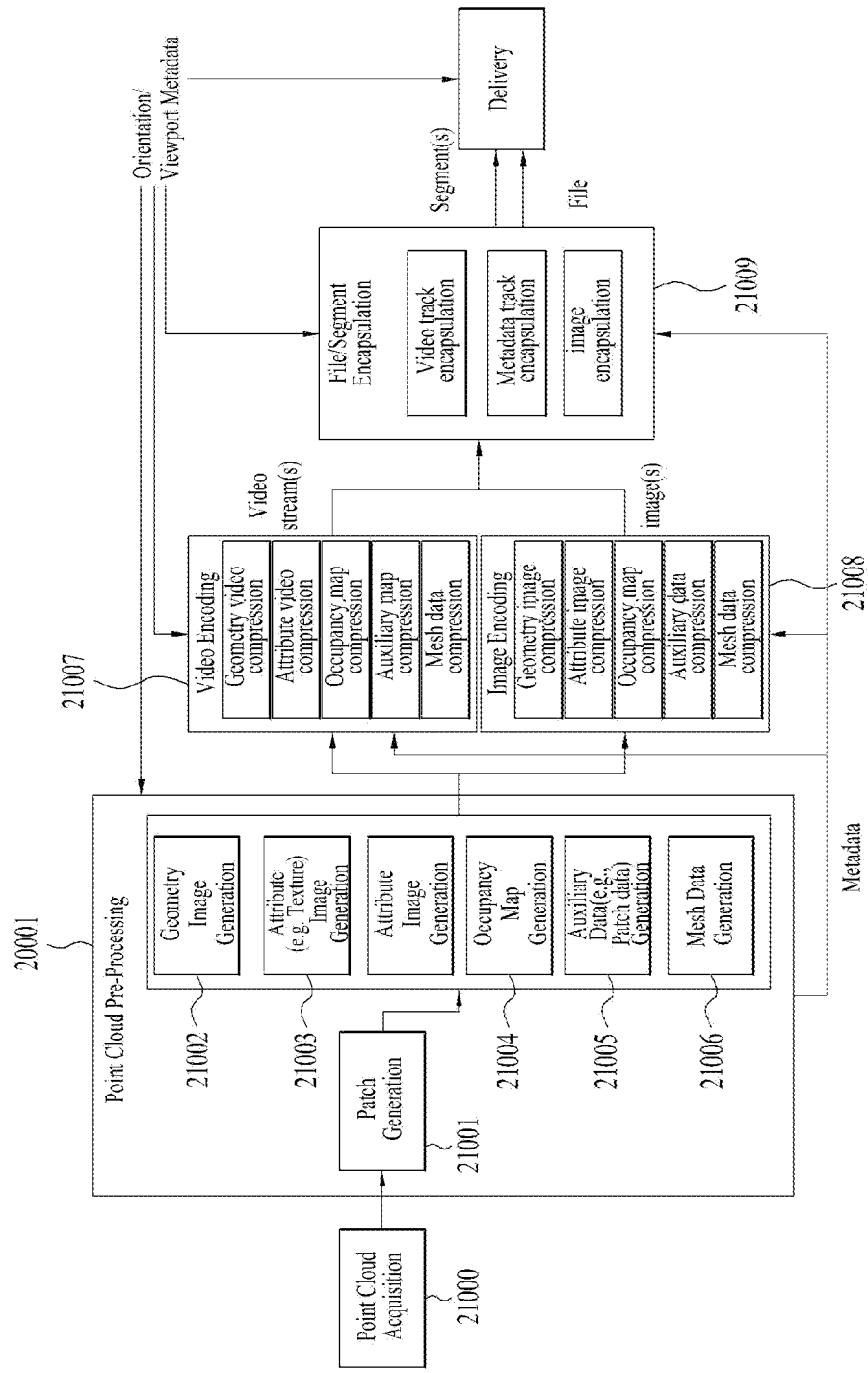
FIG. 21 is an exemplary block diagram of a device for storing and transmitting point cloud data according to embodiments.

FIG. 21 is an exemplary block diagram of a device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, occupancy map, auxiliary data (or auxiliary information), and mesh data of the point cloud may each be configured as a separate stream or stored in different tracks in a file. Furthermore, they may be included in a separate segment.

A point cloud acquirer 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated. A patch generator 21001 generates patches from the point cloud data. The patch generator 21001 generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a point cloud pre-processor 20001 or a controller (not shown). The point cloud pre-processor 20001 may include a patch generator 21001, a geometry image generator 21002, an attribute image generator 21003, an occupancy map generator 21004, an auxiliary data generator 21005, and a mesh data generator 21006.

The geometry image generator 21002 generates a geometry image based on the result of the patch generation. Geometry represents a point in a 3D space. The geometry image is generated using the occupancy map, which includes information related to 2D image packing of the patches, auxiliary data (including patch data), and/or mesh data based on the patches. The geometry image is related to information such as a depth (e.g., near, far) of the patch generated after the patch generation.

The attribute image generator 21003 generates an attribute image. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

The occupancy map generator 21004 generates an occupancy map from the patches. The occupancy map includes information indicating presence or absence of data in the pixel, such as the corresponding geometry or attribute image.

The auxiliary data generator 21005 generates auxiliary data (or auxiliary information) including information about the patches. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

The mesh data generator 21006 generates mesh data from the patches. Mesh represents connection between neighboring points. For example, it may represent data of a triangular shape. For example, the mesh data refers to connectivity between the points.

A point cloud pre-processor 20001 or controller generates metadata related to patch generation, geometry image generation, attribute image generation, occupancy map generation, auxiliary data generation, and mesh data generation.

The point cloud transmission device performs video encoding and/or image encoding in response to the result generated by the point cloud pre-processor 20001. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map video compression, auxiliary data compression, and/or mesh data compression. The video encoder 21007 generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map image compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder 21007 and/or the image encoder 21008 may receive metadata from the point cloud pre-processor 20001. The video encoder 21007 and/or the image encoder 21008 may perform each encoding process based on the metadata.

A file/segment encapsulator 21009 encapsulates the video stream(s) and/or image(s) in the form of a file and/or segment. The file/segment encapsulator 21009 performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The file/segment encapsulator 21009 may receive metadata from the point cloud pre-processor 20001. The file/segment encapsulator 21009 may perform encapsulation based on the metadata.

A file and/or a segment generated by the file/segment encapsulator 21009 are transmitted by the point cloud transmission device or the transmitter. For example, the segment(s) may be delivered based on a DASH-based protocol.

The deliverer may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD.

The file/segment encapsulator 21009 according to the embodiments may partition and store one bitstream or individual bitstreams into one or a plurality of tracks in a file, and encapsulate signaling information for this. In addition, a patch (or atlas) stream included in the bitstream may be stored as a track in the file, and related signaling information may be stored. Furthermore, the SEI message present in the bitstream may be stored in a track in the file, and related signaling information may be stored.

The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the point cloud pre-processor 20001, the video encoder 21007, the image encoder 21008, the file/segment encapsulator 21009, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the point cloud pre-processor 20001 may perform the above-described operation on all the point cloud data or on the point cloud data indicated by the orientation information and/or the viewport information. The video encoder 21007 and/or the image encoder 21008 may perform the above-described operation on all the point cloud data or on the point cloud data indicated by the orientation information and/or the viewport information. The file/segment encapsulator 21009 may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

Figure 22:
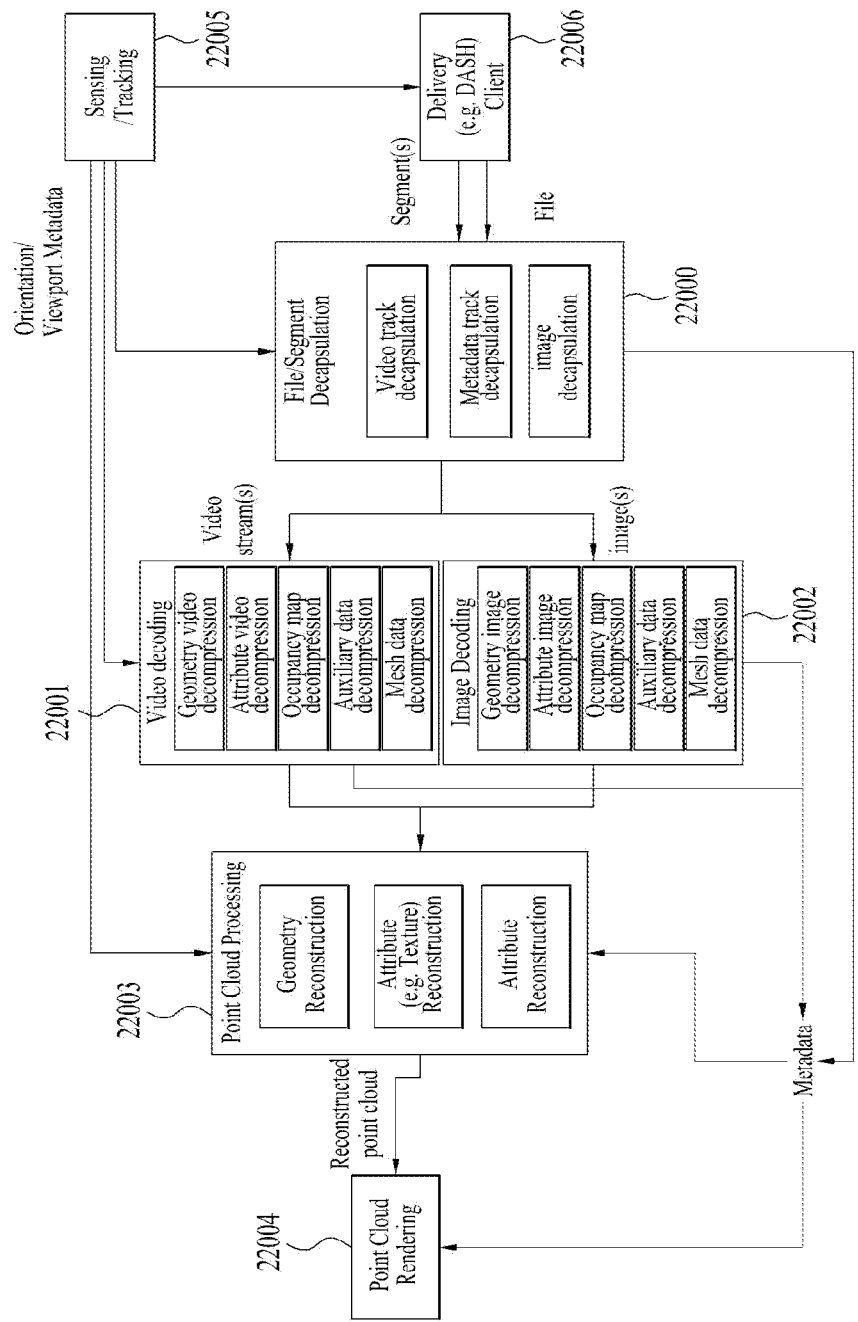
FIG. 22 is an exemplary block diagram of a point cloud data reception device according to embodiments.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20 and FIG. 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud data may be received through a digital storage medium. The receiver may include a process of decoding the received data and rendering the received data according to the user viewport. The reception processor may perform processing on the received point cloud data according to a transmission protocol. A delivery client (or reception processor) 22006 may be included in the receiver or configured as a separate component/module. The reception processor may reversely perform the process of the transmission processor described above so as to correspond to the processing for transmission performed at the transmitting side. The reception processor may deliver the acquired point cloud data to the file/segment decapsulator 22000 and the acquired point cloud related metadata to the metadata processor (not shown).

The sensor/tracker 22005 acquires orientation information and/or viewport information. The sensor/tracker 22005 may deliver the acquired orientation information and/or viewport information to the delivery client 22006, the file/segment decapsulator 22000, the point cloud decoder 22001 and 22002, and the point cloud processor 22003.

The delivery client 22006 may receive all point cloud data or the point cloud data indicated by the orientation information and/or the viewport information based on the orientation information and/or the viewport information. The file/segment decapsulator 22000 may decapsulate all point cloud data or the point cloud data indicated by the orientation information and/or the viewport information based on the orientation information and/or the viewport information. The point cloud decoder (the video decoder 22001 and/or the image decoder 22002) may decode all point cloud data or the point cloud data indicated by the orientation information and/or the viewport information based on the orientation information and/or the viewport information. The point cloud processor 22003 may process all point cloud data or the point cloud data indicated by the orientation information and/or the viewport information based on the orientation information and/or the viewport information.

The file/segment decapsulator 22000 performs video track decapsulation, metadata track decapsulation, and/or image decapsulation. The file/segment decapsulator 22000 may decapsulate the point cloud data in the form of a file received from the reception processor. The file/segment decapsulator 22000 may decapsulate files or segments according to ISOBMFF, etc., to acquire a point cloud bitstream or point cloud-related metadata (or a separate metadata bitstream). The acquired point cloud bitstream may be delivered to the point cloud decoders 22001 and 22002, and the acquired point cloud-related metadata (or metadata bitstream) may be delivered to the metadata processor (not shown). The point cloud bitstream may include the metadata (metadata bitstream). The metadata processor may be included in the point cloud video decoder or may be configured as a separate component/module. The point cloud-related metadata acquired by the file/segment decapsulator 22000 may take the form of a box or track in a file format. The file/segment decapsulator 22000 may receive metadata necessary for decapsulation from the metadata processor, when necessary. The point cloud-related metadata may be delivered to the point cloud decoders 22001 and 22002 and used in a point cloud decoding procedure, or may be delivered to the renderer 22004 and used in a point cloud rendering procedure. The file/segment decapsulator 22000 may generate metadata related to the point cloud data.

In the video track decapsulation by the file/segment decapsulator 22000, a video track contained in the file and/or segment is decapsulated. Video stream(s) including a geometry video, an attribute video, an occupancy map, auxiliary data, and/or mesh data are decapsulated.

In the metadata track decapsulation by the file/segment decapsulator 22000, a bitstream including metadata related to the point cloud data and/or auxiliary data is decapsulated.

In the image decapsulation by the file/segment decapsulator 22000, image(s) including a geometry image, an attribute image, an occupancy map, auxiliary data and/or mesh data are decapsulated.

The in the file/segment decapsulator 22000 according to the embodiments may store one bitstream or individually bitstreams in one or multiple tracks in a file, and may also decapsulate signaling information therefor. In addition, the atlas (or patch) stream included in the bitstream may be decapsulated based on a track in the file, and related signaling information may be parsed. Furthermore, an SEI message present in the bitstream may be decapsulated based on a track in the file, and related signaling information may be also acquired.

The video decoder 22001 performs geometry video decompression, attribute video decompression, occupancy map decompression, auxiliary data decompression, and/or mesh data decompression. The video decoder 22001 decodes the geometry video, the attribute video, the auxiliary data, and/or the mesh data in a process corresponding to the process performed by the video encoder of the point cloud transmission device according to the embodiments.

The image decoder 22002 performs geometry image decompression, attribute image decompression, occupancy map decompression, auxiliary data decompression, and/or mesh data decompression. The image decoder 22002 decodes the geometry image, the attribute image, the auxiliary data, and/or the mesh data in a process corresponding to the process performed by the image encoder of the point cloud transmission device according to the embodiments.

The video decoder 22001 and the image decoder 22002 according to the embodiments may be processed by one video/image decoder as described above, and may be performed along separate paths as illustrated in the figure.

The video decoder 22001 and/or the image decoder 22002 may generate metadata related to the video data and/or the image data.

In point cloud processor 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor 22003 according to the embodiments performs a plurality of attribute reconstructions.

The point cloud processor 22003 may receive metadata from the video decoder 22001, the image decoder 22002, and/or the file/segment decapsulator 22000, and process the point cloud based on the metadata.

The point cloud renderer 22004 renders the reconstructed point cloud. The point cloud renderer 22004 may receive metadata from the video decoder 22001, the image decoder 22002, and/or the file/segment decapsulator 22000, and render the point cloud based on the metadata.

The display displays the result of rendering on an actual display device.

According to the method/device according to the embodiments, as shown in FIG. 20 to FIG. 22, the transmitting side may encode the point cloud data into a bitstream, encapsulate the bitstream in the form of a file and/or segment, and transmits the same. The receiving side may decapsulate the file and/or segment into a bitstream containing the point cloud, and may decode the bitstream into point cloud data. For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The encapsulation operation described above may be performed by the file/segment encapsulator 20004 of FIG. 20, the file/segment encapsulator 21009 of FIG. 21. The decapsulation operation described above may be performed by the file/segment decapsulator 20005 of FIG. 20 or the file/segment decapsulator 22000 of FIG. 22.

Figure 23:
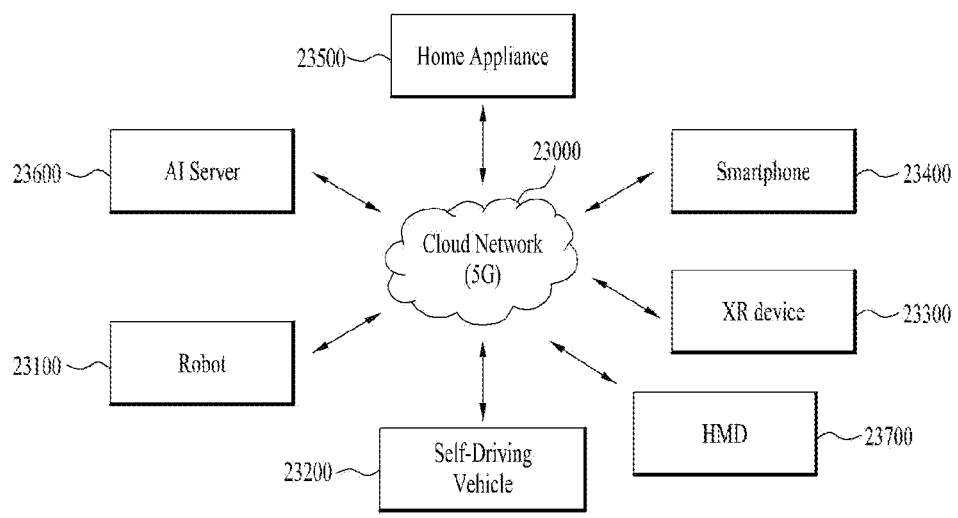
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 23600, a robot 23100, a self-driving vehicle 23200, an XR device 23300, a smartphone 23400, a home appliance 23500 and/or a head-mount display (HMD) 23700 is connected to a cloud network 23000. Here, the robot 23100, the self-driving vehicle 23200, the XR device 23300, the smartphone 23400, or the home appliance 23500 may be referred to as a device. In addition, the XR device 23300 may correspond to a point cloud data (PCC) device according to embodiments or may be operatively connected to the PCC device.

The cloud network 23000 may represent a network that constitutes part of the cloud computing infrastructure or is present in the cloud computing infrastructure. Here, the cloud network 23000 may be configured using a 3G network, 4G or Long Term Evolution (LTE) network, or a 5G network.

The server 23600 may be connected to at least one of the robot 23100, the self-driving vehicle 23200, the XR device 23300, the smartphone 23400, the home appliance 23500, and/or the HMD 23700 over the cloud network 23000 and may assist at least a part of the processing of the connected devices 23100 to 23700.

The HMD 23700 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 23100 to 23500 to which the above-described technology is applied will be described. The devices 23100 to 23500 illustrated in FIG. 23 may be operatively connected/coupled to a point cloud data transmission and reception device according to the above-described embodiments.

<PCC+XR>

The XR/PCC device 23300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 23300 may analyze 3D point cloud data or image data acquired through various sensors or from an external device and generate position data and attribute data about 3D points. Thereby, the XR/PCC device 23300 may acquire information about the surrounding space or a real object, and render and output an XR object. For example, the XR/PCC device 23300 may match an XR object including auxiliary information about a recognized object with the recognized object and output the matched XR object.

<PCC+Self-Driving+XR>

The self-driving vehicle 23200 may be implemented as a mobile robot, a vehicle, an unmanned aerial vehicle, or the like by applying the PCC technology and the XR technology.

The self-driving vehicle 23200 to which the XR/PCC technology is applied may represent an autonomous vehicle provided with means for providing an XR image, or an autonomous vehicle that is a target of control/interaction in the XR image. In particular, the self-driving vehicle 23200, which is a target of control/interaction in the XR image, may be distinguished from the XR device 23300 and may be operatively connected thereto.

The self-driving vehicle 23200 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to the self-driving vehicle 23200 that provides a self-driving service.

The self-driving vehicle 23200 that provides the self-driving service is connected to a PCC device for wired/wireless communication.

When the point cloud compression data transmission and reception device (PCC device) according to the embodiments is connected to self-driving vehicle 23200 for wired/wireless communication, the device may receive and process content data related to an AR/VR/PCC service that may be provided together with the self-driving service and transmit the processed content data to the self-driving vehicle 23200. In the case where the point cloud data transmission and reception device is mounted on the self-driving vehicle 23200, the point cloud transmitting and reception device may receive and process content data related to the AR/VR/PCC service according to a user input signal input through a user interface device and provide the processed content data to the user. The self-driving vehicle 23200 or the user interface device according to the embodiments may receive a user input signal. The user input signal according to the embodiments may include a signal indicating the self-driving service.

As described above, the V-PCC-based point cloud video encoder of FIG. 1, 4, 18, 20, or 21 projects 3D point cloud data (or content) into a 2D space to generate patches. The patches are generated in the 2D space by dividing the data into a geometry image representing position information (referred to as a geometry frame or a geometry patch frame) and a texture image representing color information (referred to as an attribute frame or an attribute patch frame). The geometry image and the texture image are video-compressed for each frame, and a video bitstream of the geometry image (referred to as a geometry bitstream) and a video bitstream of the texture image (referred to as an attribute bitstream) are output. In addition, auxiliary patch information (also referred to as patch information or metadata) including projection plane information and patch size information about each patch, which are needed to decode a 2D patch at the receiving side, is also video-compressed and a bitstream of the auxiliary patch information is output. In addition, the occupancy map, which indicates presence/absence of a point for each pixel as 0 or 1, is entropy-compressed or video-compressed depending on whether it is in a lossless mode or a lossy mode, and a video bitstream of the occupancy map (or referred to as an occupancy map bitstream) is output. The compressed geometry bitstream, the compressed attribute bitstream, the compressed auxiliary patch information bitstream, and the compressed occupancy map bitstream are multiplexed into a structure of a V-PCC bitstream.

According to embodiments, the V-PCC bitstream may be transmitted to the receiving side as it is, or may be encapsulated in a file/segment form by the file/segment encapsulator of FIG. 1, 18, 20, or 21 and transmitted to the reception device or stored in a digital storage medium (e.g., USB, SD, CD, DVD, Blu-ray, HDD, SSD, etc.). According to an embodiment of the present disclosure, the file is in a file format ISOBMFF.

According to embodiments, the V-PCC bitstream may be transmitted through multiple tracks in a file, or may be transmitted through one single track. Details will be described later.

Figure 24:
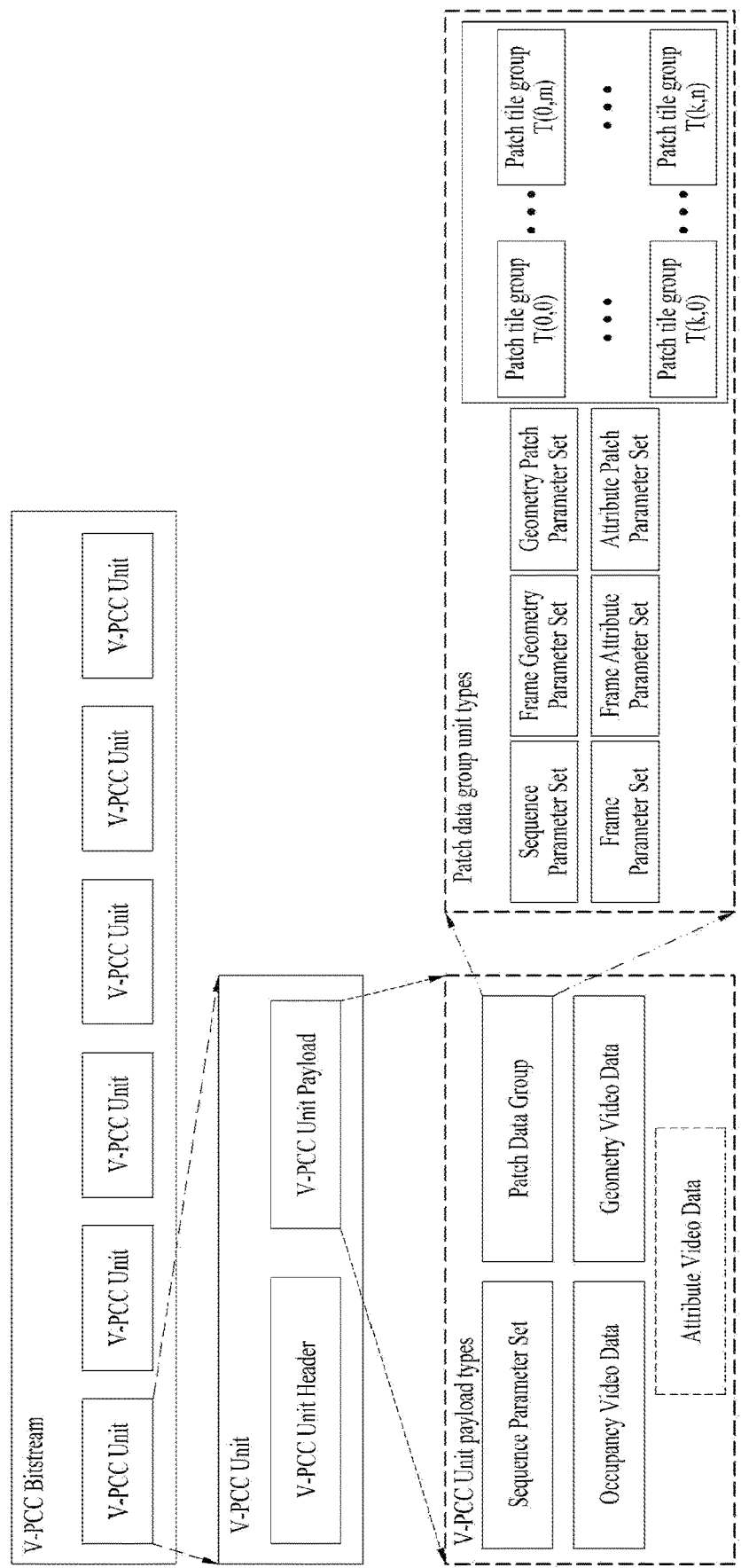
FIG. 24 shows an exemplary structure of a V-PCC bitstream according to embodiments.

FIG. 24 shows an exemplary structure of a V-PCC bitstream according to embodiments. According to an embodiment, the V-PCC bitstream of FIG. 24 is output from the V-PCC-based point cloud video encoder of FIG. 1, 4, 18, 20, or 21.

The V-PCC bitstream is composed of one or more V-PCC units. That is, the V-PCC bitstream is a set of V-PCC units. Each V-PCC unit consists of a V-PCC unit header and a V-PCC unit payload. In the present disclosure, data contained in the V-PCC unit payload is distinguished by the V-PCC unit header. To this end, the V-PCC unit header contains type information indicating the type of the V-PCC unit. Each V-PCC unit payload may contain at least one of geometry video data (i.e., a compressed geometry bitstream), attribute video data (i.e., a compressed attribute bitstream), occupancy video data (i.e., a compressed occupancy map bitstream), a patch data group (PDG), or a sequence parameter set (SPS) according to the type information in the V-PCC unit header. The PDG is also referred to as an atlas. In the present disclosure, the atlas may replace the PDG.

V-PCC unit payloads containing at least geometry video data, attribute video data, and occupancy map video data (also referred to as occupancy video data) correspond to video data units (e.g., HEVC NAL units) which are decodable by an appropriate video decoder.

The geometry video data, attribute video data, and occupancy map video data are referred to as 2D video encoded information for the geometry, attribute, and occupancy map components of the encoded point cloud, and the PDG (or atlas) is referred to as non-video encoded information. The PDG includes auxiliary patch information. The SPS includes overall encoding information about the bitstream, and is also referred to as configuration and metadata information. The SPS and the PDG may be referred to as signaling information, and may be generated by the metadata processor in the point cloud video encoder or by a separate component/module in the point cloud video encoder. In addition, in the present disclosure, the SPS and the PDG are referred to as initialization information, and the geometry video data, attribute video data, and occupancy map video data are referred to as point cloud data.

In one embodiment, when the type information in the V-PCC unit header indicates VPCC_PDG, the corresponding V-PCC unit payload may include a patch data group. Conversely, when the V-PCC unit payload incudes a patch data group, the type information in the corresponding V-PCC unit header may identify the same. This is an option of the designer, and accordingly the present disclosure is not limited to the above-described embodiment. The other V-PCC units are configured in the same or similar manner.

A patch data group is contained in the V-PCC unit payload in the format of patch_data_group( ). The patch data group may contain information about one or more patch tile groups and at least one of a patch sequence parameter set, a patch frame parameter set, a patch frame geometry parameter set, a geometry patch parameter set, a patch frame attribute parameter set, or an attribute patch parameter set.

A patch frame (also referred to as a point cloud object), which is a target of point cloud data, may be divided into one or multiple tiles. A tile according to embodiments may represent a certain region in a 3D space or a certain region in a 2D plane. In addition, the tile may be a rectangular cuboid in one bounding box or a part of a sub-bounding box or patch frame. In the present disclosure, dividing a patch frame (or point cloud object) into one or multiple tiles may be performed by the point cloud video encoder of FIG. 1, the patch generator of FIG. 18, the point cloud pre-processing unit of FIG. 20, or the patch generator of FIG. 21 or by a separate component/module.

According to embodiments, the V-PCC bitstream having the structure as shown in FIG. 24 may be transmitted to the receiving side as it is, or may be encapsulated in a file/segment form and transmitted to the receiving side.

According to an embodiment of the present disclosure, the V-PCC bitstream is encapsulated in a file format and transmitted. For example, the V-PCC bitstream may be encapsulated in a file format based on ISOBMFF (ISO Base Media File Format).

According to an embodiment, encapsulation of the V-PCC bitstream into a file is performed by the file/segment encapsulator 10003 of FIG. 1, the transmitter 18008 of FIG. 18, the file/segment encapsulator 20004 of FIG. 20, or the file/segment encapsulator 21009 of 21. According to an embodiment, decapsulation of the file into the V-PCC bitstream is performed by the file/segment decapsulator 10007 of FIG. 1, the receiver of FIG. 19, the file/segment decapsulator 20005 of FIG. 20, or the file/segment decapsulator 22000 of FIG. 22.

Figure 25:
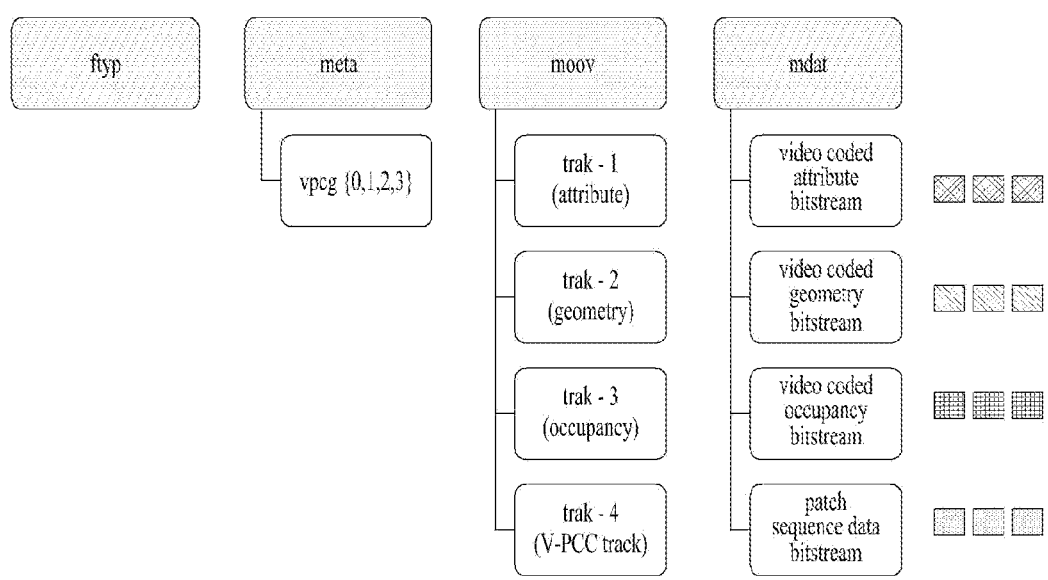
FIG. 25 is a diagram illustrating a structure of a multi-track V-PCC file according to embodiments.

FIG. 25 is a diagram illustrating a structure of a multi-track V-PCC file according to embodiments. That is, an example of the layout of an ISOBMFF-based file containing multiple tracks is shown.

An ISOBMFF-based file according to embodiments may be referred to as a container, a container file, a media file, a V-PCC file, or the like. Specifically, the file may be composed of a box and/or information, which may be referred to as ftyp, meta, moov, or mdat.

The ftyp box (file type box) may provide information related to a file type or file compatibility for the file. The receiving side may identify the file with reference to the ftyp box.

The meta box may include a vpcg{0,1,2,3} box (V-PCC Group Box), which will be described in detail below.

The mdat box, which is also referred to as a media data box, may contain a video-coded geometry bitstream, a video-coded attribute bitstream, a video-coded occupancy map bitstream, and a patch data group bitstream.

The moov box, which is also referred to as a movie box, may contain metadata about the media data (e.g., a geometry bitstream, an attribute bitstream, an occupancy map bitstream, etc.) of the file. For example, it may contain information necessary for decoding and playback of the media data, and information about samples of the file. The moov box may serve as a container for all metadata. The moov box may be a box of the highest layer among the metadata related boxes. According to an embodiment, only one moov box may be present in a file.

According to an embodiment, in the ISOBMFF container structure as shown in FIG. 25, V-PCC units included in the V-PCC bitstream are mapped to individual tracks in a file based on the types thereof.

Based on the layout shown in FIG. 25, the ISOBMFF container for the V-PCC bitstream may include the following:

1) A V-PCC track. The V-PCC track contains sequence parameter sets and samples carrying the payloads of V-PCC units including non-video-encoded information (e.g., type information indicating the type of the corresponding V-PCC unit in the V-PCC unit header indicates SPS or PDG). The V-PCC track may also provide track references to other tracks containing samples carrying the payloads of V-PCC units containing video-compressed information (e.g., the type information in the V-PCC unit header indicates geometry video data, attribute video data, or occupancy map video data).

2) One or more restricted video scheme tracks for geometry video data. The samples included in these tracks contain NAL units for video-coded elementary streams for geometry video data. In this case, the type information in the V-PCC unit header indicates geometry video data, and the NAL units correspond to payloads carrying the geometry video data.

3) One or more restricted video scheme tracks for attribute video data. The samples included in these tracks contain NAL units for video-coded elementary streams for attribute video data. In this case, the type information in the V-PCC unit header indicates attribute video data, and the NAL units correspond to payloads carrying the attribute video data.

4) A restricted video scheme track for occupancy map data. The samples included in these tracks contain NAL units for video-coded elementary streams for occupancy map video data. In this case, the type information in the V-PCC unit header indicates occupancy map video data, and the NAL units correspond to payloads carrying the occupancy map video data.

According to embodiments, tracks including video-coded elementary streams for the geometry video data, attribute video data, and occupancy map video data are referred to as component tracks.

According to an embodiment, synchronization between the elementary streams contained in the component tracks is handled by the ISOBMFF track timing structures (stts, ctts, and cslg, or equivalent mechanisms in movie fragments). Samples that contribute to the same point cloud frame across different video encoded component tracks and the V-PCC track may have the same composition time.

The V-PCC parameter sets used for such samples may have a decoding time equal or prior to the composition time of the frame.

An ISOBMFF file carrying V-PCC content may be distinguished with V-PCC defined brand(s). Tracks of V-PCC content may be grouped inside a VPCCGroupBox, which is a file-level EntityToGroupBox with a V-PCC specific grouping 4CC value ('vpcg'). The VPCCGroupBox may serves as an entry point to access the V-PCC content in the container and contain initial metadata describing the V-PCC content. The VPCCGroupBox which is an EntityToGroupBox, may be included in the MetaBox box or the Moov box.

An entity group may be a grouping of items that group tracks. Entities in the entity group may share a specific characteristic indicated by the grouping type or may have a specific relationship.

Entity groups are indicated in the GroupsListBox. GroupsListBox may be included in at least one of a file-level MetaBox, a movie-level MetaBox, or a track-level MetaBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track.

GroupsListBox contains EntityToGroupBoxes, each specifying one entity group as follows.

Groups List box
Box Type: 'grpl'
Container: MetaBox that is not contained in AdditionalMetadataContainerBox
Mandatory: No
Quantity: Zero or One The GroupsListBox includes the entity groups specified for the file. This box contains a set of full boxes, each called an EntityToGroupBox, with four-character codes denoting a defined grouping type.

The GroupsListBox shall not be present in AdditionalMetadataContainerBox.

When GroupsListBox is present in a file-level MetaBox, there may be no item_ID value in ItemInfoBox in any file-level MetaBox that is equal to the track_ID value in any TrackHeaderBox.

```
aligned(8) class GroupsListBox extends Box('grpl') {
}
Box Type:      As specified below with the grouping_type value for the
               EntityToGroupBox
Container:     GroupsListBox
Mandatory:     No
Quantity:      One or more
```

The EntityToGroupBox specifies an entity group.

The box type (grouping_type) indicates the grouping type of the entity group. Each grouping_type code is associated with semantics that describe the grouping. The following grouping_type value is specified:

'altr': The items and tracks mapped to this grouping are alternatives to each other, and only one of them may be played (when the mapped items and tracks are part of the presentation, e.g., displayable items or tracks) or processed by other means (when the mapped items or tracks are not part of the presentation, but are, for example, metadata). A player may select a first entity from the list of entity_id values that it can process, for example, decode and play for mapped items and tracks that are part of the presentation and that suits the application needs. Any entity_id value shall be mapped to only one grouping of type 'altr'. An alternate group of entities consists of items and tracks that are mapped to the same entity group of type 'altr'.

Note: EntityToGroupBox contains extensions specific to grouping_type.

```
     aligned(8) class EntityToGroupBox(grouping_type, version, flags)
extends FullBox(grouping_type, version, flags) {
          unsigned int(32) group_id;
          unsigned int(32) num_entities_in_group;
          for(i=0; i<num_entities_in_group; i++)
               unsigned int(32) entity_id;
     }
```

According to embodiments, group_id is a non-negative integer assigned to the particular grouping that is not equal to any group_id value of any other EntityToGroupBox, any item_ID value of the hierarchy level (file, movie, or track) that contains the GroupsListBox, or any track_ID value (when the GroupsListBox is contained in the file level).

According to embodiments, num_entities_in group specifies the number of entity_id values mapped to this entity group.

According to embodiments, entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

The following describes the V-PCC group box.
Box Type: 'vpcg'
Container: GroupListBox
Mandatory: Yes
Quantity: One or more The V-PCC group box is included in GroupsListBox and provides a list of the tracks that comprise V-PCC content.

V-PCC content specific information, such as mapping of the attribute types and layers to the related tracks, are listed in this box. This information provides a convenient way to have an initial understanding of the V-PCC content. For flexible configuration of V-PCC content supporting a variety of different client capabilities, multiple versions of encoded V-PCC components are listed in this box. V-PCC defined profile, tier, and level information are also carried in this box.

```
aligned(8) class VPCCGroupBox( ) extends EntityToGroupBox('vpcg',
version, flags) {
     for (i=0;i<num_entities_in_group;i++){
          unsigned int(4)           data_type;
          unsigned int(4)           attribute_type;
          unsigned int(1)           multiple_layer_present_flag;
          unsigned int(4)           layer_count_munus1;
          for (i=0;i<layer_count_minus1+1;i++){
               unsigned int(4)      layer_id;
          }
          unsigned int(32)          entity_id;
     }
     unsigned int(4)   PCC_layer_count_minus1;
     vpcc_profile_tier_level( )
}
```

According to embodiments, data_type indicates the track type of PCC data in the referenced track.

FIG. 26 is a table showing an example of track types of PCC data assigned to data_type according to embodiments. For example, data_type equal to 1 may indicate V-PCC track. data_type equal to 2 may indicate geometry video track. data_type equal to 3 may indicate attribute video track. data_type equal to 4 may indicate occupancy map video track.

According to embodiments, multiple_layer_present_flag indicates whether a single geometry or attribute layer or multiple geometry or attribute layers are carried the associated entity (or track). For example, multiple_layer_present_flag equal to 0 indicates that a single geometry or attribute layer is carried in the associated entity (or track). multiple_layer_present_flag equal to 1 indicates that multiple geometry or attribute layers are carried in the associated entity (or track). The V-PCC track according to embodiments (i.e., data_type indicates V-PCC track) shall have multiple_layer_present_flag equal to 0. As another example, when the data_type indicates the geometry video track, multiple_layer_present_flag equal to 0 may indicate that the geometry video track carries a single geometry layer, and multiple_layer_present_flag equal to 1 may indicate that the geometry video track carries multiple geometry layers. As another example, when the data_type indicates attribute video track, multiple_layer_present_flag equal to 0 may indicate that the attribute video track carries a single attribute layer, and multiple_layer_present_flag equal to 1 may indicate that the attribute video track carries multiple attribute layers.

According to embodiments, layer_count_minus1 plus 1 indicates the number of geometry or attribute layers carried in the associated entity (or track). The V-PCC track according to the embodiments has layer_count_minus1 equal to 0. For example, when the data_type indicates geometry video track, layer_count_minus1 plus 1 may indicate the number of geometry layers carried in the geometry video track. As another example, when the data_type indicates attribute video track, layer_count_minus1 plus 1 may indicate the number of attribute layers carried in the attribute video track.

According to embodiments, layer_id specifies the layer identifier of a geometry or attribute layer in the associated entity (or track). The V-PCC track according to the embodiments has layer_id equal to 0. The set of layer_id values for any V-PCC component track type, which are arranged in increasing order, is a contiguous set of integers starting from 0. As an example, when the data_type indicates geometry video track, layer_id may indicate the layer identifier of the geometry layers. As another example, when the data_type indicates attribute video track, layer_id may indicate the layer identifier of the attribute layers.

According to embodiments, pcc_layer_count_minus1 plus 1 indicates the number of layers used for encoding of the geometry and attribute components of point cloud streams. As an example, when the data_type indicates geometry video track, pcc_layer_count_munus1 plus 1 may indicate the number of layers used to encode the geometry components of point cloud streams. As another example, when the data_type indicates the attribute video track, pcc_layer_count_munus1 plus 1 may indicate the number of layers used to encode the attribute components of point cloud streams.

According to embodiments, attribute_type indicates the attribute type of the attribute video data carried in the referenced entity (or track).

FIG. 27 is a table showing an example of attribute types assigned to attribute_type according to embodiments. For example, attribute_type equal to 0 may indicate Texture, and attribute_type equal to 1 may indicate Material ID. attribute_type equal to 2 may indicate Transparency, attribute_type equal to 3 may indicate Reflectance, and attribute_type equal to 4 may indicate Normals.

According to embodiments, entity_id specifies the identifier for the associated item or track. It is resolved to an item when an item with item_ID equal to entity_id is present in the hierarchy level (file, movie or track) that contains the GroupsListBox, or to a track when a track with track_ID equal to entity_id is present and the GroupsListBox is contained in the file level.

vpcc_profile_tier_level( ) is the same as profile_tier_level( ) specified in sequence_parameter_set( ).

FIG. 28 shows an example of a syntax structure of profile_tier_level( ) according to embodiments.

The ptl_tier_flag field specifies the codec profile tier used for encoding of V-PCC content.

The ptl_profile_idc field indicates profile information to which the coded point cloud sequence conforms.

The ptl_level_idc field indicates a level of the codec profile to which the coded point cloud sequence conforms.

Next, the V-PCC track will be described.

The entry point for each V-PCC content may be represented by a unique V-PCC track. An ISOBMFF file may contain multiple V-PCC contents, and therefore multiple V-PCC tracks may be present in the file. A V-PCC track shall be identified by the volumetric visual media handler type 'volm' in the HandlerBox of the MediaBox.

Box Type: 'vohd'
Container: MediaInformationBox
Mandatory: Yes
Quantity: Exactly one
Volumetric tracks use the VolumetricMediaHeaderBox in the MediaInformationBox
aligned(8) class VolumetricMediaHeaderBox extends FullBox('vohd', version = 0, 1) {
    // if we don't need anything here, then use Null Media Header
}
//random access point for the patch stream Random access point for the V-PCC track may be samples carrying an I patch frame with an empty decoder buffer. In order to indicate random access point for the V-PCC track, the syncsampleBox is present. The sync sample indicates sync samples carrying an I patch frame.

The SyncSampleBox should be present in the SampleTableBox if some samples in the track, including any track fragments, are non-sync samples, but the flag sample_is_non_sync_sample of samples in track fragments is valid and describes the samples, even if the SyncSampleBox is not present. If the track is not fragmented and the SyncSampleBox is not present, all samples in the track are sync samples.

Box Type:         'stbl'
Container:        MediaInformationBox
Mandatory:        Yes
Quantity:         Exactly one
aligned(8) class SampleTableBox extends Box('stbl') {
}
Box Type:         'stss'
Container:        SampleTableBox
Mandatory:        No
Quantity:         Zero or one This box provides a compact marking of sync samples within the stream. The table is arranged in strictly ascending order of sample number. If the SyncSampleBox is not present, every sample is a sync sample.

aligned(8) class SyncSampleBox extends FullBox('stss', version = 0, 0) {
    unsigned int(32)    entry_count;
    int i;
    for (i=0; i < entry_count; i++) {
        unsigned int(32)sample_number;
    }
}

'version' is an integer and represents the version of this box.

entry_count is an integer that gives the number of entries in the following table. If entry_count is zero, there are no sync samples within the stream and the following table is empty.

sample_number gives, for each sync sample in the stream, its sample number. In particular, sample_number gives, for each sync sample carrying I-patch frame in the V-PCC track, its sample number.

The V-PCC track sample entry is described below.
Sample Entry Type: 'vpc1'
Container: SampleDescriptionBox ('stsd')
Mandatory: A 'vpc1' sample entry is mandatory
Quantity: one or more The track sample entry type 'vpc1' is used. A VPCC track sample entry contains a VPCC Configuration Box, as defined below. This includes a VPCCDecoderConfigurationRecord, as defined. An optional BitRateBox may be present in the VPCC track sample entry to signal the bit rate information of the VPCC video stream.

aligned(8) class VPCCDecoderConfigurationRecord {
    unsigned int(8) configurationVersion = 1;
    unsigned int(8) numOfSequenceParameterSets;
    for (i=0; i<numOfSequenceParameterSets; i++) {
        sequence_parameter_set( );
    }
    // additional fields
}
class VPCCConfigurationBox extends Box('vpcc') {
    VPCCDecoderConfigurationRecord( ) VPCCConfig;
}
aligned(8) class VPCCSampleEntry( ) extends VolumetricSampleEntry ('vpc1') {

```
    VPCCConfigurationBox config;
}
class VolumetricSampleEntry(codingname) extends SampleEntry
(codingname){
}
``` configurationVersion is a version field. Incompatible changes to the record are indicated by a change in the version number.

numOfSequenceParameterSets represents the number of V-PCC sequence parameter sets signaled in the decoder configuration record.

Compressorname in the base class VisualSampleEntry indicates the name of the compressor used with the value "\012VPCC Coding" being recommended.

The V-PCC specification allows multiple instances of VPCC_SPS units (with ids from 1 to 15). Therefore, VPCCSampleEntry contains multiple sequence_parameter_set unit payloads.

The V-PCC sample format is described below.

Each sample in the V-PCC track corresponds to a single point cloud frame.

Samples corresponding to this frame in the various component tracks have the same composition time as the V-PCC track sample for the frame in the V-PCC track.

Each V-PCC sample only contains one V-PCC unit payload for which the type information in the V-PCC unit header indicates patch data group (PDG). This V-PCC unit payload includes one or more patch tile group unit payloads as shown in FIG. 24.

```
    aligned(8) class vpcc_unit_payload_struct {
        vpcc_unit_payload( );
    }
    aligned(8) class VPCCSample {
        vpcc_unit_payload_struct( );
    }
``` vpcc_unit_payload( ) is a payload of a V-PCC unit for which the type information in the V-PCC unit header indicates PDG, and contains one patch_data_group_unit( ) instance.

For the V-PCC track, a sample carrying the I-patch frame is defined as a sync sample.

Next, V-PCC track referencing is described below.

To link a V-PCC track to component video tracks, the track reference tool of the ISOBMFF standard is used. Three TrackReferenceTypeBoxes are added to a TrackReferenceBox within the TrackBox of the V-PCC track, one for each component.

The TrackReferenceTypeBox contains an array of track_IDs designating the video tracks which the V-PCC track references.

The reference_type in TrackReferenceTypeBox identifies the type of the component (i.e., geometry, attribute, or occupancy map). The 4CCs of the new track reference types include 'pcca', 'pccg', and 'pcco'.

In the type 'pcca', the referenced track(s) contain the video-coded attribute V-PCC component.

In the type 'pccg', the referenced track(s) contain the video-coded geometry V-PCC component.

In the type 'pcco' type, the referenced track(s) contain the video-coded occupancy map V-PCC component.

Next, the video-encoded V-PCC component tracks are described below.

Since it is not meaningful to display the decoded frames from attribute, geometry, or occupancy map tracks without reconstructing the point cloud at the player side, a restricted video scheme type may be defined for these video-coded tracks. V-PCC video tracks shall contain the 4CC identifier 'pccv'. The 4CC identifier 'pccv' is contained in the scheme_type field of the SchemeTypeBox of the RestrictedSchemeInfoBox of the Restricted Sample Entries.

The use of the V-PCC video scheme for the restricted video sample entry type 'resv' indicates that the decoded pictures contains attribute, geometry, or occupancy map data of point cloud.

The use of the V-PCC video scheme is indicated by scheme_type equal to 'pccv' (video-based point cloud video) within SchemeTypeBox in the RestrictedSchemeInfoBox.

This box is a container that contains boxes indicating V-PCC specific information of this track. The VPCCVideoBox provides PCC specific parameters which may be applied to all samples in the track.

```
Box Type: 'pccv'
Container: SchemeInformationBox
Mandatory: Yes, when scheme_type is equal to 'pccv'
Quantity: Zero or one
aligned(8) class VPCCVideoBox extends FullBox('vpcc', 0, 0) {
    unsigned int(4)        data_type;
    unsigned int(4)        attribute_count;
    for(int i=0; i<attribute_count+1;i++) {
        unsigned int(4)    attribute_type;
    }
    unsigned int(1)        multiple_layer_present_flag;
    unsigned int(4)        layer_count_minus1;
    for (i = 0 ; i< layer_count_minus1+1 ; i++) {
        unsigned int(4)    layer_id;
    }
}
``` data_type may indicate the type of data contains in a video sample included in a corresponding track.

FIG. 29 is a table showing an example of types of PCC data in a referenced track according to embodiments. For example, data_type indicates V-PCC track when equal to 1, indicates geometry video track when equal to 2, indicates attribute video track when equal to 3, and indicates occupancy map video track when equal to 4.

multiple_layer_present_flag indicates whether a single geometry or attribute layer or multiple geometry or attribute layers are carried in this track. For example, multiple_layer_present_flag equal to 0 may indicate that a single geometry or attribute layer is carried in this track. multiple_layer_present_flag equal to 1 may indicate that multiple geometry or attribute layers are carried in this track. As another example, when the data_type indicates the geometry video track, multiple_layer_present_flag equal to 0 may indicate that the geometry video track carries a single geometry layer, and multiple_layer_present_flag equal to 1 may indicate that the geometry video track carries multiple geometry layers. As another example, when the data_type indicates the attribute video track, multiple_layer_present_flag equal to 0 may indicate that the attribute video track carries a single attribute layer, and multiple_layer_present_flag equal to 1 may indicate that the attribute video track carries multiple attribute layers.

layer_count_minus1 plus 1 indicates the number of geometry and/or attribute layers carried in this track. For example, when the data_type indicates the geometry video track, layer_count_minus1 plus 1 may indicate the number of geometry layers carried in the geometry video track. As another example, when the data_type indicates the attribute video track, layer_count_minus1 plus 1 may indicate the number of attribute layers carried in the attribute video track.

layer_id specifies the layer identifier of geometry or attribute layers associated with the samples in the track. As an example, when the data_type indicates the geometry video track, layer_id may indicate the layer identifier of the geometry layers. As another example, when the data_type indicates the attribute video track, layer_id may indicate the layer identifier of the attribute layers. attribute_count may indicate the number of attribute data of a point cloud stream contained in the track. One or more attribute data may be contained in one track. In this case, according to an embodiment, the data_type indicates the attribute video track.

attribute_type indicates the attribute type of the attribute video data carried in the track.

FIG. 30 is a table showing an example of attribute types according to embodiments. For example, the attribute_type field indicates Texture when equal to 0, indicates Material ID when equal to 1, indicates Transparency when equal to 2, indicates Reflectance when equal to 3, and indicates Normals when equal to 4.

When a field value present in the VPCCVideoBox is included in signaling associated with an item, the information on the item (image) may be indicated.

Next, attribute sample grouping is described below.

When a track contains attribute data of a point cloud, it may contain data of one or more attribute types. In this case, the attribute type of data contained in the samples included in the corresponding track may be signaled as follows.

```
class PCCAttributeSampleGroupEntry extends
VisualSampleGroupEntry('pcca') {
    unsigned int(4)   attribute_type;
}
``` attribute_type indicates the attribute type of attribute video data carried in the associated samples in the track.

FIG. 31 is a table showing an example of attribute types according to embodiments. For example, the attribute_type field indicates Texture when equal to 0, indicates Material ID when equal to 1, indicates Transparency when equal to 2, indicates Reflectance when equal to 3, and indicates Normals when equal to 4.

Next, layer sample grouping is described below.

It may include data associated with one or more layers of the same data type (e.g., geometry data, attribute data) of a point cloud of the track. In this case, layer-related information about the data contained in the samples included in the track may be signaled as follows.

```
class PCCLayerSampleGroupEntry extends
VisualSampleGroupEntry('pccl'){
    unsigned int(4)       pcc_layer_count_minus1;
    unsigned int(4)       layer_id;
}
``` pcc_layer_count_minus1 plus 1 indicates the number of layers used for encoding of the geometry and attribute components of point cloud streams.

layer_id specifies the layer identifier for the associated samples in the track.

Next, layer tracking grouping is described below.

From the perspective of V-PCC, it is expected that, in addition to geometry, all other types of information (other than occupancy and patch information) may have the same number of layers. Moreover, all information (geometry/attributes) that is tagged with the same layer index relate to each other. That is, information tagged with the same layer index refers to the same reconstructed points in 3D space.

In order to construct an attribute with layer index M, a geometry layer with index M should also be available. If, for some reason, that geometry layer is missing, then such attribute information would be useless because both are "linked" together.

From a rendering perspective, such information may be considered as "augmenting" the reconstructed point cloud. Note that this means that it is possible to still obtain a reasonable reconstruction by discarding some layers. However, according to an embodiment, layer 0 is not discarded.

According to an embodiment, tracks belonging to the same layer have the same value of track_group_id for track_group_type 'pccl', and the track_group_id of tracks from one layer differs from the track_group_id of tracks from any other layer.

By default, when this track grouping is not indicated for any track in a file, the file is considered as containing content for one layer only.

```
aligned(8) class PCCLayerTrackGroupBox extends
TrackGroupTypeBox('pccl') {
    unsigned int(4) pcc_layer_count_minus1;
    unsigned int(4) layer_id;
}
``` pcc_layer_count_minus1 plus 1 indicates the number of layers used for encoding of the geometry/or attribute components of point cloud streams.

layer_id specifies the layer identifier for the associated pcc data (e.g., geometry and/or attribute) layer carried in the track.

This may inform the player of FIG. 20 or the renderer of FIG. 1, 19, 20, or 22 that data of tracks belonging to the same track group are available for reconstruction of the point cloud of the same layer.

As described above, in the present disclosure, signaling information for allowing a client/player to select and use an attribute bitstream as necessary is signaled in at least one of the V-PCC track and the attribute track.

In addition, according to the present disclosure, signaling information related to a random access point among samples in a V-PCC track is signaled in at least of the V-PCC track and the attribute track.

Accordingly, as the client/player is allowed to acquire signaling information related to the random access point and acquire and use a necessary attribute bitstream based on the signaling information, efficient and faster data processing may be implemented.

In addition, in the present disclosure, when geometry and/or attribute video data in a file is composed of multiple layers, track grouping information used together is signaled in at least one of a V-PCC track and a corresponding video track (i.e., a geometry track or an attribute track).

In addition, in the present disclosure, when geometry and/or attribute video data is composed of multiple layers in one track, sample grouping information for this is signaled in at least one of a V-PCC track and a corresponding video track (i.e., a geometry track or an attribute track).

In addition, in the present disclosure, when a plurality of attribute video data is contained in one track, sample grouping information for this is signaled in at least one of a V-PCC track and an attribute track.

A patch frame (or referred to as a point cloud object or an atlas frame) as a target of the point cloud data may be divided into one or multiple tiles as described above. A tile according to embodiments may represent a certain region in a 3D space or a certain region in a 2D plane. In addition, the tile may be a rectangular cuboid in one bounding box or a part of a sub-bounding box or patch frame. In the present disclosure, dividing a patch frame (or point cloud object) into one or multiple tiles may be performed by the point cloud video encoder of FIG. 1, the patch generator of FIG. 18, the point cloud pre-processing unit of FIG. 20, or the patch generator of FIG. 21 or by a separate component/module.

Figure 32:
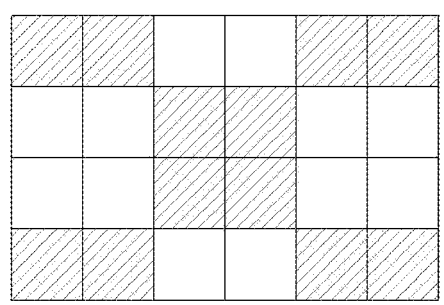
FIG. 32 shows an example of dividing a patch frame into a plurality of tiles by dividing the patch frame into one or more tile rows and one or more tile columns.

FIG. 32 shows an example of dividing a patch frame into a plurality of tiles by dividing the patch frame into one or more tile rows and one or more tile columns. A tile is a rectangular region of a patch frame, and a tile group may contain a number of tiles of a patch frame. In the present disclosure, a tile group contains a number of tiles of a patch frame that collectively form a rectangular (quadrangular) region of the patch frame. In particular, FIG. 32 shows an example in which a patch frame is divided into 24 tiles (6 tile columns and 4 tile rows) and 9 rectangular (quadrangular) tile groups.

Here, when the type information in the PCC unit header of FIG. 24 indicates a patch data group (VPCC-PDG) including at least one patch, the corresponding V-PCC unit payload may include a patch data group. Conversely, when the V-PCC unit payload includes a patch data group, the type information in the V-PCC unit header may identify the same.

The patch data group may contain information about one or more patch tile groups and at least one of a patch sequence parameter set, a patch frame parameter set, a patch frame geometry parameter set, a geometry patch parameter set, a patch frame attribute parameter set, or an attribute patch parameter set.

FIG. 33 shows an example of a syntax structure of each V-PCC unit according to embodiments. Each V-PCC unit consists of a V-PCC unit header and a V-PCC unit payload. The V-PCC unit of FIG. 33 may contain more data. In this case, it may further include a trailing_zero_8bits field. The trailing_zero_8bits field according to the embodiments is a byte corresponding to 0x00.

FIG. 34 shows an example of a syntax structure of a V-PCC unit header according to embodiments. In an embodiment, the V-PCC unit header (vpcc_unit_header( )) of FIG. 34 includes a vpcc_unit_type field. The vpcc_unit_type field indicates the type of the V-PCC unit.

FIG. 35 shows an example of types of V-PCC units assigned to the vpcc_unit_type field according to embodiments.

Referring to FIG. 35, according to an embodiment, the vpcc_unit_type field set to 0 indicates that the data contained in the V-PCC unit payload of the V-PCC unit is a sequence parameter set (VPCC_SPS) The vpcc_unit_type field set to 1 indicates that the data is a patch data group (VPCC_PDG). The vpcc_unit_type field set to 2 indicates that the data is occupancy video data (VPCC_OVD). The vpcc_unit_type field set to 3 indicates that the data is attribute video data (VPCC_OVD). The vpcc_unit_type field set to 4 indicates that the data is geometry video data (VPCC_GVD).

The meaning, order, deletion, addition, and the like of values assigned to the vpcc_unit_type field may be easily changed by those skilled in the art, and accordingly the present disclosure will not be limited to the embodiment described above.

Here, the V-PCC unit payload conforms to the format of the HEVC NAL unit. That is, according to the value of the vpcc_unit_type field, the occupancy, geometry, and attribute video data V-PCC unit payloads correspond to video data units which are decodable by a specified video decoder in the corresponding occupancy, geometry, and attribute parameter set V-PCC units (e.g., HEVC NAL units).

According to an embodiment, when the vpcc_unit_type field indicates attribute video data (VPCC_AVD), geometry video data (VPCC_GVD), occupancy time video data (VPCC_OVD), or patch data group (VPCC_PDG), the V-PCC unit header further includes a vpcc_sequence_parameter_set_id field.

The vpcc_sequence_parameter_set_id field specifies the identifier (i.e., sps_sequence_parameter_set_id) of an active sequence parameter set (VPCC SPS). The value of vpcc_sequence_parameter_set_id field may be in the range of 0 to 15, inclusive According to an embodiment, when the vpcc_unit_type field indicates attribute video data (VPCC_AVD), the V-PCC unit header further includes a vpcc_attribute_index field and a vpcc_attribute_dimension_index field.

The vpcc_attribute_index field indicates the index of the attribute video data carried in the attribute video data unit. The value of the vpcc_attribute_index field may be in the range of 0 to (ai_attribute_count−1), inclusive.

The vpcc_attribute_dimension_index field indicates the index of the attribute dimension group carried in the attribute video data unit. The value of the vpcc_attribute_dimension_index field may be in the range of 0 to 127, inclusive.

The sps_multiple_layer_streamspresent_flag field in the V-PCC unit header of FIG. 34 indicates whether the vpcc_layer_index field and the pcm_separate_videodata(11) field are included.

For example, if the value of the vpcc_unit_type field indicates attribute video data (VPCC_AVD) and the value of the sps_multiple_layer_streams_present_flag field is true (e.g., 0), the vpcc_layer_index field and the pcm_separate_videodata(11) field are further included in the V-PCC unit header. That is, when the value of the sps_multiple_layer_streams_present_flag field is true, it indicates that multiple layers for attribute video data or geometry video data are present. In this case, a field indicating the index of the current layer (e.g., vpcc_layer_index) is needed.

The vpcc_layer_index field indicates the index of the current layer of attribute video data. The vpcc_layer_index field has a value in the range of 0 to 15.

For example, when the value of the vpcc_unit_type field indicates attribute video data (VPCC_AVD), and the value of the sps_multiple_layer_streams_present_flag field is false (e.g., 1), the pcm_separate_video_data(15) field is further included in the V-PCC unit header. That is, the sps_multiple_layer_streams_present_flag field set to false indicates that there are no multiple layers for attribute video data and/or geometry video data. In this case, a field indicating the index of the current layer is not needed.

For example, when the value of the vpcc_unit_type field indicates geometry video data (VPCC_GVD) and the value of the sps_multiple_layer_streamspresent_flag field is true (e.g., 0), a vpcc_layer_index field and a pcm_separate_video_data(18) field are further included in the V-PCC unit header.

The vpcc_layer_index field indicates the index of the current layer of the geometry video data. The vpcc_layer_index field has a value in the range of 0 to 15.

For example, when the value of the vpcc_unit_type field indicates geometry video data (VPCC_GVD) and the value of the sps_multiple_layer_streams_present_flag field is false (e.g., 1), a pcm_separate_video_data (22) field is further included in the V-PCC unit header.

For example, if the value of the vpcc_unit_type field indicates occupancy video data (VPCC_GVD) or patch data group (VPCC_PDG), a vpcc_reserved_zero_23bits field is further included in the V-PCC unit header. Otherwise, a vpcc_reserved_zero_27bits field is further included.

The V-PCC unit header of FIG. 34 may further include a vpccpcm_video_flag field.

For example, the vpccpcm_video_flag field set to 1 may indicate that the associated geometry or attribute video data unit contains PCM (Pulse Code Modulation) coded points only.

As another example, the vpcc_pcm_video_flag field set to 0 may indicate that the associated geometry or attribute video data unit may contain non-PCM coded points. When the vpcc_pcm_video_flag field is not present, the value of the field may be inferred to be equal to 0.

FIG. 36 shows an example of a syntax structure of pcm_separate_video_data(bitCount) included in the V-PCC unit header according to embodiments.

In FIG. 36, bitCount of pcm_separate_video_data varies according to the value of the vpcc_unit_type field in the V-PCC unit header of FIG. 34 as described above.

If the value of the sps_pcm_separate_video_present_flag field is true and the vpcc_layer_index field is not, pcm_separate_video_data(bitCount) includes a vpcc_pcm_video_flag field and a vpcc_reserved_zero_bitcount_bits field. Otherwise, it may include a vpcc_reserved_bits field.

The vpcc_pcm_video_flag field set to 1 may indicate that the associated geometry or attribute video data unit is a PCM coded points video only. The vpcc_pcm_video_flag field set to 0 may indicate that the associated geometry or attribute video data unit may contain PCM coded points. When the vpcc_pcm_video_flag field is not present, its value may be considered to be 0.

FIG. 37 shows an example of a syntax structure of a V-PCC unit payload according to embodiments.

The V-PCC unit payload of FIG. 37 contains one of a sequence parameter set (sequence_parameter_set( )), a patch data group (patch_data_group( )), and a video data unit (video_data_unit( )) according to the value of the vpcc_unit_type field in the V-PCC unit header.

For example, according to an embodiment, when the vpcc_unit_type field indicates sequence parameter set (VPCC_SPS), the V-PCC unit payload contains sequence_parameter_set( ) When the vpcc_unit_type field indicates patch data group (VPCC_PDG), the V-PCC unit payload contains patch_data_group( ) In addition, when the vpcc_unit_type field indicates occupancy video data (VPCC_OVD), the V-PCC unit payload contains an occupancy video data unit (video_data_unit( )) that carries occupancy video data. When the vpcc_unit_type field indicates geometry video data (VPCC_GVD), the V-PCC unit payload contains a geometry video data unit (video_data_unit( )) that carries geometry video data. When the vpcc_unit_type field indicates attribute video data (VPCC_AVD), the V-PCC unit payload contains an attribute video data unit (video_data_unit( )).

FIG. 38 shows an example of a syntax structure of sequence_parameter_set( ) contained in the V-PCC unit payload according to embodiments.

The sequence parameter set (SPS) of FIG. 38 may be applied to coded point cloud sequences including sequences of a coded geometry video data unit, attribute video data unit, and occupancy video data unit.

The sequence parameter set (SPS) of FIG. 38 may include profile_tier_level( ), an sps_sequence_parameter_set_id field, an sps_frame_width field, sps_frame_height field, and an sps_avg_frame_ratepresent_flag field.

The profile_tier_level( ) specifies codec information used to compress the SPS.

The sps_sequence_parameter_set_id field provides an identifier for the VPCC SPS for reference by other syntax elements.

The sps_frame_width field indicates the nominal frame width in terms of integer luma samples.

The sps_frame_height field indicates the nominal frame height in terms of integer luma samples.

The sps_avg_frame_ratepresent_flag field indicates whether average nominal frame rate information is included in the bitstream. For example, the sps_avg_frame_ratepresent_flag field set to 0 may indicate that no average nominal frame rate information is in the bitstream.

The sps_avg_frame_ratepresent_flag field set to 1 may indicate that the average nominal frame rate information shall be indicated in the bitstream. For example, when the value of the sps_avg_frame_ratepresent_flag field is true, that is, 1, the sequence parameter set may further include an sps_avg_frame_rate field, an sps_enhanced_occupancy_map_for_depth_flag field, and an sps_geometry_attribute_different_layer_fl ag field.

The sps_avg_frame_rate field indicates the average nominal point cloud frame rate, in units of point cloud frames per 256 seconds. When the sps_avg_frame_rate field is not present, the value of the field shall be inferred to be equal to. During the reconstruction phase, the decoded occupancy, geometry, and attribute videos may be converted to the nominal width, height, and frame rate using appropriate scaling.

The sps_enhanced_occupancy_map_for_depth_flag field indicates whether the decoded occupancy map video contains information related to whether intermediate depth positions between two depth layers are occupied. For example, the sps_enhanced_occupancy_map_for_depth_flag field set to 1 may indicate that the decoded occupancy map video contains information related to whether intermediate depth positions between two depth layers are occupied. The sps_enhanced_occupancy_map_for_depth_flag field set to 0 may indicate that the decoded occupancy map video does not contain information related to whether intermediate depth positions between two depth layers are occupied.

The sps_geometry_attribute_different_layer_flag field indicates whether the numbers of layers used for encoding of the geometry and attribute video data are different. For example, the sps_geometry_attribute_different_layer_flag field set to 1 may indicate that the numbers of layers used for encoding of the geometry and attribute video data are different. For example, two layers may be used for encoding of the geometry video data, and one layer may be used for encoding of the attribute video data. In addition, the sps_geometry_attribute_different_layer_flag field set to 1 may indicate whether or not the number of layers used for encoding of the geometry and attribute data is signaled in the patch sequence data unit.

The sps_geometry_attribute_different_layer_flag field indicates whether an sps_layer_count_geometry_minus1 field and an sps_layer_count_minus1 field are included. For example, when the value of the sps_geometry_attribute_d- ifferent_layer_flag field is true (e.g., 1), the sps_layer_count_geometry_minus1 field may be further included. When the value is false (e.g., 0), the sps_layer_count_minus1 field may be further included.

The sps_layer_count_geometry_minus1 field indicates the number of layers used for encoding of the geometry data.

The sps_layer_count_minus1 field indicates the number of layers used to for encoding of the geometry and attribute video data.

When the value of the sps_layer_count_minus1 field is greater than 0, the sequence parameter set may further include an sps_multiple_layer_streams_present_flag field and an sps_layer_absolute_coding_enabled_flag [0]=1 field.

The sps_multiple_layer_streams_present_flag field indicates whether geometry layers or attribute layers are placed in a single video stream or separate video streams. For example, the sps_multiple_layer_streams_present_flag field set to 0 may indicate that all geometry layers or attribute layers are placed in a single geometry or attribute video stream, respectively. The sps_multiple_layer_streams_present_flag field set to 1 may indicate that all geometry or attribute layers are placed in separate video streams.

In addition, the sequence parameter set (SPS) includes an iteration statement, which is repeated as many times as the value of the sps_layer_count_minus1 field. The iteration statement includes a sps_layer_absolute_coding_enabled_flag field. According to an embodiment, the variable i is initialized to 0 and is incremented by 1 each time the iteration statement is executed. The iteration statement is repeated until i becomes equal to the value of the sps_layer_count_minus1 field. In addition, if the value of the sps_layer_absolute_coding_enabled_flag field is 0 and the value of i is greater than 0, an sps_layer_predictor_index_diff field is further included. Otherwise, the sps_layer_predictor_index_diff field is not included.

The sps_layer_absolute_coding_enabled_flag [i] field set to 1 may indicate that the geometry layer with index i is coded without any form of layer prediction. The sps_layer_absolute_coding_enabled_flag [i] field set to 0 may indicate that the geometry layer with index i is first predicted from another, earlier coded layer, prior to coding.

The sps_layer_predictor_index_diff [i] field is used to compute the predictor of the geometry layer with index i when the sps_layer_absolute_coding_enabled_flag [i] field is set to 0.

The SPS according to the present disclosure may further include an sps_pcm_patch_enabled_flag field. The sps_pcm_patch_enabled_flag field indicates whether an sps_pcm_separate_video_present_flag field, occupancy_parameter_set( ), geometry_parameter_set( ), and an sps_attribute_count field are included. For example, when the sps_pcm_patch_enabled_flag field is set to 1, the sps_pcm_separate_video_present_flag field, occupancy_parameter_set( ), geometry_parameter_set( ), and the sps_attribute_count field may be further included. That is, the sps_pcm_patch_enabled_flag field set to 1 indicates that patches with PCM coded points may be present in the bitstream.

The sps_pcm_separate_video_present_flag field indicates whether PCM coded geometry video data and attribute video data are stored in a separate video stream. For example, the sps_pcm_separate_video_present_flag field set to 1 indicates that PCM coded geometry video data and attribute video data may be stored in a separate video stream.

The occupancy_parameter_set( ) contains information on an occupancy map.

The geometry_parameter_set( ) contains information on geometry video data.

The sps_attribute_count field indicates the number of attributes associated with the point cloud.

In addition, the SPS according to the present disclosure includes an iteration statement, which is repeated as many times as the value of the sps_attribute_count field. According to an embodiment, the iteration statement includes an sps_layer_count_attribute_minus1 field and attribute_parameter_set( ) when the sps_geometry_attribute_different_layer_flag field is set to 1. In the iteration statement, i is initialized to 0 and is incremented by 1 each time the iteration statement is executed. The iteration statement is repeated until i becomes equal to the value of the sps_attribute_count field.

The sps_layer_count_attribute_minus1 [i] field indicates the number of layers used for encoding of the i-th attribute video data associated with the point cloud.

The attribute_parameter_set(i) contains information on the i-th attribute video data associated with the point cloud.

According to an embodiment of the present disclosure, the SPS further includes an sps_patch_sequence_orientation_enabled_flag field, an sps_patch_inter_prediction_enabled_flag field, an sps_pixel_deinterleaving_flag field, an sps_point_local_reconstruction_enabled_flag field, an sps_remove_duplicate_point_enabled_flag field, and a byte_alignment( ) field.

The sps_patch_sequence_orientation_enabled_flag field indicates whether flexible orientation is signaled in the patch sequence data unit. For example, the sps_patch_sequence_orientation_enabled_flag field set to 1 indicates that flexible orientation is signaled in the patch sequence data unit. The sps_patch_sequence_orientation_enabled_flag field set to 0 indicates that flexible orientation is not signaled.

The sps_patch_inter_prediction_enabled_flag field set to 1 indicates that inter prediction for patch information, using patch information from previously encoded patch frames, may be used.

The sps_pixel_deinterleaving_flag field set to 1 indicates that the decoded geometry and attribute videos corresponding to a single stream contain interleaved pixels from two layers. The sps_pixel_deinterleaving_flag field set to 0 indicates that he decoded geometry and attribute videos corresponding to a single stream contain pixels from only a single layer.

The sps_point_local_reconstruction_enabled_flag field set to 1 indicates that the local reconstruction mode is be used during the point cloud reconstruction process.

The sps_remove_duplicate_point_enabled_flag field set to 1 indicates that duplicated points shall not be reconstructed. Here, a duplicated point is a point with the same 2D and 3D geometry coordinates as another point from a lower layer.

FIG. 39 shows an example of a syntax structure of the patch data group (patch_data_group( ) according to embodiments.

As described above, when the value of the vpcc_unit_type field in the V-PCC unit header indicates the patch data group, the V-PCC unit payload of FIG. 37 contains patch_data_group( ) of FIG. 39.

According to an embodiment, the patch_data_group( ) includes a pdg_unit_type field, patch_data_group_unit_payload(pdg_unit_type) which has signaled information varying according to the value of the pdg_unit_type field, and a pdg_terminate_patch_data_group_flag field.

The pdg_unit_type field indicates the type of the patch data group.

The pdg_terminate_patch_data_group_flag field indicates the end of a patch data group. The pdg_terminate_patch_data_group_flag field set to 0 may indicate that there are additional patch data group units present in the patch data group. The pdg_terminate_patch_data_group_flag field set to 1 may indicate that there are no more patch data group units present in the patch data group and that this is the end of the current patch data group unit.

FIG. 40 is a table showing an example of types of the patch data group assigned to the pdg_unit_type field of the patch data group of FIG. 39.

For example, the pdg_unit_type field set to 0 may indicate the patch sequence parameter set (PDG_PSPS). The pdg_unit_type field set to 1 may indicate the patch frame parameter set (PDG_PFPS). The pdg_unit_type field set to 2 may indicate the patch frame geometry parameter set (PDG_PFGPS). The pdg_unit_type field set to 3 may indicate the patch frame attribute parameter set (PDG_PFAPS). The pdg_unit_type field set to 4 may indicate the geometry patch parameter set (PDG_GPPS). The pdg_unit_type field set to 5 may indicate the attribute patch parameter set (PDG_APPS). The pdg_unit_type field set to 6 may indicate the patch tile group layer unit (PDG_PTGLU). The pdg_unit_type field set to 7 may indicate the prefix SEI message (PDG_PREFIX_SEI). The pdg_unit_type field set to 8 may indicate the suffix SEI message (PDG_SUFFIX_SEI).

The PDG_PSPS may include sequence level parameters, and the PDG_PFPS may include frame level parameters. The PDG_PFGPS may include frame level geometry type parameters, and the PDG_PFAPS may include frame level attribute type parameters. The PDG_GPPS may include patch level geometry type parameters, and the PDG APPS may include patch level attribute type parameters.

FIG. 41 shows an example of a syntax structure of a patch data group unit payload (patch_data_group_unit_payload (pdg_unit_type)) according to embodiments.

When the value of the pdg_unit_type field of the patch data group of FIG. 39 indicates the PDG_PSPS, the patch_data_group_unit_payload( ) may contain a patch sequence parameter set (patch_sequence_parameter_set( )).

When the value of the pdg_unit_type field indicates the PDG_GPPS, the patch_data_group_unit_payload( ) may contain a geometry patch parameter set (geometry_patch_parameter_set( )).

When the value of the pdg_unit_type field indicates the PDG_APPS, the patch_data_group_unit_payload( ) may contain an attribute patch parameter set (attribute_patch_parameter_set( ).

When the value of the pdg_unit_type field indicates the PDG_PFPS, the patch_data_group_unit_payload( ) may contain a patch frame parameter set (patch_frame_parameter_set( ).

When the value of the pdg_unit_type field indicates the PDG_PFAPS, the patch_data_group_unit_payload( ) may contain a patch frame attribute parameter set (patch_frame_attribute_parameter_set( ).

When the value of the pdg_unit_type field indicates the PDG_PFGPS, the patch_data_group_unit_payload( ) may contain a patch frame geometry parameter set (patch_frame_geometry_parameter_set( ).

When the value of the pdg_unit_type field indicates the PDG_PTGLU, the patch_data_group_unit_payload( ) may contain a patch tile group layer unit (patch_tile_group_layer_unit( ).

When the value of the pdg_unit_type field indicates the PDG_PREFIX_SEI or the PDG_SUFFIX_SEI, the patch_data_group_unit_payload( ) may contain sei_message( ).

FIG. 42 shows an example of a syntax structure of a supplemental enhancement information (SEI) message (sei_message( ) according to embodiments. That is, when the value of the pdg_unit_type field included in the patch data group of FIG. 39 indicates the PDG_PREFIX_SEI or the PDG_SUFFIX_SEI, the patch_data_group_unit_payload( ) of FIG. 41 contains sei_message( ).

Each SEI message according to embodiments consists of an SEI message header and an SEI message payload. The SEI message header includes an sm_payload_type_byte field and an sm_payload_size_byte field.

The sm_payload_type_byte field is a byte of the payload type of an SEI message. For example, whether the SEI message is a prefix SEI message or a suffix SEI message may be identified based on the value of the sm_payload_type_byte field.

The sm_payload_size_byte field is a byte of the payload size of an SEI message.

The SEI message of FIG. 42 initializes the PayloadType to 0, and then sets the value of the sm_payload_type_byte field in the iteration statement as the value of PayloadType. When the value of the sm_payload_type_byte field is 0xFF, the iteration statement is terminated.

In addition, the SEI message of FIG. 42 initializes the PayloadSize to 0, and then sets the value of the sm_payload_size_byte field in the iteration statement as the value of PayloadSize. When the value of the sm_payload_size_byte field is 0xFF, the iteration statement is terminated.

Then, information corresponding to the payloadType and payloadSize set in the two iteration statements is signaled through the payload of the SEI message (sei_payload(payloadType, payloadSize)).

Figure 43:
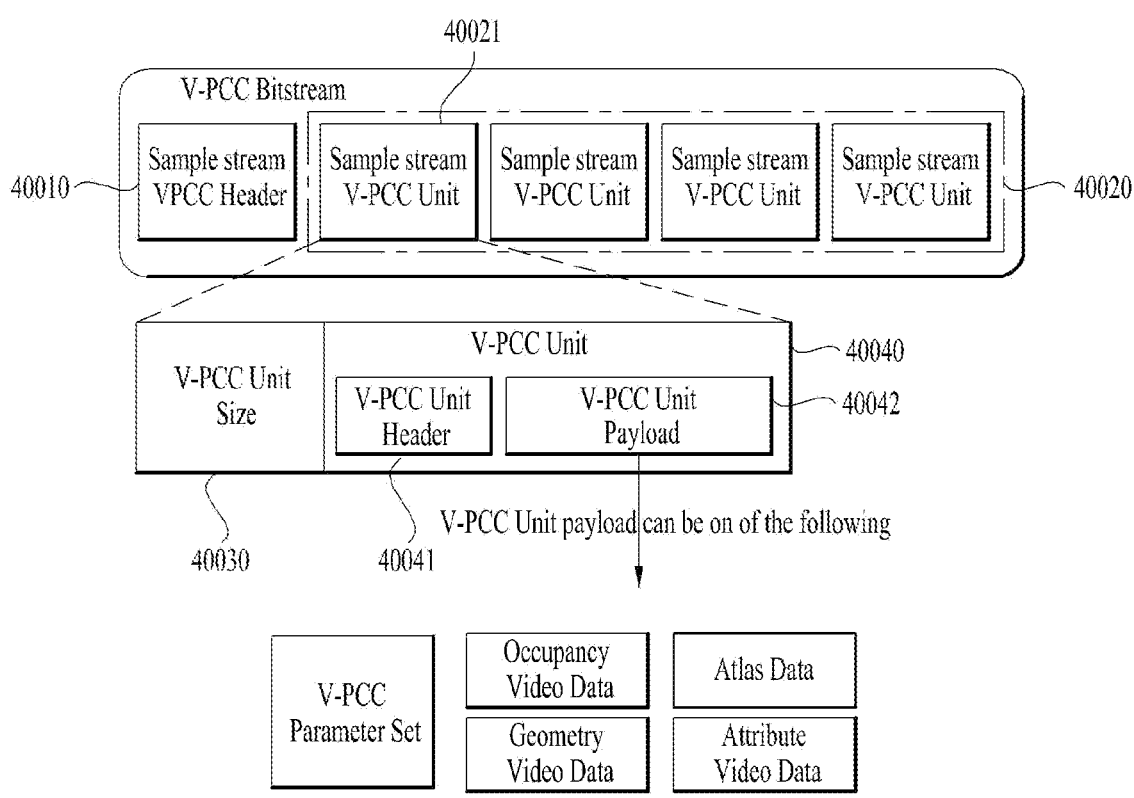
FIG. 43 shows an example of a V-PCC bitstream structure according to other embodiments of the present disclosure.

FIG. 43 shows an example of a V-PCC bitstream structure according to other embodiments of the present disclosure. In an embodiment, the V-PCC bitstream of FIG. 43 is generated and output by the V-PCC-based point cloud video encoder of FIG. 1, 4, 18, 20, or 21.

A V-PCC bitstream according to the embodiments, containing a coded point cloud sequence (CPCS), may be composed of sample stream V-PCC units. The sample stream V-PCC units carry V-PCC parameter set (VPS) data, an atlas bitstream, a 2D video encoded occupancy map bitstream, a 2D video encoded geometry bitstream, and zero or more 2D video encoded attribute bitstreams.

In FIG. 43, the V-PCC bitstream may include one sample stream V-PCC header 40010 and one or more sample stream V-PCC units 40020. For simplicity, the one or more sample stream V-PCC units 40020 may be referred to as a sample stream V-PCC payload. That is, the sample stream V-PCC payload may be referred to as a set of sample stream V-PCC units.

Each sample stream V-PCC unit 40021 may include V-PCC unit size information 40030 and a V-PCC unit 40040. The V-PCC unit size information 40030 indicates the size of the V-PCC unit 40040. For simplicity, the V-PCC unit size information 40030 may be referred to as a sample stream V-PCC unit header, and the V-PCC unit 40040 may be referred to as a sample stream V-PCC unit payload.

Each V-PCC unit 40040 may include a V-PCC unit header 40041 and a V-PCC unit payload 40042.

In the present disclosure, data contained in the V-PCC unit payload 40042 is distinguished by the V-PCC unit header 40041. To this end, the V-PCC unit header 40041 contains type information indicating the type of the V-PCC unit. Each V-PCC unit payload 40042 may contain at least one of geometry video data (i.e., a 2D video encoded geometry bitstream), attribute video data (i.e., a 2D video encoded attribute bitstream), occupancy video data (i.e., a 2D video encoded occupancy map bitstream), atlas data, or a V-PCC parameter set (VPS) according to the type information in the V-PCC unit header 40041.

The VPS according to the embodiments is also referred to as a sequence parameter set (SPS). The two terms may be used interchangeably.

The atlas data according to the embodiments may represent data composed of attributes (e.g., texture (patch)) and/or depth of point cloud data, and may also be referred to as a patch data group.

Figure 44:
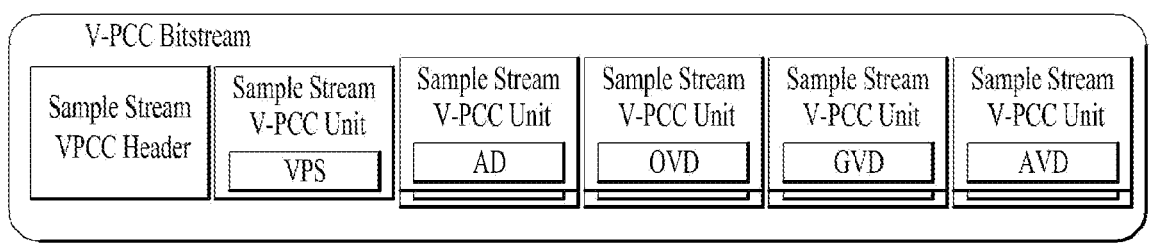
FIG. 44 illustrates an example of data carried by sample stream V-PCC units in a V-PCC bitstream according to embodiments.

FIG. 44 illustrates an example of data carried by sample stream V-PCC units in a V-PCC bitstream according to embodiments.

In the example of FIG. 44, the V-PCC bitstream contains a sample stream V-PCC unit carrying a V-PCC parameter set (VPS), sample stream V-PCC units carrying atlas data (AD), sample stream V-PCC units carrying occupancy video data (OVD), sample stream V-PCC units carrying geometry video data (GVD), and sample stream V-PCC units carrying attribute video data (AVD).

According to embodiments, each sample stream V-PCC unit contains one type of V-PCC unit among the VPS, AD, OVD, GVD, and AVD.

FIG. 45 shows an example of a syntax structure of a sample stream V-PCC header contained in a V-PCC bitstream according to embodiments.

The sample_stream_v-pcc_header( ) according to the embodiments may include an ssvh_unit_size_precision_bytes_minus1 field and an ssvh_reserved_zero_5bits field.

The value of the ssvh_unit_sizeprecision_bytes_minus1 field plus 1 may specify the precision, in bytes, of the ssvu_vpcc_unit_size element in all sample stream V-PCC units. The value of this field may be in the range of 0 to 7.

The ssvh_reserved_zero_5bits field is a reserved field for future use.

FIG. 46 shows an example of a syntax structure of a sample stream V-PCC unit (sample_stream_vpcc_unit( ) according to embodiments.

The content of each sample stream V-PCC unit is associated with the same access unit as the V-PCC unit contained in the sample stream V-PCC unit.

The sample_stream_vpcc_unit( ) according to embodiments may include an ssvu_vpcc_unit_size field and vpcc_unit(ssvu_vpcc_unit_size).

The ssvu_vpcc_unit_size field corresponds to the V-PCC unit size information 40030 of FIG. 43, and specifies the size, in bytes, of the subsequent vpcc_unit. The number of bits used to represent the ssvu_vpcc_unit_size field is equal to (ssvh_unit_size_precision_bytes_minus1+1)*8.

The vpcc_unit(ssvu_vpcc_unit_size) has a length corresponding to the value of the ssvu_vpcc_unit_size field, and carries one of the VPS, AD, OVD, GVD, and AVD.

FIG. 47 shows an example of a syntax structure of a V-PCC unit according to embodiments. A V-PCC unit is consists of a V-PCC unit header (vpcc_unit_header( ) and a V-PCC unit payload (vpcc_unit_payload( ). The V-PCC unit according to the embodiments may contain more data. In this case, it may further include a trailing_zero_8bits field. The trailing_zero_8bits field according to the embodiments is a byte corresponding to 0x00.

FIG. 48 shows an example of a syntax structure of a V-PCC unit header according to embodiments. In an embodiment, the vpcc_unit_header( ) of FIG. 48 includes a vuh_unit_type field. The vuh_unit_type field indicates the type of the corresponding V-PCC unit. The vuh_unit_type field according to the embodiments is also referred to as a vpcc_unit_type field.

FIG. 49 shows an example of V-PCC unit types assigned to the vuh_unit_type field according to embodiments.

Referring to FIG. 49, according to an embodiment, the vuh_unit_type field set to 0 indicates that the data contained in the V-PCC unit payload of the V-PCC unit is a V-PCC parameter set (VPCC_VPS). The vuh_unit_type field set to 1 indicates that the data is atlas data (VPCC_AD). The vuh_unit_type field set to 2 indicates that the data is occupancy video data (VPCC_OVD). The vuh_unit_type field set to 3 indicates that the data is geometry video data (VPCC_GVD). The vuh_unit_type field set to 4 indicates that the data is attribute video data (VPCC_AVD).

The meaning, order, deletion, addition, and the like of values assigned to the vuh_unit_type field may be easily changed by those skilled in the art, and accordingly the present disclosure will not be limited to the embodiment described above.

When the vuh_unit_type field indicates VPCC_AVD, VPCC_GVD, VPCC_OVD, or VPCC_AD, the V-PCC unit header according to the embodiments may further include a vuh_vpcc_parameter_set_id field and a vuh_atlas_id field.

The vuh_vpcc_parameter_set_id field specifies the value of vps_vpcc_parameter_set_id for the active V-PCC VPS.

The vuh_atlas_id field specifies the index of the atlas that corresponds to the current V-PCC unit.

When the vuh_unit_type field indicates VPCC_AVD, the V-PCC unit header according to the embodiments may further include a vuh_attribute_index field, a vuh_attribute_dimension_index field, a vuh_map_index field, and a vuh_raw_video_flag field.

The vuh_attribute_index field indicates the index of the attribute data carried in the attribute video data unit.

The vuh_attribute_dimension_index field indicates the index of the attribute dimension group carried in the attribute video data unit.

When present, the vuh_map_index field may indicate the map index of the current geometry or attribute stream.

The vuh_raw_video_flag field may indicate whether RAW coded points are contained. For example, the vuh_raw_video_flag field set to 1 may indicate that the associated attribute video data unit contains RAW coded points only. As another example, the vuh_raw_video_flag field set to 0 may indicate that the associated attribute video data unit may contain RAW coded points. When the vuh_raw_video_flag field is not present, its value may be inferred to be equal to 0. According to embodiments, RAW coded points are also referred to as pulse code modulation (PCM) coded points.

When the vuh_unit_type field indicates VPCC_GVD, The V-PCC unit header according to the embodiments may further include a vuh_map_index field, a vuh_raw_video_flag field, and a vuh_reserved_zero_12bits field.

When present, the vuh_map_index field indicates the index of the current geometry stream.

The vuh_raw_video_flag field may indicate whether RAW coded points are contained. For example, the vuh_raw_video_flag field set to 1 may indicate that the associated geometry video data unit contains RAW coded points only. As another example, the vuh_raw_video_flag field set to 0 may indicate that the associated geometry video data unit may contain RAW coded points. When the vuh_raw_video_flag field is not present, its value may be inferred to be equal to 0. According to embodiments, RAW coded points are also referred to as PCM coded points.

The vuh_reserved_zero_12bits field is a reserved field for future use.

If the vuh_unit_type field indicates VPCC_OVD or VPCC_AD, the V-PCC unit header according to the embodiments may further include a vuh_reserved_zero_17bits field. Otherwise, the V-PCC unit header may further include a vuh_reserved_zero_27bits field.

The vuh_reserved_zero17bits field and the vuh_reserved_zero27bits field are reserved fields for future use.

FIG. 50 shows an example of a syntax structure of a V-PCC unit payload (vpcc_unit_payload( ) according to embodiments.

The V-PCC unit payload of FIG. 50 may contain one of a V-PCC parameter set (vpcc_parameter_set( )), an atlas sub-bitstream (atlas_sub_bitstream( )), and a video sub-bitstream (video_sub_bitstream( )) according to the value of the vuh_unit_type field in the V-PCC unit header.

For example, when the vuh_unit_type field indicates VPCC_VPS, the V-PCC unit payload contains vpcc_parameter_set( ) containing overall encoding information about the bitstream. When the vuh_unit_type field indicates VPCC_AD, the V-PCC unit payload contains atlas_sub_bitstream( ) carrying atlas data. In addition, according to an embodiment, when the vuh_unit_type field indicates VPCC_OVD, the V-PCC unit payload contains an occupancy video sub-bitstream (video_sub_bitstream( ) carrying occupancy video data. When the vuh_unit_type field indicates VPCC_GVD, the V-PCC unit payload contains a geometry video sub-bitstream (video_sub_bitstream( )) carrying geometry video data. When the vuh_unit_type field indicates VPCC_AVD, the V-PCC unit payload contains an attribute video sub-bitstream (video_sub_bitstream( )) carrying attribute video data.

According to embodiments, the atlas sub-bitstream may be referred to as an atlas substream, and the occupancy video sub-bitstream may be referred to as an occupancy video substream. The geometry video sub-bitstream may be referred to as a geometry video substream, and the attribute video sub-bitstream may be referred to as an attribute video substream. The V-PCC unit payload according to the embodiments conforms to the format of a High Efficiency Video Coding (HEVC) Network Abstraction Layer (NAL) unit.

Figure 51:
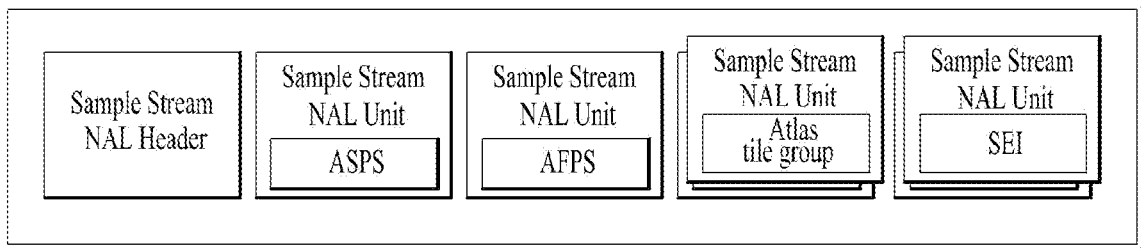
FIG. 51 is a diagram illustrating an example of a structure of an atlas substream according to embodiments.

FIG. 51 is a diagram illustrating an example of the structure of an atlas substream according to embodiments. In an embodiment, the atlas substream of FIG. 51 conforms to the format of the HEVC NAL unit.

The atlas substream according to the embodiments may be composed of a sample stream NAL unit containing an atlas sequence parameter set (ASPS), a sample stream NAL unit containing an atlas frame parameter set (AFPS), and one or more sample stream NAL units containing information about one or more atlas tile groups, and/or one or more sample stream NAL units containing one or more SEI messages.

The one or more SEI messages according to embodiments may include a prefix SEI message and a suffix SEI message.

The atlas substream according to the embodiments may further contain a sample stream NAL header placed in front of one or more NAL units.

FIG. 52 shows an example of a syntax structure of a sample stream NAL header (sample_stream_nal_header( )) contained in the atlas substream according to embodiments.

The sample_stream_nal_header( ) according to the embodiments may include an ssnh_unit_size_precision_bytes_minus1 field and an ssnh_reserved_zero_5bits field.

The value of the ssnh_unit_size_precision_bytes_minus1 field plus 1 may specify the precision, in bytes, of the ssnu_nal_unit_size element in all sample stream NAL units. The value of this field may be in the range of 0 to 7.

The ssnh_reserved_zero_5bits field is a reserved field for future use.

FIG. 53 shows an example of a syntax structure of a sample stream NAL unit (sample_stream_nal_unit( )) according to embodiments.

The sample_stream_nal_unit( ) according to the embodiments may include an ssnu_nal_unit_size field and nal_unit (ssnu_nal_unit_size).

The ssnu_nal_unit_size field specifies the size, in bytes, of the subsequent NAL unit. The number of bits used to represent the ssnu_nal_unit_size field is equal to (ssnh_unit_size_precision_bytes_minus1+1)*8.

The nal_unit(ssnu_nal_unit_size) has a length corresponding to the value of the ssnu_nal_unit_size field, and carries one of an atlas sequence parameter set (ASPS), an atlas frame parameter set (AFPS), atlas tile group information, and an SEI message. That is, each sample stream NAL unit may contain an ASPS, an AFPS, atlas tile group information, or an SEI message. According to embodiments, the ASPS, the AFPS, the atlas tile group information, and the SEI message are referred to as atlas data (or atlas metadata).

SEI messages according to embodiments may assist in processes related to decoding, reconstruction, display, or other purposes.

Each SEI message according to the embodiments is composed of an SEI message header and an SEI message payload (sei_payload). The SEI message header may contain payload type information (payloadType) and payload size information (payloadSize).

The payloadType indicates the payload type of the SEI message. For example, whether the SEI message is a prefix SEI message or a suffix SEI message may be identified based on the payloadType.

The payloadSize indicates the payload size of the SEI message.

FIG. 54 shows an example of a syntax structure of an SEI message payload (sei_payload( )) according to embodiments.

SEI messages according to the embodiments may include a prefix SEI message or a suffix SEI message. In addition, each SEI message signals information corresponding to payload type information (payloadType) and payload size information (payloadSize) through an SEI message payload (sei_payload(payloadType, payloadSize)).

The prefix SEI message according to the embodiments may contain buffering_period(payloadSize) when payloadType is equal to 0. The prefix SEI message may contain pic_timing(payloadSize) when payloadType is equal to 1. The prefix SEI message may contain filler_payload(payloadSize) when payloadType is equal to 2. The prefix SEI message may contain sei_prefix_indication(payloadSize) when payloadType is equal to 10. The prefix SEI message may contain 3d_region_mapping(payloadSize) when payloadType is equal to 13.

The suffix SEI message may contain filler_payload(payloadSize) when payloadType is equal to 2. The suffix SEI message may contain user_data_registered_itu_t_t35(payloadSize) when payloadType is equal to 3. The suffix SEI message may contain user_data_unregistered(payloadSize)

when payloadType is equal to 4. The suffix SEI message may contain decoded_pcc_hash(payloadSize) when payloadType is equal to 11.

According to an embodiment, the V-PCC bitstream having the structure as shown in FIG. 24 or 43 is encapsulated in the ISOBMFF file format by the file/segment encapsulator of FIG. 1, 18, 20, or 21.

In this case, the V-PCC stream may be transmitted through multiple tracks or one single track of a file.

The ISOBMFF-based file according to the embodiments may be composed of a box and/or information, which may be referred to as ftyp, meta, moov, or mdat.

The ftyp box (file type box) may provide information related to a file type or file compatibility for the file. The receiving side may identify the file with reference to the ftyp box.

The meta box may include a vpcg{0,1,2,3} box (V-PCC Group Box).

The mdat box, which is also referred to as a media data box, may contain a video-coded geometry bitstream, a video-coded attribute bitstream, a video-coded occupancy map bitstream, and/or an atlas data bitstream.

The moov box, which is also referred to as a movie box, may contain metadata about the media data (e.g., a geometry bitstream, an attribute bitstream, an occupancy map bitstream, etc.) of the file. For example, it may contain information necessary for decoding and playback of the media data, and information about samples of the file. The moov box may serve as a container for all metadata. The moov box may be a box of the highest layer among the metadata related boxes. According to an embodiment, only one moov box may be present in a file.

A box according to embodiments may include a track (trak) box providing information related to a track of the file. The trak box may include a media (mdia) box providing media information about the track and a track reference container (tref) box for referencing the track and a sample of the file corresponding to the track.

The mdia box may include a media information container (minf) box providing information on the media data. The minf box may include a sample table (stbl) box providing metadata related to samples of the mdat box.

The stbl box may include a sample description (stsd) box providing information on an employed coding type and initialization information necessary for the coding type.

The stsd box may include a sample entry for a track storing a V-PCC bitstream according to embodiments.

In order to store the V-PCC bitstream according to the embodiments in a single track or multiple tracks in a file, the present disclosure defines a volumetric visual track, a volumetric visual media header, a volumetric sample entry, volumetric samples, and a sample and simple entry of a V-PCC track.

The term V-PCC used herein is the same as visual volumetric video-based coding (V3C). The two terms may be used to complement each other.

According to embodiments, video-based point cloud compression (V-PCC) represents a volumetric encoding of point cloud visual information.

That is, the minf box in the trak box of the moov box may further include a volumetric visual media header box. The volumetric visual media header box contains information on a volumetric visual track containing a volumetric visual scene.

Each volumetric visual scene may be represented by a unique volumetric visual track. An ISOBMFF file may contain multiple scenes and therefore multiple volumetric visual tracks may be present in the ISOBMFF file.

According to the embodiments, a volumetric visual track may be identified by the volumetric visual media handler type 'vole' in the HandlerBox of the MediaBox.

The syntax of the volumetric visual media header box according to the embodiments is configured as follows.
 Box Type: 'vvhd'
 Container: MediaInformationBox
 Mandatory: Yes
 Quantity: Exactly one Volumetric visual tracks according to embodiments may use a volumetric visual media handler box (VolumetricVisualMediaHeaderBox) in the media information box (MediaInformationBox) as follows.

```
aligned(8) class VolumetricVisualMediaHeaderBox extends
FullBox('vvhd', version = 0, 1) {
}
```

The version may be an integer indicating the version of this box.

Volumetric visual tracks according to embodiments may use a volumetric visual sample entry (VolumetricVisualSampleEntry) as follows.

```
class VolumetricVisualSampleEntry(codingname) extends SampleEntry
(codingname){
    unsigned int(8)[32] compressor_name;
}
```

The compressor_name is a name, for informative purposes. It is formatted in a fixed 32-byte field, with the first byte set to the number of bytes to be displayed, followed by the number of bytes of displayable data encoded using UTF-8, and then padding to complete 32 bytes total (including the size byte). This field may be set to 0.

The format of a volumetric visual sample according to embodiments may be defined by a coding system.

A V-PCC unit header box according to embodiments may be present in both the V-PCC track included in the sample entry and in all video coded V-PCC component tracks included in the scheme information. The V-PCC unit header box may contain a V-PCC unit header for data carried by the respective tracks as follows.

```
aligned(8) class VPCCUnitHeaderBox extends FullBox('vunt', version =
0, 0) {
    vpcc_unit_header( ) unit_header;
}
```

That is, the VPCCUnitHeaderBox may include vpcc_unit_header( ). FIGS. 34 and 48 show examples of a syntax structure of the (vpcc_unit_header( ).

According to embodiments, the V-PCC track sample entry may contain a VPCC configuration box (VPCCConfigurationBox).

According to embodiments, the VPCCConfigurationBox may include a VPCC decoder configuration record (VPCCDecoderConfigurationRecord) as shown below.

```
aligned(8) class VPCCDecoderConfigurationRecord {
    unsigned int(8) configurationVersion = 1;
```

```
        unsigned int(3) sampleStreamSizeMinusOne;
        unsigned int(5) numOfVPCCParameterSets;
        for (i=0; i< numOfVPCCParameterSets; i++) {
            sample_stream_vpcc_unit VPCCParameterSet;
        }
        unsigned int(8) numOfAtlasSetupUnits;
        for (i=0; i< numOfAtlasSetupUnits; i++) {
            sample_stream_vpcc_unit atlas_setupUnit;
        }
    }
```

The configurationVersion included in the VPCCDecoderConfigurationRecord indicates a version field. Incompatible changes to the record are indicated by a change of the version number.

sampleStreamSizeMinusOne plus 1 may indicate the precision, in bytes, of the ssvu_vpcc_unit_size element in all sample stream V-PCC units in either this configuration record or a V-PCC sample in the stream to which this configuration record applies.

The numOfVPCCParameterSets specifies the number of V-PCC parameter sets (VPS) signaled in the VPCCDecoderConfigurationRecord.

The VPCCParameterSet is a sample_stream_vpcc_unit( ) instance for a V-PCC unit of type VPCC_VPS. The V-PCC unit may include vpcc_parameter_set( ). That is, the VPCCParameterSet array may include vpcc_parameter_set( ). FIG. 46 shows an example of a syntax structure of a sample stream V-PCC unit (sample_stream_vpcc_unit( ).

The numOfAtlasSetupUnits indicates the number of setup arrays for the atlas stream signaled in the VPCCDecoderConfigurationRecord.

The Atlas_setupUnit is a sample_stream_vpcc_unit( ) instance containing an atlas sequence parameter set, an atlas frame parameter set, or an SEI atlas NAL unit. FIG. 46 shows an example of A syntax structure of the sample stream V-PCC unit (sample_stream_vpcc_unit( ).

Specifically, the atlas_setupUnit arrays may include atlas parameter sets that are constant for the stream referred to by the sample entry in which the VPCCDecoderConfigurationRecord is present as well as atlas stream SEI messages. According to embodiments, the atlas_setupUnit may be referred to simply as a setup unit.

According to other embodiments, the VPCCDecoderConfigurationRecord may be represented as follows.

```
    aligned(8) class VPCCDecoderConfigurationRecord {
        unsigned int(8) configurationVersion = 1;
        unsigned int(3) sampleStreamSizeMinusOne;
        bit(2) reserved = 1;
        unsigned int(3) lengthSizeMinusOne;
        unsigned int(5) numOfVPCCParameterSets;
        for (i=0; i< numOfVPCCParameterSets; i++) {
            sample_stream_vpcc_unit VPCCParameterSet;
        }
        unsigned int(8) numOfSetupUnitArrays;
        for (j=0; j<numOfSetupUnitArrays; j++) {
            bit(1) array_completeness;
            bit(1) reserved = 0;
            unsigned int(6) NAL_unit_type;
            unsigned int(8) numNALUnits;
            for (i=0; i<numNALUnits; i++) {
                sample_stream_nal_unit setupUnit;
            }
        }
    }
```

The configurationVersion is a version field. Incompatible changes to the record are indicated by a change of the version number.

The value of the lengthSizeMinusOne plus 1 may indicate the precision, in bytes, of the ssnu_nal_unit_size element in all sample stream NAL units in either the VPCCDecoderConfigurationRecord or a V-PCC sample in the stream to which the VPCCDecoderConfigurationRecord applies. FIG. 53 shows an example of a syntax structure of a sample stream NAL unit (sample_stream_nal_unit( )) including the ssnu_nal_unit_size field.

The numOfVPCCParameterSets specifies the number of V-PCC parameter sets (VPS) signaled in the VPCCDecoderConfigurationRecord.

The VPCCParameterSet is a sample_stream_vpcc_unit( ) instance for a V-PCC unit of type VPCC_VPS. The V-PCC unit may include vpcc_parameter_set( ). That is, the VPCCParameterSet array may include vpcc_parameter_set( ). FIG. 46 shows an example of a syntax structure of the sample_stream_vpcc_unit( ).

The numOfSetupUnitArrays indicates the number of arrays of atlas NAL units of the indicated type(s).

An iteration statement repeated as many times as the value of the numOfSetupUnitArrays may contain array_completeness.

array_completeness equal to 1 indicates that all atlas NAL units of the given type are in the following array and none are in the stream. array_completeness equal to 0 indicates that additional atlas NAL units of the indicated type may be in the stream. The default and permitted values are constrained by the sample entry name.

NAL_unit_type indicates the type of the atlas NAL units in the following array. NAL_unit_type is restricted to take one of the values indicating a NAL_ASPS, NAL_PREFIX_SEL or NAL_SUFFIX_SEI atlas NAL unit.

The numNALUnits indicates the number of atlas NAL units of the indicated type included in the VPCCDecoderConfigurationRecord for the stream to which the VPCCDecoderConfigurationRecord applies. The SEI array shall only contain SEI messages of a 'declarative' nature, that is, those that provide information about the stream as a whole. An example of such an SEI may be a user-data SEI The setupUnit is a sample_stream_nal_unit( ) instance containing an atlas sequence parameter set, or atlas frame parameter set, or declarative SEI atlas NAL unit.

According to embodiments, in the general layout of a multi-track container (also referred to as a multi-track ISOBMFF V-PCC container), V-PCC units in a V-PCC elementary stream may be mapped to individual tracks within the container file based on their types). There are two types of tracks in the multi-track ISOBMFF V-PCC container according to the embodiments. One of the types is a V-PCC track, and the other is a V-PCC component track.

The V-PCC track according to the embodiments is a track carrying the volumetric visual information in the V-PCC bitstream, which includes the atlas sub-bitstream and the sequence parameter sets.

V-PCC component tracks according to the embodiments are restricted video scheme tracks which carry 2D video encoded data for the occupancy map, geometry, and attribute sub-bitstreams of the V-PCC bitstream. In addition, the following conditions may be satisfied for V-PCC component tracks:

a) in the sample entry, a new box is inserted which documents the role of the video stream contained in this track, in the V-PCC system;

b) a track reference is introduced from the V-PCC track, to the V-PCC component track, to establish the membership of the V-PCC component track in the specific point-cloud represented by the V-PCC track;

c) the track-header flags are set to 0, to indicate that this track does not contribute directly to the overall layup of the movie but contributes to the V-PCC system.

Tracks belonging to the same V-PCC sequence may be time-aligned. Samples that contribute to the same point cloud frame across the different video-encoded V-PCC component tracks and the V-PCC track has the same presentation time. The V-PCC atlas sequence parameter sets and atlas frame parameter sets used for such samples have a decoding time equal or prior to the composition time of the point cloud frame. In addition, all tracks belonging to the same V-PCC sequence have the same implied or explicit edit lists.

Note: Synchronization between the elementary streams in the component tracks are handled by the ISOBMFF track timing structures (stts, ctts, and cslg), or equivalent mechanisms in movie fragments.

Based on this layout, a V-PCC ISOBMFF container may include the following:

- A V-PCC track which contains V-PCC parameter sets (in the sample entry) and samples carrying the payloads of the V-PCC parameter set V-PCC unit (unit type VPCC_VPS) and atlas V-PCC units (unit type VPCC_AD). This track also includes track references to other tracks carrying the payloads of video compressed V-PCC units (i.e., unit types VPCC_OVD, VPCC_GVD, and VPCC_AVD).
- A restricted video scheme track where the samples contain access units of a video-coded elementary stream for occupancy map data (i.e., payloads of V-PCC units of type VPCC_OVD).
- One or more restricted video scheme tracks where the samples contain access units of video-coded elementary streams for geometry data (i.e., payloads of V-PCC units of type VPCC_GVD).
- Zero or more restricted video scheme tracks where the samples contain access units of video-coded elementary streams for attribute data (i.e., payloads of V-PCC units of type VPCC_AVD).

Next, V-PCC tracks are be described below.

The syntax structure of the V-PCC Track Sample Entry according to the embodiments is configured as follows.
Sample Entry Type: 'vpc1', 'vpcg'
Container: SampleDescriptionBox Mandatory: A 'vpc1' or 'vpcg' sample entry is mandatory.
Quantity: One or more sample entries may be present.

V-PCC tracks use VPCCSampleEntry which extends VolumetricVisualSampleEntry. The sample entry type is 'vpc1' or 'vpcg'.

A VPCC sample entry contains a VPCCConfigurationBox. This box includes a VPCCDecoderConfigurationRecord.

Under the 'vpc1' sample entry, all atlas sequence parameter sets, atlas frame parameter sets, or V-PCC SEIs are in the setupUnit array.

Under the 'vpcg' sample entry, the atlas sequence parameter sets, atlas frame parameter sets, V-PCC SEIs may be present in this array, or in the stream.

An optional BitRateBox may be present in the VPCC volumetric sample entry to signal the bit rate information of the V-PCC track.

Volumetric Sequences:

```
class VPCCConfigurationBox extends Box('vpcC') {
    VPCCDecoderConfigurationRecord( ) VPCCConfig;
}
aligned(8) class VPCCSampleEntry( ) extends
VolumetricVisualSampleEntry ('vpc1') {
    VPCCConfigurationBox config;
    VPCCUnitHeaderBox unit_header;
}
```

Figure 55:
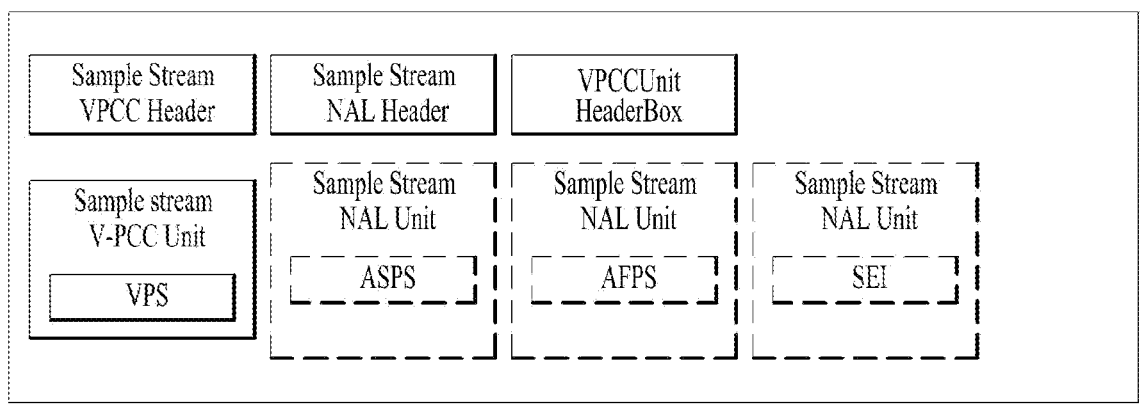
FIG. 55 shows an example of a V-PCC sample entry structure according to embodiments.

FIG. 55 shows an example of a V-PCC sample entry structure according to embodiments. In FIG. 55, the V-PCC sample entry includes one V-PCC parameter set, and may optionally include an atlas sequence parameter set (ASPS), an atlas frame parameter set (AFPS), or an SEI.

The V-PCC bitstream according to the embodiments may further contain a sample stream V-PCC header, a sample stream NAL header, and a V-PCC unit header box.

Next, the V-PCC track sample format is described below.

Each sample in the V-PCC track corresponds to a single point cloud frame. Samples corresponding to this frame in various component tracks have the same composition time as the V-PCC track sample. Each V-PCC sample includes one or more atlas NAL units as follows.

```
aligned(8) class VPCCSample {
    unsigned int PointCloudPictureLength = sample_size; // size of sample (e.g.,
from SampleSizeBox)
    for (i=0; i<PointCloudPictureLength; ) {
        sample_stream_nal_unit nalUnit
        i += (VPCCDecoderConfigurationRecord.lengthSizeMinusOne+1) +
        nalUnit.ssnu_nal_unit_size;
    }
}
aligned(8) class VPCCSample {
    unsigned int PictureLength = sample_size; //size of sample (e.g., from
SampleSizeBox)
    for (i=0; i<PictureLength;)   // Signaled to the end of the picture {
        unsigned int((VPCCDecoderConfigurationRecord.LengthSizeMinusOne+1)*8)
        NALUnitLength;
        bit(NALUnitLength * 8) NALUnit;
        i    +=   (VPCCDecoderConfigurationRecord.LengthSizeMinusOne+1)   +
NALUnitLength;
    }
}
```

A sync sample (random access point) in a V-PCC track is a V-PCC IRAP coded patch data access unit. Atlas parameter sets may be repeated, if needed, at a sync sample to allow for random access.

Next, video-encoded V-PCC component tracks are described below.

Carriage of coded video tracks that use MPEG-specified codecs may conform to ISOBMFF derived specifications. For example, for carriage of AVC and HEVC coded videos, reference may be made to the ISO/IEC 14496-15. ISOBMFF may also provide an extension mechanism if other codec types are required.

Since it is not meaningful to display the decoded frames from attribute, geometry, or occupancy map tracks without reconstructing the point cloud at the player side, a restricted video scheme type may be defined for these video-coded tracks.

Next, the restricted video scheme is described below.

V-PCC component video tracks may be represented in the file as restricted video, and may be identified by 'pccv' in the scheme_type field of the SchemeTypeBox of the RestrictedSchemeInfoBox of the restricted video sample entries.

It should be noted that there is no restriction on the video codec used for encoding of the attribute, geometry, and occupancy map V-PCC components. Moreover, these components may be encoded using different video codecs.

Scheme information (SchemeInformationBox) according to embodiments may be present and contain a VPCCUnitHeaderBox.

Next, referencing V-PCC component tracks is described below.

To link a V-PCC track to component video tracks, three TrackReferenceTypeBoxes may be added to a TrackReferenceBox within the TrackBox of the V-PCC track, one for each component. The TrackReferenceTypeBox contains an array of track_IDs designating the video tracks which the V-PCC track references. The reference_type of a TrackReferenceTypeBox identifies the type of the component, such as an occupancy map, geometry, or attribute. The track reference types are as follows.

In 'pcco', the referenced track(s) contain the video-coded occupancy map V-PCC component.

In 'pccg', the referenced track(s) contain the video-coded geometry V-PCC component.

In 'pcca', the referenced track(s) contain the video-coded attribute V-PCC component.

The type of the V-PCC component carried by the referenced restricted video track and signaled in the RestrictedSchemeInfoBox of the track shall match the reference type of the track reference from the V-PCC track.

Next, a single track container of the V-PCC bitstream is described below.

A single-track encapsulation of V-PCC data requires the V-PCC encoded elementary bitstream to be represented by a single-track declaration.

Single-track encapsulation of PCC data may be utilized in the case of simple ISOBMFF encapsulation of a V-PCC encoded bitstream. Such a bitstream may be directly stored as a single track without further processing. V-PCC unit header data structures may be kept in the bitstream. A single track container for V-PCC data may be provided to media workflows for further processing (e.g., multi-track file generation, transcoding, DASH segmentation, etc.).

An ISOBMFF file which contains single-track encapsulated V-PCC data may contain 'pcst' in the compatible_brands[ ] list of the FileTypeBox.

V-PCC elementary stream track:
Sample Entry Type: 'vpe1', 'vpeg'
Container: SampleDescriptionBox
Mandatory: A 'vpe1' or 'vpeg' sample entry is mandatory
Quantity: One or more sample entries may be present V-PCC elementary stream tracks use VolumetricVisualSampleEntry with a sample entry type of 'vpe1' or 'vpeg'.

A VPCC elementary stream sample entry contains a VPCCConfigurationBox.

Under the 'vpe1' sample entry, all atlas sequence parameter sets, atlas frame parameter sets, and SEIs may be in the setupUnit array. Under the 'vpeg' sample entry, atlas sequence parameter sets, atlas frame parameter sets, and SEIs may be present in this array, or in the stream.

```
Volumetric Sequences:
    class VPCCConfigurationBox extends Box('vpcC') {
        VPCCDecoderConfigurationRecord( ) VPCCConfig;
    }
    aligned(8)  class  VPCCElementaryStreamSampleEntry( )  extends
VolumetricVisualSampleEntry ('vpe1') {
        VPCCConfigurationBox config;
        VPCCBoundingInformationBox 3d_bb;
    }
```

Next, the V-PCC elementary stream sample format is described below.

A V-PCC elementary stream sample may be comprised of one or more V-PCC units which belong to the same presentation time. Each sample has a unique presentation time, a size, and a duration. A sample may be a sync sample or be decoding-wise dependent on other V-PCC elementary stream samples.

Next, a V-PCC elementary stream sync sample is described below.

A V-PCC elementary stream sync sample may satisfy all the following conditions:
It is independently decodable;
None of the samples that come after the sync sample in decoding order have any decoding dependency on any sample prior to the sync sample; and
All samples that come after the sync sample in decoding order are successfully decodable.

Next, a V-PCC elementary stream sub-sample is described below.

A V-PCC elementary stream sub-sample is a V-PCC unit which is contained in a V-PCC elementary stream sample.

A V-PCC elementary stream track contains one SubSampleInformationBox in the SampleTableBox, or in the TrackFragmentBox of each of the MovieFragmentBoxes, which lists the V-PCC elementary stream sub-samples.

The 32-bit unit header of the V-PCC unit which represents the sub-sample may be copied to the 32-bit codec_specific_parameters field of the sub-sample entry in the Sub SampleInformationBox. The V-PCC unit type of each sub-sample is identified by parsing the codec_specific_parameters field of the sub-sample entry in the SubSampleInformationBox.

Next, rendering of point cloud data is described below.

The rendering of point cloud data according to embodiments is performed by the renderer 10009 of FIG. 1, the point cloud renderer 19007 of FIG. 19, the renderer 2001 of FIG. 20, or the point cloud renderer 22004 of FIG. 22. According to embodiments, point cloud data may be rendered in a 3D space based on metadata. The user may view all or part of the region of the rendering result through a VR/AR display or a general display. In particular, the point cloud data may be rendered according to a user's viewport or the like.

Here, the viewport or the viewport region may mean a region that the user is viewing in the point cloud video. A viewpoint is a point that a user is viewing in the point cloud video, and may represent a center point of the viewport region. That is, the viewport is a region centered on the viewpoint, and the size, shape, and the like occupied by the region may be determined by a field of view (FOV).

The viewport information according to embodiments may be information on a region currently viewed in a 3D space by the user through a device or an HMD. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmitting side on a feedback channel. A display device such as a VR/AR/MR may extract a viewport region based on orientation information, the position/orientation of the user's head, vertical or horizontal FOV supported by the device, and the like. The orientation or viewport information analyzed by the reception device may be transmitted to the transmission device on a feedback channel.

The point cloud video decoder of the reception device according to the embodiments may efficiently extract or decode, from a file, only the media data of a specific region, namely, a region indicated by the orientation information and/or the viewport information based on the orientation information and/or the viewport information indicating a region currently being viewed by the user. The point cloud video encoder of the transmission device according to the embodiments may encode only the media data of a specific region, namely, a region indicated by the orientation information and/or the viewport information based on the orientation information and/or the viewport information fed back from the reception device, or may encapsulate the encoded media data into a file to be transmitted.

According to embodiments, the file/segment encapsulator of the transmission device may encapsulate all point cloud data into a file/segment based on the orientation information and/or the viewport information, or may encapsulate point cloud data indicated by the orientation information and/or the viewport information into a file/segment.

According to embodiments, the file/segment decapsulator of the reception device may decapsulate a file containing all point cloud data based on the orientation information and/or the viewport information, or a file containing point cloud data indicated by the orientation information and/or the viewport information.

According to embodiments, viewport information may be used in the same or similar meaning as ViewInfoStruct information or view information.

The viewport information according to the embodiments may also be referred to as viewport related information or viewport information related metadata. The viewport related information according to embodiments may include at least one of viewport information, rendering parameters, and object rendering information.

According to embodiments, the viewport related information may be generated/encoded by the metadata encoder 18005 of the point cloud data transmission device of FIG. 18 or the point cloud pre-processor 20001 and/or the video/image encoders 21007 and 21008 of the V-PCC system of FIG. 21, and may be acquired/decoded by the metadata decoder 19002 of the point cloud data reception device of FIG. 19 or the video/image decoders 22001 and 22002 and/or the point cloud processor 22003 of the V-PCC system of FIG. 22.

In the present disclosure, embodiments of defining metadata related to viewport (or view) information of point cloud data, and storing and signaling the metadata related to the viewport information in a file are described below.

In the present disclosure, embodiments of storing metadata related to viewport information of point cloud data dynamically changing over time in a file are described below.

In the present disclosure, embodiments of defining metadata related to rendering parameters of point cloud data, and storing and signaling metadata related to the rendering parameter in the file are described below.

In the present disclosure, embodiments of storing metadata related to a rendering parameter of point cloud data dynamically changing according to time in a file are described below.

In the present disclosure, embodiments of defining metadata related to object rendering information related to point cloud data in a file, and storing and signaling metadata related to the object rendering information in the file are described below.

In the present disclosure, embodiments of storing metadata related to object rendering information of point cloud data dynamically change according to time in a file is described below.

Figure 56:
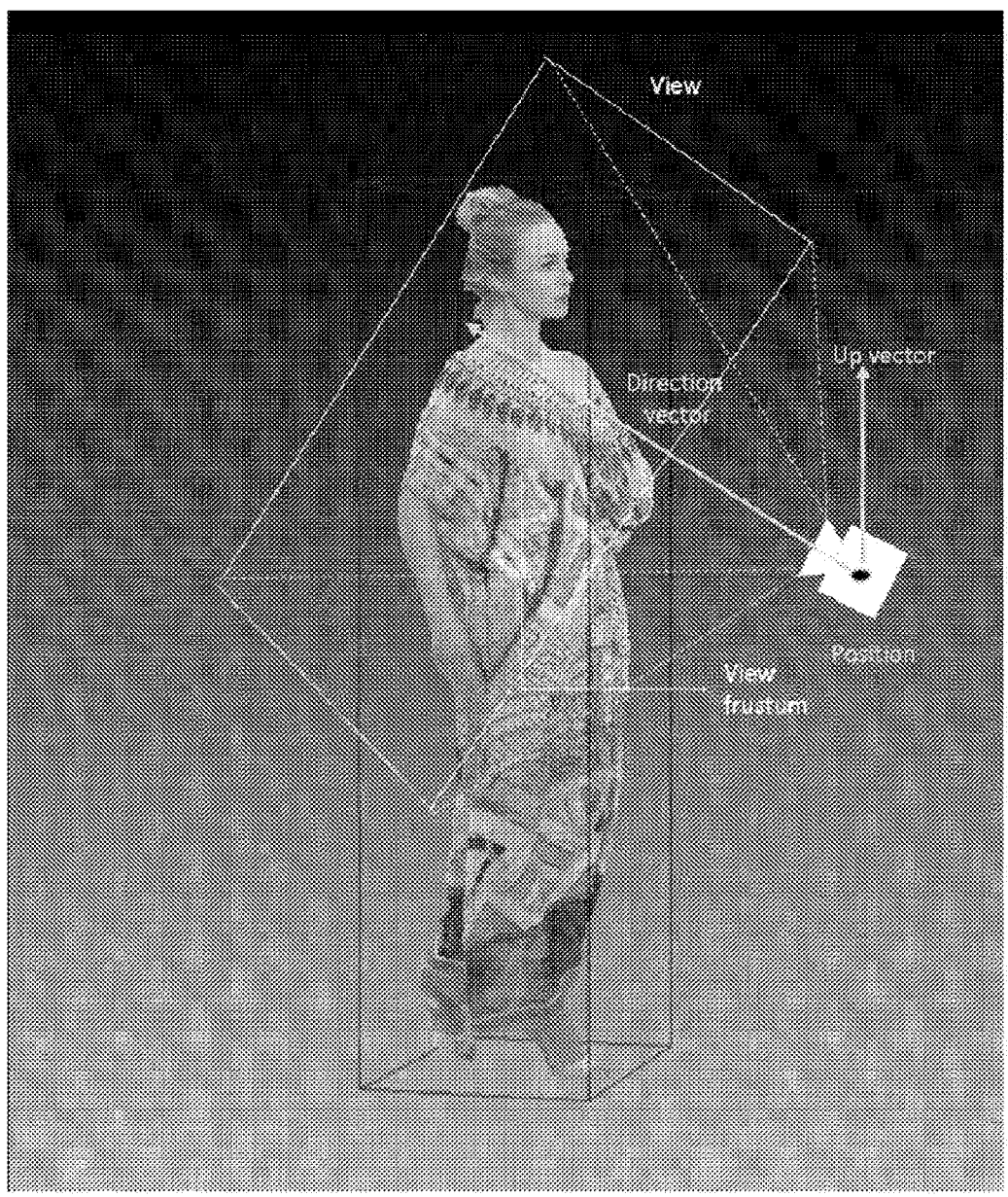
FIG. 56 illustrates an example of generating a view using a virtual camera and ViewInfoStruct information according to embodiments.

FIG. 56 illustrates an example of generating a view using a virtual camera and ViewInfoStruct information according to embodiments.

ViewInfoStruct information according to the embodiments may include detailed information for creating a view to be rendered and provided. In particular, the ViewInfoStruct may include the position information about a virtual camera in a 3D space for creating a view, a vertical/horizontal field of view (FOV) of the virtual camera, a direction vector indicating a direction in which the virtual camera faces, and an up vector indicating the upward direction of the virtual camera. The virtual camera may be similar to the user's eye, that is, the user's view of a partial region in the 3D space. The view frustum may be inferred based on the above-mentioned information. The view frustum refers to a region in a 3D space that includes all or part of the point cloud data that is actually rendered and displayed. According to embodiments, as the inferred view frustum is projected in the form of a 2D frame, a view (that is, a 2D image/video frame to be actually displayed) may be created.

The following is syntax showing an example of information included in the ViewInfoStruct.

```
aligned(8) class ViewInfoStruct( ){
    unsigned int(16)      view_pos_x;
    unsigned int(16)      view_pos_y;
    unsigned int(16)      view_pos_z;
    unsigned int(8)       view_vfov;
    unsigned int(8)       view_hfov;
    unsigned int(16)      view_dir_x;
    unsigned int(16)      view_dir_y;
    unsigned int(16)      view_dir_z;
    unsigned int(16)      view_up_x;
    unsigned int(16)      view_up_y;
    unsigned int(16)      view_up_z;
}
```

The view_pos_x, view_pos_y, and view_pos_z may indicate x, y, and z coordinate values in a 3D space of a virtual camera capable of creating a view (e.g., a 2D image/video frame to be actually displayed).

The view_vfov and view_hfov may indicate a vertical field of view (FOV) and horizontal field of view (FOV) of the virtual camera capable of creating a view.

The view_dir_x, view_dir_y, and view_dir_z may indicate x, y, and z coordinate values in a 3D space for indicating a direction vector indicating a direction viewed by the virtual camera.

The view_up_x, view_up_y, and view_up_z may indicate x, y, and z coordinate values in a three-dimensional space to represent an up vector indicating an upward direction of the virtual camera.

ViewInfoStruct( ) information according to the embodiments may be delivered in the form of SEI or the like in a point cloud bitstream as follows.

```
V-PCC view information box
aligned(8) class VPCCViewInfoBox extends FullBox('vpvi',0,0) {
    ViewInfoStruct( );
}
```

Next, static V-PCC viewport information is described below.

When the Viewport information according to the embodiments does not change within the point cloud sequence, VPCCViewInfoBox may be included in the sample entry of the V-PCC track or the sample entry of the V-PCC elementary stream track as follows.

```
aligned(8) class VPCCSampleEntry( ) extends
VolumetricVisualSampleEntry ('vpc1') {
    VPCCConfigurationBox config;
    VPCCUnitHeaderBox unit_header;
    VPCCViewInfoBox view_info;
}
```

The VPCCViewInfoBox may contain detailed information for creating a view in which point cloud data associated with an atlas frame stored in a sample within a track is rendered and provided as follows.

```
aligned(8)  class  VPCCElementaryStreamSampleEntry( )  extends
VolumetricVisualSampleEntry ('vpe1') {
    VPCCConfigurationBox config;
    VPCCViewInfoBox view_info;
}
```

The VPCCViewInfoBox may contain detailed information for creating a view in which point cloud data associated with an atlas frame or a video frame stored in sub-samples in a track is rendered and provided.

Next, V-PCC view information sample grouping is described below.

According to embodiments, the 'vpvs' grouping_type for sample grouping represents the assignment of samples in V-PCC track to the view information carried in this sample group. When a SampleToGroupBox with grouping_type equal to 'vpvs' is present, an accompanying SampleGroupDescriptionBox with the same grouping type is present, and contains the ID of this group of samples belong to).

```
aligned(8)  class  VPCCViewInfoSampleGroupDescriptionEntry( )  extends
SampleGroupDescriptionEntry('vpvs') {
    ViewInfoStruct( );
}
```

Next, dynamic V-PCC view information is described below.

If the V-PCC track has an associated timed-metadata track with a sample entry type 'dyvi', view information defined for the point cloud stream carried by the V-PCC track is considered as dynamic. That is, the view information may dynamically change over time).

The associated timed-metadata track contains a 'cdsc' track reference to the V-PCC track carrying the atlas stream.

If the V-PCC elementary stream track has an associated timed-metadata track with a sample entry type 'dyvi', view information defined for the point cloud stream is carried by the V-PCC elementary track considered as dynamic. That is, the view information may dynamically change over time.

The associated timed-metadata track contains a 'cdsc' track reference to the V-PCC elementary stream track).

```
aligned(8) class DynamicViewInfoSampleEntry extends
MetaDataSampleEntry('dyvi') {
    VPCCViewInfoBox init_view_info;
}
```

The init_view_info may include view information (view information( )) for generating an initial view of point cloud data.

The sample syntax of this sample entry type 'dyvi' may be specified as follows:

```
aligned(8) DynamicViewInfoSample( ) {
    VPCCViewInfoBox view_info;
}
```

Each sample may contain view information( ) that changes over time.

According to embodiments, RenderingParamStruct, which is a rendering parameter for rendering, may contain parameter information that may be applied in rendering point cloud data. This parameter may contain the size of a point, the rendering type of the point, how to process a duplicated point, for example, whether to display the duplicated point, and the like in rendering of the point cloud data as follows.

```
aligned(8) class RenderingParamStruct( ){
    unsigned int(16)         point_size;
    unsigned int(7)          point_type;
    unsigned int(2)          duplicated_point;
}
```

The point_size may indicate the size of a point to be rendered/displayed.

The point_type may indicate the type of a point to be rendered/displayed. For example, point_type equal to 0 may indicate a cuboid. point_type equal to 1 may indicate a circle. point_type equal to 2 may indicate a point.

The duplicated_point may indicate how to process, when present, a plurality of points having the same x, y, and z values in the 3D space. For example, when the duplicated_point is equal to 0, duplicated points may be ignored. In an embodiment, when the duplicated_point is equal to 1, only one point may be randomly selected and rendered/displayed. In an embodiment, when the duplicated_point is equal to 2, attribute values of duplicated points may be averaged and rendered/displayed based on the average attribute value.

The RenderingParamStruct( ) information may be carried in the form of SEI or the like in a point cloud bitstream as follows.

```
V-PCC rendering parameter box
aligned(8) class VPCCRenderingParamBox extends FullBox('vprp',0,0) {
    RenderingParamStruct( );
}
```

Next, the static V-PCC rendering parameter is described below.

According to embodiments, when the rendering related parameters do not change within the point cloud sequence, VPCCRenderingParamBox may be included in the sample entry of the V-PCC track or the sample entry of the V-PCC elementary stream track as follows.

```
aligned(8) class VPCCSampleEntry( ) extends
VolumetricVisualSampleEntry ('vpc1') {
    VPCCConfigurationBox config;
    VPCCUnitHeaderBox unit_header;
    VPCCRenderingParamBox rendering_param;
}
```

The VPCCRenderingParamBox may contain detailed information about a rendering parameter that may be applied when the point cloud data associated with an atlas frame stored in a sample in a track is rendered, as follows.

```
aligned(8) class VPCCElementaryStreamSampleEntry( ) extends
VolumetricVisualSampleEntry ('vpe1') {
    VPCCConfigurationBox config;
    VPCCRenderingParamBox rendering_param;
}
```

The VPCCRenderingParamBox may contain detailed information about a rendering parameter that may be applied when an atlas frame, a video frame, and point cloud data stored in sub-samples in a track are rendered.

Next, V-PCC rendering parameter sample grouping is described below.

According to embodiments, the 'vprp' grouping_type for sample grouping represents the assignment of samples in V-PCC track to the rendering parameters carried in this sample group. When a SampleToGroupBox with grouping_type equal to 'vpvs' is present, an accompanying SampleGroupDescriptionBox with the same grouping type is present, and may contain the ID of this group of samples.

```
aligned(8) class
    VPCCRenderingParamSampleGroupDescriptionEntry( ) extends
SampleGroupDescriptionEntry('vprp') {
    RenderingParamStruct( );
}
```

Next, dynamic V-PCC rendering parameter information is described below.

If the V-PCC track has an associated timed-metadata track with a sample entry type 'dyrp', rendering parameters defined for the point cloud stream carried by the V-PCC track are considered as dynamic rendering parameters. That is, the rendering parameters may dynamically change over time.

The associated timed-metadata track contains a 'cdsc' track reference to the V-PCC track carrying the atlas stream.

If the V-PCC elementary stream track has an associated timed-metadata track with a sample entry type 'dyrp', rendering parameters defined for the point cloud stream carried by the V-PCC elementary track are considered as dynamic rendering parameters. That is, the rendering parameters may dynamically change over time.

The associated timed-metadata track contains a 'cdsc' track reference to the V-PCC elementary stream track.

```
aligned(8) class DynamicRenderingParamSampleEntry extends
MetaDataSampleEntry('dyrp') {
    VPCCRenderingParamBox   init_rendering_param;
}
```

The init_rendering_param may contain an initial rendering parameter of point cloud data.

The sample syntax of the sample entry type 'dyvi' according to embodiments may be specified as follows:

```
aligned(8) DynamicRenderingParamSample( ) {
    VPCCRenderingParamBox rendering_param;
}
```

Each sample may include rendering parameters that change over time.

Figure 57:
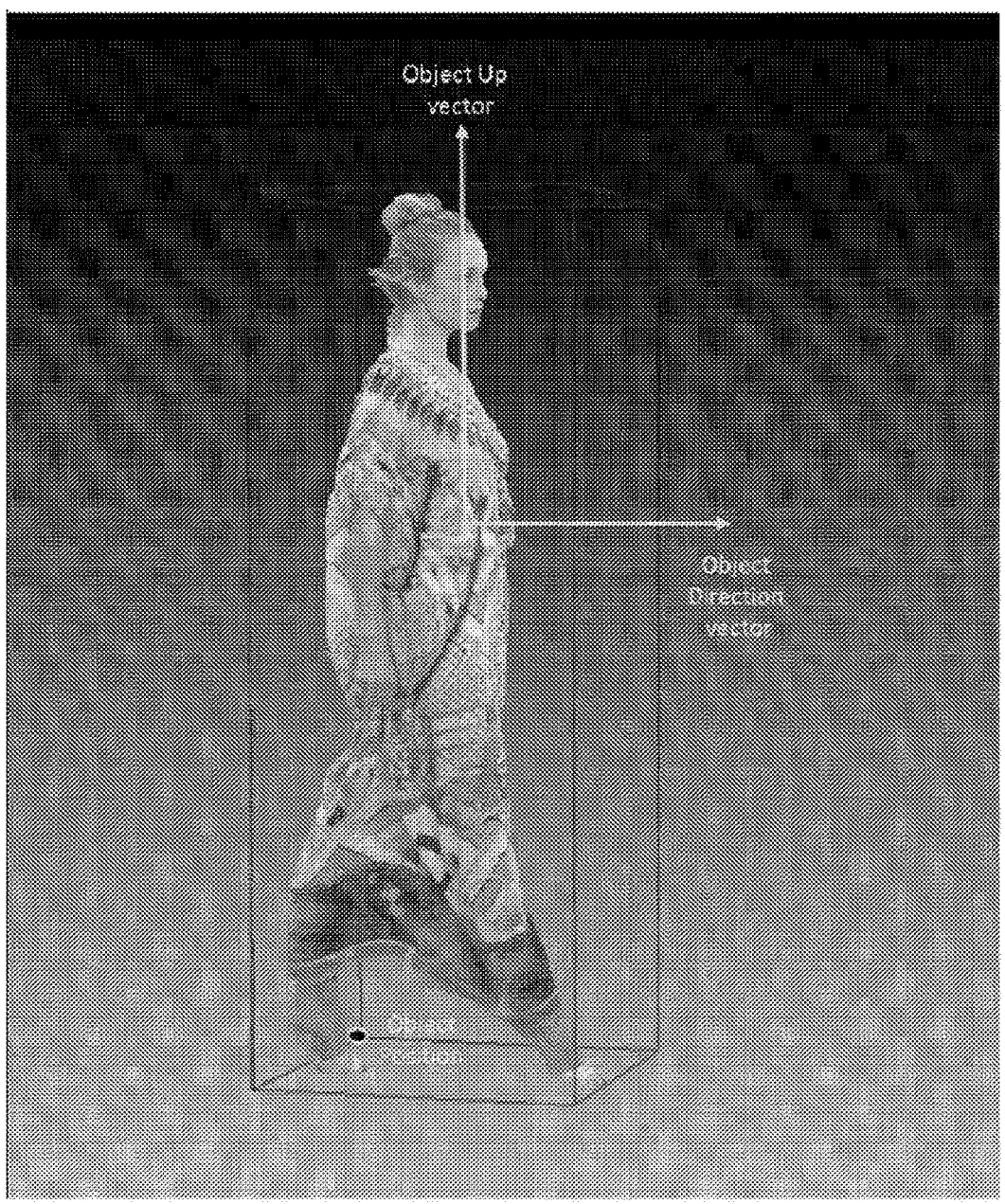
FIG. 57 illustrates an example of creating a view using ObjectRenderingInfoStruct( ) information according to embodiments.

FIG. 57 illustrates an example of creating a view using ObjectRenderingInfoStruct( ) information according to embodiments.

According to embodiments, ObjectRenderingInfoStruct, which is object rendering information, may include detailed information applied to point cloud data in rendering the point cloud data. According to embodiments, ObjectRenderingInfoStruct may contain information such as coordinate system information used by point cloud data, a position of the point cloud data in a 3D space based on the coordinate system, a normal vector of the point cloud data, and the up vector that may indicate an upward direction of the point cloud data.

```
aligned(8) class ObjectRenderingInfoStruct( ){
    unsigned int(8)          obj_id;
    unsigned int(4)          obj_coord_type;
    bit(4) reserved = 1;
    unsigned int(16)         obj_pos_x;
    unsigned int(16)         obj_pos_y;
    unsigned int(16)         obj_pos_z;
    unsigned int(16)         obj_dir_x;
    unsigned int(16)         obj_dir_y;
    unsigned int(16)         obj_dir_z;
    unsigned int(16)         obj_up_x;
    unsigned int(16)         obj_up_y;
    unsigned int(16)         obj_up_z;
    unsigned int(16)         obj_scale_x;
    unsigned int(16)         obj_scale_y;
    unsigned int(16)         obj_scale_z;
}
```

The obj_id may indicate an identifier of point cloud data.

The obj_coord_type may indicate a coordinate system used to render a point cloud. For example, when the value of obj_coord_type is 0, global coordinates may be used. For example, when the value of obj_coord_type is 1, view coordinates (i.e., a coordinate system of a virtual camera that may be used to generate viewport data) may be used.

The obj_pos_x, obj_pos_y, and obj_pos_z may indicate x, y, and z coordinate values of the origin of the bounding box of the point cloud data in the coordinate system indicated by obj_coord_type. According to embodiments, x, y, and z coordinate values of the center point of the bounding box of the point cloud data in the coordinate system indicated by obj_coord_type may be indicated.

The obj_dir_x, obj_dir_y, and obj_dir_z may indicate x, y, and z coordinate values in a 3D space for representing a direction vector (or normal vector) indicating a direction in which the point cloud data faces forward.

The obj_up_x, obj_up_y, and obj_up_z may indicate x, y, and z coordinate values in a 3D space for representing an up vector indicating an upward direction of the point cloud data.

The obj_scale_x, obj_scale_y, and obj_scale_z may indicate scaling factors to be applied to the x, y, and z axes compared to the original source of the point cloud data in rendering/display.

According to embodiments, the ObjectRenderingInfoStruct( ) information may be carried in the form of SEI or the like in a point cloud bitstream.

A V-PCC object rendering information box according to embodiments may include ObjectRenderingInfoStruct( ) information.

```
aligned(8) class VPCCObjectRenderingInfoBox extends
FullBox('vpoi',0,0) {
    ObjectRenderingInfoStruct( );
}
```

Next, static V-PCC object rendering information is described below.

According to embodiments, when object rendering information applied to point cloud data does not change within a point cloud sequence during point cloud data rendering, VPCCObjectRenderingInfoBox may be included in a sample entry of a V-PCC track or a sample entry of a V-PCC elementary stream track.

```
aligned(8) class VPCCSampleEntry( ) extends
VolumetricVisualSampleEntry ('vpc1') {
    VPCCConfigurationBox config;
    VPCCUnitHeaderBox unit_header;
    VPCCObjectRenderingInfoBox obj_rendering_info;
}
```

The VPCCObjectRenderingInfoBox may contain object rendering information associated with point cloud data associated with an atlas frame stored in a sample in a track.

```
aligned(8) class VPCCElementaryStreamSampleEntry( ) extends
VolumetricVisualSampleEntry ('vpe1') {
    VPCCConfigurationBox config;
    VPCCObjectRenderingInfoBox obj_rendering_info;
}
```

The VPCCObjectRenderingInfoBox may contain object rendering information associated with point cloud data associated with an atlas frame and/or a video frame stored in a sub-sample in a track.

Next, V-PCC object rendering information sample grouping is described below.

According to embodiments, the 'vpoi' grouping_type for sample grouping represents the assignment of samples in V-PCC track to the object rendering information carried in this sample group. When a SampleToGroupBox with grouping_type equal to 'vpoi' is present, an accompanying SampleGroupDescriptionBox with the same grouping type is present, and may contain the ID of this group of samples.

```
aligned(8) class
VPCCObjRenderingInfoSampleGroupDescriptionEntry( ) extends
SampleGroupDescriptionEntry('vpoi') {
    VPCCObjectRenderingInfoStruct( );
}
```

Next, dynamic V-PCC view information is described below.

If the V-PCC track has an associated timed-metadata track with a sample entry type 'dyoi', object rendering information defined for the point cloud stream carried by the V-PCC track is considered as dynamic rendering information. That is, the object rendering information may dynamically change over time.

The associated timed-metadata track contains a 'cdsc' track reference to the V-PCC track carrying the atlas stream.

If the V-PCC elementary stream track has an associated timed-metadata track with a sample entry type 'dyoi', object rendering information defined for the point cloud stream carried by the V-PCC elementary track is considered as dynamic. That is, the object rendering information may dynamically change over time.

The associated timed-metadata track contains a 'cdsc' track reference to the V-PCC elementary stream track.

```
aligned(8) class DynamicObjRenderingInfoSampleEntry extends
MetaDataSampleEntry('dyoi') {
    VPCCObjectRenderingInfoBox init_obj_rendering;
}
```

The init_obj_rendering may include initial object rendering information related to point cloud data.

The sample syntax of this sample entry type 'dyvi' may be specified as follows:
```
aligned(8) DynamicObjRenderingInfoSample( ) {
    VPCCObjectRenderingInfoBox obj_rendering_info;
}
```

Each sample may include object rendering information of point cloud data that changes over time.

Next, carriage of non-timed V-PCC data is described below.

Figure 58:
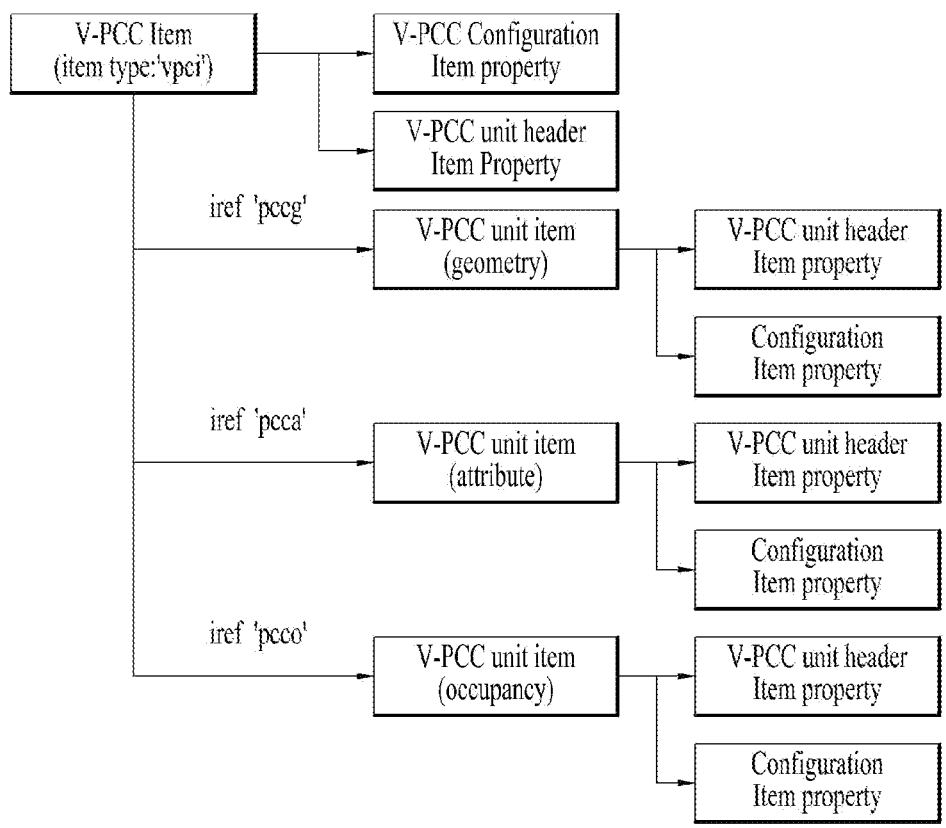
FIG. 58 is a diagram illustrating an exemplary structure for encapsulating non-timed V-PCC data according to embodiments.

FIG. 58 is a diagram illustrating an exemplary structure for encapsulating non-timed V-PCC data according to embodiments.

The non-timed V-PCC data according to embodiments may be stored in a file as image items.

According to embodiments, a new handler type 4CC code 'vpcc' is defined and stored in the HandlerBox of the MetaBox in order to indicate the presence of V-PCC items, V-PCC unit items and other V-PCC encoded content representation information.

A V-PCC item is an item which represents an independently decodable V-PCC access unit.

According to embodiments, a new handler type 4CC code 'vpcc' is defined and stored in the HandlerBox of the MetaBox in order to indicate the presence of V-PCC items. According to embodiments, V-PCC items may store V-PCC unit payload(s) of an atlas sub-bitstream.

If there is a PrimaryItemBox, the item_id in this box is set to indicate the V-PCC item.)

A V-PCC unit item according to embodiments is an item representing a V-PCC unit data. According to embodiments, V-PCC unit items may store V-PCC unit payload(s) of occupancy, geometry, and attribute video data units.

A V-PCC unit item according to embodiments shall store only one V-PCC access unit related data.

According to embodiments, an item type 4CC code for a V-PCC unit item may be set depending on the codec used to encode corresponding video data units.

According to embodiments, a V-PCC unit item may be associated with corresponding V-PCC unit header item property and codec specific configuration item property.

According to embodiments, V-PCC unit items may be marked as hidden items. This is because it is not meaningful to display independently).

According to embodiments, in order to indicate the relationship between a V-PCC item and V-PCC units, three new item reference types with 4CC codes 'pcco', 'pccg' and 'pcca' are defined. Item reference according to embodiments is defined "from" a V-PCC item "to" the related V-PCC unit items.

The 4CC codes of item reference types according to embodiments are as follows:

In type 'pcco', the referenced V-PCC unit item(s) contain the occupancy video data units.)

In type 'pccg', the referenced V-PCC unit item(s) contain the geometry video data units.

In type 'pcca', the referenced V-PCC unit item(s) contain the attribute video data units.

Next, V-PCC-related item properties is described below.)

According to embodiments, descriptive item properties are defined to carry the V-PCC parameter set information and V-PCC unit header information, respectively:

The following is an example of the syntax structure of a V-PCC configuration item property.

Box Types: 'vpcp'
Property type: Descriptive item property
Container: ItemPropertyContainerBox
Mandatory (per item): Yes, for a V-PCC item of type 'vpci'
Quantity (per item): One or more for a V-PCC item of type 'vpci'

According to embodiments, V-PCC parameter sets are stored as descriptive item properties and are associated with the V-PCC items.

According to embodiments, essential is set to 1 for a 'vpcp' item property.

```
aligned(8) class vpcc_unit_payload_struct ( ) {
    unsigned int(16) vpcc_unit_payload_size;
    vpcc_unit_payload( );
}
aligned(8) class VPCCConfigurationProperty extends ItemProperty('vpcc')
{
    vpcc_unit_payload_struct( )[ ];
}
``` vpcc_unit_payload_size specifies the size in bytes of the vpcc_unit_payload( ).

The following is an example of the syntax structure of a V-PCC unit header item property.

Box Types: 'vunt'
Property type: Descriptive item property
Container: ItemPropertyContainerBox
Mandatory (per item): Yes, for a V-PCC item of type 'vpci' and for a V-PCC unit item
Quantity (per item): One According to embodiments, V-PCC unit header is stored as descriptive item properties and is associated with the V-PCC items and the V-PCC unit items.

According to embodiments, essential is set to 1 for a 'vunt' item property.

```
aligned(8) class VPCCUnitHeaderProperty ( )
    extends ItemFullProperty('vunt', version=0, 0) {
        vpcc_unit_header( );
}
```

The following is an example of the syntax structure of a V-PCC view formation item property.

Box Types: 'vpvi'
Property type: Descriptive item property
Container: ItemPropertyContainerBox
Mandatory (per item): Yes, for a V-PCC item of type 'vpci' and for a V-PCC unit item
Quantity (per item): One According to embodiments, view information is stored as descriptive item properties and is associated with the V-PCC items and the V-PCC unit items.

```
aligned(8) class VPCCViewInfoproperty ( )
    extends ItemFullProperty('vpvi', version=0, 0) {
        ViewInfoStruct( );
}
```

The following is an example of the syntax structure of a V-PCC rendering parameter item property.

Box Types: 'vprp'
Property type: Descriptive item property
Container: ItemPropertyContainerBox
Mandatory (per item): Yes, for a V-PCC item of type 'vpci' and for a V-PCC unit item
Quantity (per item): One According to embodiments, a rendering parameter is stored as descriptive item properties and is associated with the V-PCC items and the V-PCC unit items.

```
aligned(8) class VPCCRenderingParamsproperty ( )
    extends ItemFullProperty('vprp', version=0, 0) {
        RenderingParamStruct( );
}
```

The following is an example of the syntax structure of a V-PCC object rendering information item property.

Box Types: 'vpri'
Property type: Descriptive item property
Container: ItemPropertyContainerBox
Mandatory (per item): Yes, for a V-PCC item of type 'vpci' and for a V-PCC unit item
Quantity (per item): One According to embodiments, Object rendering information is stored as descriptive item properties and is associated with the V-PCC items and the V-PCC unit items.

```
aligned(8) class VPCCObjRenderingInfoproperty ( )
extends ItemFullProperty('vpri', version=0, 0) {
    ObjectRenderingInfoStruct( );
}
```

As described above, the point cloud data transmission device according to the embodiments may provide 3D region information about V-PCC content for supporting spatial access of V-PCC content according to a user's viewport and 2D region related metadata in a video or atlas frame associated therewith.

The point cloud data transmission device according to the embodiments may process 3D region information about a point cloud in a point cloud bitstream and signaling of 2D region related information in a video or atlas frame associated therewith.

The point cloud data reception device according to the embodiments may efficiently access point cloud content based on 3D region information about a point cloud in a file, storage and signaling of 2D region related information in a video or atlas frame associated therewith, and the like.

The point cloud data reception device according to the embodiments may provide point cloud content in consideration of a user environment based on 3D region information about a point cloud associated with an image item in a file and 2D region related information in a video or atlas frame associated therewith.

According to embodiments, the viewport information may be used in the same or similar meaning to the 6DOF (Six Degrees Of Freedom) viewport information. According to embodiments, the viewport information is applicable not only to 6DOF but also to 3DOF+content.

The viewport information according to the embodiments may also be referred to as viewport related information or metadata related to viewport information. The viewport related information according to embodiments may include at least one of viewport information, recommended viewport information, or initial viewing orientation information.

According to embodiments, the viewport related information may be generated/encoded by the metadata encoder 18005 of the point cloud data transmission device of FIG. 18 or the point cloud pre-processor 20001 and/or the video/image encoders 21007 and 21008 of the V-PCC system of FIG. 21, and may be acquired/decoded by the metadata decoder 19002 of the point cloud data reception device of FIG. 19 or the video/image decoders 22001 and 22002 and/or the point cloud processor 22003 of the V-PCC system of FIG. 22.

In the present disclosure, embodiments of defining metadata related to viewport information of point cloud data or 3DOF+ video, and storing and signaling the metadata related to the viewport information in a file are described below.

In the present disclosure, embodiments of storing metadata related to viewport information of point cloud data or 3DOF+ video dynamically changing over time in a file are described below.

In the present disclosure, embodiments of defining metadata related to recommended viewport information of point cloud data or 3DOF+ video, and storing and signaling the metadata related to the recommended viewport information in a file are described below.

In the present disclosure, embodiments of storing metadata related to recommended viewport information of point cloud data or 3DOf+ video that dynamically changes over time in a file are described below.

In the present disclosure, embodiments of defining metadata related to initial viewing orientation information of point cloud data or 3DOF+ video, and storing and signaling the metadata related to the initial viewing orientation information in a file are described below.

In the present disclosure, embodiments of storing metadata related to initial viewing orientation information of point cloud data or 3DOf+ video dynamically changing over time in a file are described below.

Figure 59:
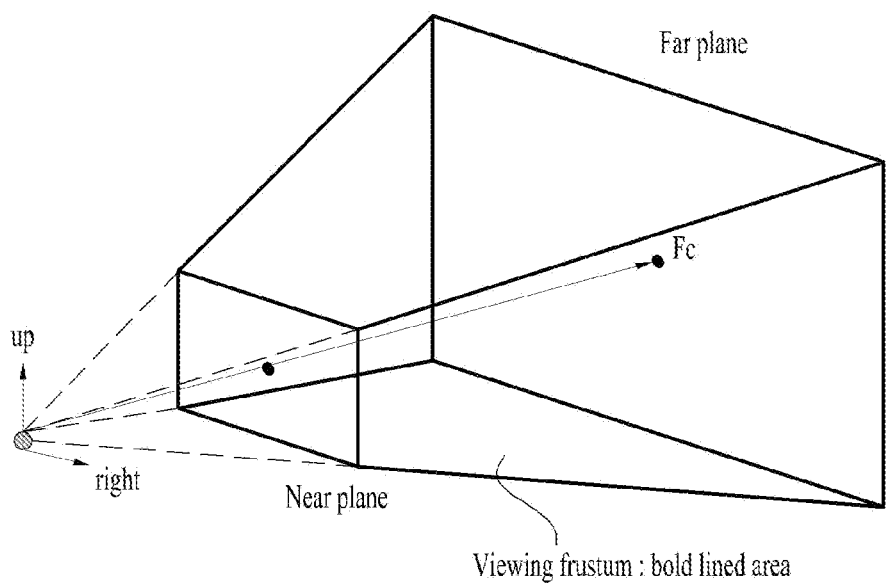
FIG. 59 is a diagram illustrating an example in which a spatial portion of point cloud data in a viewing frustum is actually displayed on a viewport according to embodiments.

FIG. 59 is a diagram illustrating an example in which a spatial portion of point cloud data in a viewing frustum is actually displayed on a viewport according to embodiments.

According to embodiments, a viewport through which point cloud data is actually provided may be defined based on a viewing frustum as shown in FIG. 59. In FIG. 59, a portion indicated by a thick line may be a viewing frustum, and point cloud data present in the viewing frustum may be actually rendered and provided to a user.

Accordingly, the 6DOF viewport may be represented using viewport information as described below. Based on the viewport information, the view frustum (i.e., the region in the 3D space including all or part of the point cloud data that is actually rendered and displayed) may be inferred. As the view frustum is projected in the form of a 2D frame, a view (2D image/video frame to be actually displayed) may be created.

Position (x, y, z) of a virtual camera or user/user view (eye) in 3D space

Up vector indicating the upward direction of the virtual camera or user/user view (eye) (the 'up' arrow in FIG. 59)

Right vector indicating the rightward direction of the virtual camera or user/user view (eye) (the 'right' arrow in FIG. 59)

Position (x, y, z) viewed by the virtual camera or user/user view (eye) (Fc in FIG. 59)

Distance from the position of the virtual camera or user/user view (eye) to the near plane Distance from the position of the virtual camera or user/user view (eye) to the far plane Horizontal FOV of the virtual camera or user/user view (eye)

Vertical FOV of the virtual camera or user/user view (eye)

Figure 60:
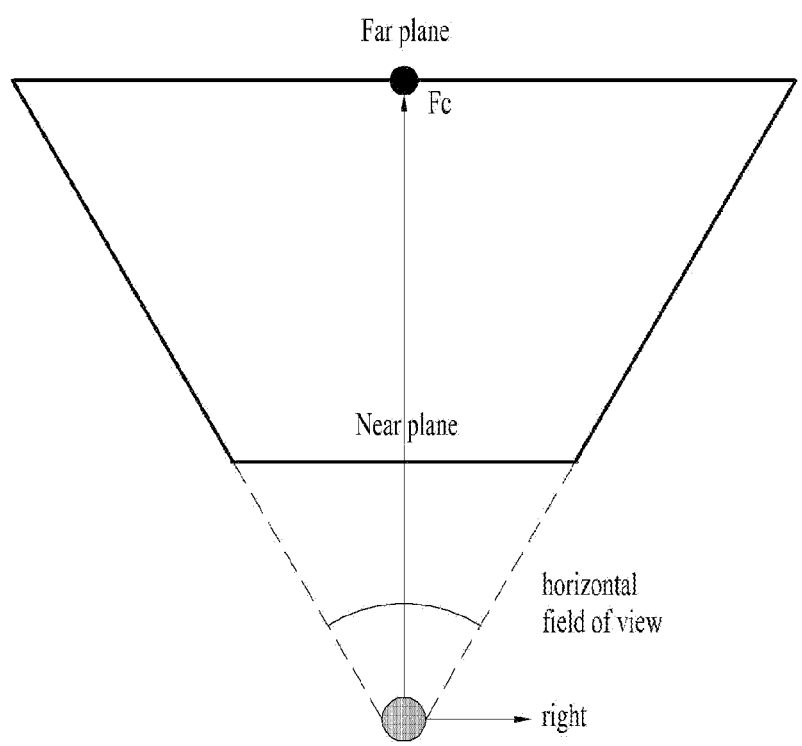
FIG. 60 shows an exemplary top view of a viewing frustum according to embodiments.

FIG. 60 shows an exemplary top view of a viewing frustum according to embodiments. That is, FIG. 60 shows an exemplary horizontal FOV of a virtual camera or a user/user view (eye).

Figure 61:
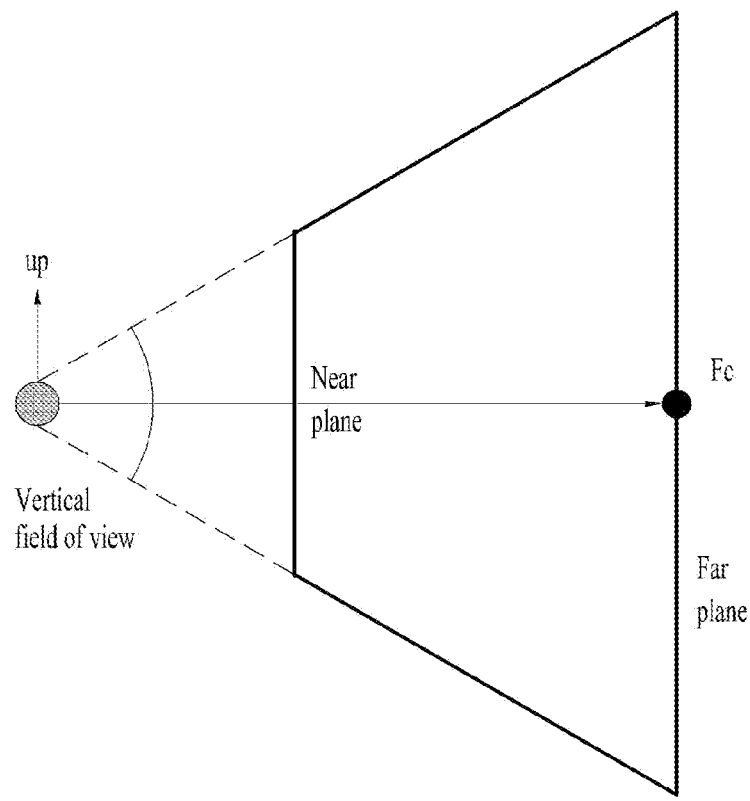
FIG. 61 shows an exemplary side view of a viewing frustum according to embodiments.

FIG. 61 shows an exemplary side view of the viewing frustum according to the embodiments. That is, FIG. 61 shows an exemplary vertical FOV of the virtual camera or user/user view (eye).

According to embodiments, ViewportInfoStruct, which is viewport information, may include detailed information for generating a viewport that is rendered and provided to a user. According to embodiments, the viewport information (ViewportInfoStruct) may include 6DOF viewport information. For example, the viewport information may include position information about a virtual camera in 3D space to generate a viewport, the vertical/horizontal field of view (FOV) of the virtual camera, a direction vector of a direction in which the virtual camera faces, and up vector information indicating an upward direction of the virtual camera, and a right vector indicating a rightward direction of the virtual camera. The viewport information may also include a distance to a near/far plane of a space in which rendering may be performed. According to embodiments, the virtual camera may coincide with the user's eye, that is, the user view in a 3D space. That is, it may be the user's view/eye in the 3D space.

The following is a syntax showing an example of information included in ViewInfoStruct information, which is viewport information.

```
aligned(8) class 6DOFViewportInfoStruct( ){
    unsigned int(16)        viewport_pos_x;
    unsigned int(16)        viewport_pos_y;
    unsigned int(16)        viewport_pos_z;
    unsigned int(16)        viewport_dir_x;
    unsigned int(16)        viewport_dir_y;
    unsigned int(16)        viewport_dir_z;
    unsigned int(16)        viewport_up_x;
    unsigned int(16)        viewport_up_y;
    unsigned int(16)        viewport_up_z;
    unsigned int(16)        viewport_right_x;
    unsigned int(16)        viewport_right_y;
    unsigned int(16)        viewport_right_z;
    unsigned int(8)         viewport_vfov;
    unsigned int(8)         viewport_hfov;
    unsigned int(16)        viewport_near_distance;
    unsigned int(16)        viewport_far_distance
}
```

The viewport_pos_x, viewport_pos_y, and viewport_pos_z may indicate the x, y, z coordinate values in the 3D space of a virtual camera (or user or user view/eye) capable of generating a viewport (e.g., a 2D image/video frame to be actually displayed).

The viewport_dir_x, viewport_dir_y, and viewport_dir_z may indicate x, y, and z coordinate values in the 3D space for representing a direction vector indicating a direction in which the virtual camera (or user or user view/eye) faces.

The viewport_up_x, viewport_up_y, and viewport_up_z may indicate x, y, and z coordinate values in the 3D space for representing an up vector indicating an upward direction of the virtual camera (or user or user view/eye).

The viewport_right_x, viewport_right_y, and viewport_right_z may indicate x, y, and z coordinate values in the 3D space for representing a right vector indicating a rightward direction of the virtual camera (or user or user view/eye).

A coordinate system of the virtual camera (or user, user view/eye) may be generated based on the direction vector, up vector, and right vector. That is, the right vector may be the x-axis, the up vector may be the y-axis, and the direction vector may be the z-axis. Alternatively, the x, y, and z axes of the virtual camera may be signaled through additional signaling.

The viewport_hfov may indicate the horizontal FOV of the virtual camera (or user, user view/eye) capable of generating a viewport as shown in FIG. 60.

As shown in FIG. 61, the viewport_vfov may indicate the vertical FOV of the virtual camera (or user, user view/eye) capable of generating a viewport.

The 6DOF viewport information structure according to embodiments may include the following information.

```
aligned(8) class 6DOFViewportInfoStruct ( ){
    unsigned int(1)         viewport_right_vector_flag;
    unsigned int(1)         dimension_flag;
    unsigned int(16)        viewport_pos_x;
    unsigned int(16)        viewport_pos_y;
    unsigned int(16)        viewport_pos_z;
    unsigned int(16)        viewport_dir_x;
    unsigned int(16)        viewport_dir_y;
    unsigned int(16)        viewport_dir_z;
    unsigned int(16)        viewport_up_x;
    unsigned int(16)        viewport_up_y;
    unsigned int(16)        viewport_up_z;
    if(viewport_right_vector_flag){
        unsigned int(16)        viewport_right_x;
        unsigned int(16)        viewport_right_y;
        unsigned int(16)        viewport_right_z;
    }
    if(dimension_flag){
        unsigned int(8)         viewport_vfov;
        unsigned int(8)         viewport_hfov;
        unsigned int(16)        viewport_near_distance;
        unsigned int(16)        viewport_far_distance
    }
}
```

The viewport_right_vector_flag may be a flag indicating whether viewport information includes right vector information indicating a rightward direction of a viewport.

The dimension_flag may be a flag indicating whether the viewport information includes information on a vertical field of view, a horizontal field of view, a near plane, and a far plane of the viewport.

The ViewportInfoStruct( ) information may be carried in an SEI or the like in the point cloud bitstream.

Next, a 6DOF viewport information box is described below.

The 6DOF viewport information box may contain viewport information about point cloud data (which may include V-PCC) or viewport information about content of 3DOF+ video.

```
aligned(8) class 6DOFViewportInfoBox extends FullBox('vpvi',0,0) {
    6DOFViewportInfoStruct( );
}
```

Next, static 6DOF viewport information is described below.

According to embodiments, when the viewport information does not change within the point cloud data or 3DOF+ video sequence, 6DOFViewportInfoBox may be included in the sample entry of the V-PCC track or the sample entry of the V-PCC elementary stream track as follows.

```
aligned(8) class VPCCSampleEntry( ) extends
VolumetricVisualSampleEntry ('vpc1') {
    VPCCConfigurationBox config;
    VPCCUnitHeaderBox unit_header;
    6DOFViewportInfoBox        6dof_viewport;
}
```

The 6DOFViewportInfoBox according to the embodiments may contain detailed information for generating a viewport through which a 3DOf+ video or point cloud data associated with an atlas frame stored in a sample in a track is rendered and provided.

```
aligned(8) class VPCCElementaryStreamSampleEntry( ) extends
VolumetricVisualSampleEntry ('vpe1') {
    VPCCConfigurationBox config;
    6DOFViewportInfoBox 6dof_viewport;
}
```

The 6DOFViewportInfoBox according to the embodiments may contain detailed information for generating a viewport through which a 3DOF+ video or point cloud data associated with an atlas frame and/or a video frame stored in a sub-sample in a track is rendered and provided.

Next, 6DOF viewport information sample grouping is described below.

According to embodiments, the 'vpvs' grouping_type for sample grouping represents the assignment of samples in V-PCC track to the viewport information carried in this sample group. When a SampleToGroupBox with grouping_type equal to 'vpvs' is present, an accompanying SampleGroupDescriptionBox with the same grouping type is present, and contains the ID of this group of samples.

```
aligned(8) class 6DOFViewportInfoSampleGroupDescriptionEntry( )
    extends
SampleGroupDescriptionEntry('vpvs') {
    6DOFViewportInfoStruct( );
}
```

Next, dynamic 6DOF viewport information is described below.

According to embodiments, viewport information of point cloud data or 3DOF+ video sequence that changes over time may be signaled.

If the V-PCC track has an associated timed-metadata track with a sample entry type 'dyvp', viewport information defined for the point cloud stream carried by the V-PCC track is considered as dynamic. That is, the viewport information may dynamically change over time).

The associated timed-metadata track contains a 'cdsc' track reference to the V-PCC track carrying the atlas stream.

If the V-PCC elementary stream track has an associated timed-metadata track with a sample entry type 'dyvp', viewport information defined for the point cloud stream carried by the V-PCC elementary stream track is considered as dynamic. That is, the viewport information may dynamically change over time.

The associated timed-metadata track contains a 'cdsc' track reference to the V-PCC elementary stream track.

```
aligned(8) class DynamicViewportInfoSampleEntry extends
MetaDataSampleEntry('dyvp') {
    6DOFViewportInfoBox      init_6dof_viewport;
}
```

The init_6dof_viewport may include point cloud data or viewport information (viewport information( )) for generating an initial viewport of a 3DOF+ video.

According to embodiments, the sample syntax of this sample entry type 'dyvp' may be specified as follows:

```
aligned(8) DynamicViewInfoSample( ) {
    6DOFViewportInfoBox     6dof_viewport;
}
```

Each sample may include viewport information, that is, viewport information( ), of 3DOF+video or point cloud data that changes over time.

Next, signaling of 6DOF recommended viewport information is described below.

The 6DOF recommended viewport information box according to embodiments may include viewport information (6DOF recommended viewport information) recommended through point cloud data, intention of a content creator of 3DOF+ video, or viewing statistics.

```
aligned(8) class 6DOFRecommendedViewportInfoBox extends
FullBox('vpvi',0,0) {
    6DOFViewportInfoStruct( );
}
```

Next, static 6DOF recommended viewport information is described below.

If the recommended viewport information according to the embodiments does not change within the point cloud data or 3DOF+ video sequence, 6DOFRecommendedViewportInfoBox may be included in the sample entry of the V-PCC track or the sample entry of the V-PCC elementary stream track.

```
aligned(8) class VPCCSampleEntry( ) extends
VolumetricVisualSampleEntry ('vpc1') {
    VPCCConfigurationBox config;
    VPCCUnitHeaderBox unit_header;
    6DOFRecommendedViewportInfoBox 6dof_rec_viewport;
}
```

The 6DOFRecommendedViewportInfoBox according to the embodiments may contain detailed information for generating a recommended viewport through which 3DOF+ video or point cloud data associated with an atlas frame stored in a sample in a track may be rendered and provided.

```
aligned(8) class VPCCElementaryStreamSampleEntry( ) extends
VolumetricVisualSampleEntry ('vpe1') {
    VPCCConfigurationBox config;
    6DOFRecommendedViewportInfoBox 6dof_rec_viewport;
}
```

The 6DOFRecommendedViewportInfoBox according to the embodiments may contain detailed information for generating a recommended viewport through which a 3DOF+ video or point cloud data associated with an atlas frame and/or a video frame stored in a sub-sample in a track may be rendered and provided.

Next, 6DOF viewport information sample grouping is described below.

According to embodiments, the 'vpvs' grouping_type for sample grouping represents the assignment of samples in V-PCC track to the recommended viewport information carried in this sample group. When a SampleToGroupBox with grouping_type equal to 'vprv' is present, an accompanying SampleGroupDescriptionBox with the same grouping type may be present, and contain the ID of this group of samples.

```
aligned(8) class
6DOFRecommendedViewportInfoSampleGroupDescriptionEntry( )
extends SampleGroupDescriptionEntry('vprv') {
    6DOFViewportInfoStruct( );
}
```

Next, dynamic 6DOF recommended viewport information is described.

According to embodiments, recommended viewport information of point cloud data or 3DOF+ video sequence that changes over time may be signaled.

If the V-PCC track has an associated timed-metadata track with a sample entry type 'dyrv', recommended viewport information defined for the point cloud stream carried by the V-PCC track is considered as dynamic. That is, the recommended viewport information may dynamically change over time.

The associated timed-metadata track contains a 'cdsc' track reference to the V-PCC track carrying the atlas stream).

If the V-PCC elementary stream track has an associated timed-metadata track with a sample entry type 'dyrv', recommended viewport information defined for the point cloud stream carried by the V-PCC elementary track considered as dynamic. That is, the recommended viewport information may dynamically change over time.

The associated timed-metadata track contains a 'cdsc' track reference to the V-PCC elementary stream track.

```
aligned(8) class DynamicRecommendedViewportInfoSampleEntry
extends MetaDataSampleEntry('dyrv') {
    6DOFRecommendedViewportInfoBox init_6dof_rec_viewport;
}
```

The init_6dof rec_viewport may include recommended viewport information( ) for generating an initial recommended viewport of point cloud data or 3DOF+ video.

The sample syntax of this sample entry type 'dyl' may be specified as follows:

```
aligned(8) DynamicViewInfoSample( ) {
    6DOFRecommendedViewportInfoBox 6dof_rec_viewport;
}
```

Each sample may contain recommended viewport information, that is, recommended viewport information( ) of 3DOF+ video or point cloud data that changes over time.

Next, signaling of 6DOF initial viewing orientation is described.

According to embodiments, the 6DOF initial viewing orientation information box may contain initial viewing orientation information of the content of the 3DOF+ video or point cloud data.

```
aligned(8) class 6DOFInitialViewingOrientationStruct( ){
    6DOFViewportInfoStruct( );
}
```

Alternatively, information contained in the 6DOF initial viewing orientation information box may be as follows.

```
Aligned(8) class 6DOFInitialViewingOrientationStruct( ){
    unsigned int(16) viewport_pos_x;
    unsigned int(16) viewport_pos_y;
    unsigned int(16) viewport_pos_z;
    unsigned int(16) viewport_dir_x;
    unsigned int(16) viewport_dir_y;
    unsigned int(16) viewport_dir_z;
    unsigned int(16) viewport_up_x;
    unsigned int(16) viewport_up_y;
    unsigned int(16) viewport_up_z;
    unsigned int(16) viewport_right_x;
    unsigned int(16) viewport_right_y;
    unsigned int(16) viewport_right_z;
}
```

The viewport_pos_x, viewport_pos_y, and viewport_pos_z may indicate the x, y, z coordinate values in the 3D space of a virtual camera (or user or user view/eye) capable of generating a viewport (e.g., a 2D image/video frame to be actually displayed).

The viewport_dir_x, viewport_dir_y, and viewport_dir_z may indicate x, y, and z coordinate values in the 3D space for representing a direction vector indicating a direction in which the virtual camera (or user or user view/eye) faces.

The viewport_up_x, viewport_up_y, and viewport_up_z may indicate x, y, and z coordinate values in the 3D space for representing an up vector indicating an upward direction of the virtual camera (or user or user view/eye).

The viewport_right_x, viewport_right_y, and viewport_right_z may indicate x, y, and z coordinate values in the 3D space for representing a right vector indicating a rightward direction of the virtual camera (or user or user view/eye).

A coordinate system of the virtual camera (or user, user view/eye) may be generated based on the direction vector, up vector, and right vector. That is, the right vector may be the x-axis, the up vector may be the y-axis, and the direction vector may be the z-axis. Alternatively, the x, y, and z axes of the virtual camera may be signaled through additional signaling.

```
aligned(8) class 6DOFInitialViewingInfoBox extends FullBox('vpiv',0,0)
{
    6DOFInitialViewingOrientationStruct ( );
}
```

Next, static 6DOF initial viewing orientation information is described below.

According to embodiments, when the initial viewing orientation information does not change within the point cloud data or 3DOF+ video sequence, 6DOFInitialViewingInfoBox may be included in the sample entry of the V-PCC track or the sample entry of the V-PCC elementary stream track.

```
aligned(8) class VPCCSampleEntry( ) extends
VolumetricVisualSampleEntry ('vpc1') {
    VPCCConfigurationBox config;
    VPCCUnitHeaderBox unit_header;
    6DOFInitialViewingInfoBox 6dof_init_orientation;
}
```

According to embodiments, the 6DOFInitialViewingInfoBox may contain detailed information for generating an initial viewing orientation through which a 3DOF+ video or point cloud data associated with an atlas frame stored in a sample in a track may be rendered and provided.

```
aligned(8) class VPCCElementaryStreamSampleEntry( ) extends
VolumetricVisualSampleEntry ('vpe1') {
    VPCCConfigurationBox config;
    6DOFInitialViewingInfoBox 6dof_intial_orientaton;
}
```

According to embodiments, the 6DOFInitialViewingInfoBox may contain detailed information for generating an initial viewing orientation through which a 3DOF+ video or point cloud data associated with an atlas frame and/or a video frame stored in a sub-sample in a track may be rendered and provided.

Next, 6DOF viewport information sample grouping is described below.

According to embodiments, the 'vpvs' grouping_type for sample grouping represents the assignment of samples in V-PCC track to the initial viewing orientation information carried in this sample group. When a SampleToGroupBox with grouping_type equal to 'vprv' is present, an accompanying SampleGroupDescriptionBox with the same grouping type may be present, and contain the ID of this group of samples.

```
aligned(8) class
    6DOFInitialViewingInfoSampleGroupDescriptionEntry( )
    extends SampleGroupDescriptionEntry('vprv') {
    6DOFViewportInfoStruct( );
}
```

Next, dynamic 6DOF initial viewing orientation information is described below.

According to embodiments, initial viewing orientation information of point cloud data or 3DOF+ video sequence that changes over time may be signaled.

If the V-PCC track has an associated timed-metadata track with a sample entry type 'dyiv', initial viewing orientation information defined for the point cloud stream carried by the V-PCC track is considered as dynamic. That is, the initial viewing orientation information may dynamically change over time.

The associated timed-metadata track contains a 'cdsc' track reference to the V-PCC track carrying the atlas stream.

If the V-PCC elementary stream track has an associated timed-metadata track with a sample entry type 'dyiv', initial viewing orientation information defined for the point cloud stream carried by the V-PCC elementary stream track is considered as dynamic. That is, the initial viewing orientation information may dynamically change over time)).

The associated timed-metadata track contains a 'cdsc' track reference to the V-PCC elementary stream track.

```
aligned(8) class DynamicInitialViewingInfoSampleEntry extends
MetaDataSampleEntry('dyiv') {
    6DOFInitialViewingInfoBox init_6dof_orientation;
}
```

The init_6dof orientation may include initial viewing orientation information( ) of point cloud data or 3DOF+ video.

According to embodiments, the sample syntax of this sample entry type 'dyrv' may be specified as follows:

```
aligned(8) DynamicViewInfoSample( ) {
    6DOFInitialViewingInfoBox 6dof_viewing_orienation;
}
```

Each sample may contain viewing orientation information of point cloud data or 3DOF+video that changes over time, that is, viewing orientation information ( ).

Next, the 6DOF viewport information item property is described below.

According to embodiments, information on the viewport of a 3DOF+ video image or a point cloud image item (6DOF viewport information) may be delivered through signaling as follows.

Box Types: 'vpvi'
Property type: Descriptive item property
Container: ItemPropertyContainerBox
Mandatory (per item): Yes, for a V-PCC item of type 'vpci' and for a V-PCC unit item
Quantity (per item): One According to embodiments, viewport information is stored as descriptive item properties and is associated with the V-PCC items and the V-PCC unit items.

```
aligned(8) class 6DOFViewPortInfoproperty ( ) extends
ItemFullProperty('vpvi', version=0, 0) {
    ViewportInfoStruct( );
}
```

Next, the 6DOF recommended viewport information item property is described.

According to embodiments, information on a recommended viewport of a 3D0+video image or a point cloud image item (6DOF recommended viewport information) may be delivered through signaling as follows.

Box Types: 'vprv'
Property type: Descriptive item property
Container: Item PropertyContainerBox
Mandatory (per item): Yes, for a V-PCC item of type 'vpci' and for a V-PCC unit item
Quantity (per item): One According to embodiments, recommended viewport information is stored as descriptive item properties and is associated with the V-PCC items and the V-PCC unit items.

```
aligned(8) class 6DOFRecommendedViewPortInfoproperty ( )
extends ItemFullProperty('vprv', version=0, 0) {
    ViewportInfoStruct( );
}
```

Next, the 6DOF initial viewing orientation information item property is described below.

According to embodiments, information on the initial viewing orientation of a 3D0+video image or a point cloud image item (6DOF initial viewing orientation information) may be delivered through signaling as follows.

Box Types: 'vpiv'
Property type: Descriptive item property
Container: ItemPropertyContainerBox
Mandatory (per item): Yes, for a V-PCC item of type 'vpci' and for a V-PCC unit item
Quantity (per item): One According to embodiments, initial viewing orientation information is stored as descriptive item properties and is associated with the V-PCC items and the V-PCC unit items.

```
aligned(8) class 6DOFRecommendedViewPortInfoproperty ( )
extends ItemFullProperty('vpiv', version=0, 0) {
    6DOFInitialViewingOrientationStruct ( );
}
```

The metadata (or signaling information) described above may be generated (or encoded or encapsulated) by the PCC process of the point cloud data transmission method/device, and used in the process of the point cloud data reception method/device process according to the embodiments. Thereby, optimized PCC content may be provided to the user.

Figure 62:
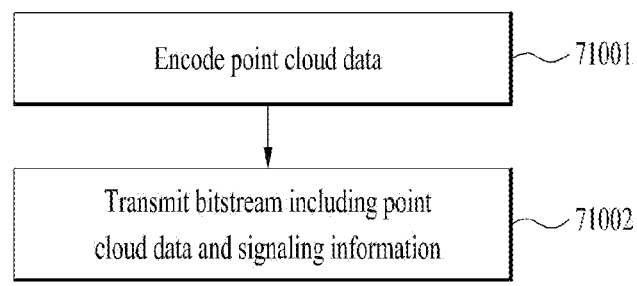
FIG. 62 illustrates an example of a method of transmitting point cloud data according to embodiments.

FIG. 62 illustrates an example of a method of transmitting point cloud data according to embodiments.

The point cloud data transmission method according to the embodiments may include encoding point cloud data (71001), and/or transmitting a bitstream containing the point cloud data and signaling information (71002).

In operation 71001 according to the embodiments, the point cloud data may be encoded. In operation 71001 according to the embodiments, only media data of a specific region, that is, a region indicated by the orientation information and/or the viewport related information may be encoded, based on the orientation information fed back from the reception device and/or the viewport related information described above. The viewport related information according to the embodiments may include at least one of viewport information, recommended viewport information, or initial viewing orientation (i.e., viewpoint) information. Since detailed information included in the viewport related information has been sufficiently described above, description thereof will be omitted. For example, the transmission device 10000 of FIG. 1 and/or the point cloud video encoder 10002 may perform the encoding. According to embodiments, point cloud data as shown in FIG. 3 may be encoded. The point cloud data may be encoded by the V-PCC encoding process of FIG. 4. The point cloud data may be encoded based on the method as in FIGS. 5 to 14. In addition, the point cloud data may be encoded by the encoder of FIG. 15.

In operation 71002 according to the embodiments, the point cloud data or a bitstream containing the point cloud data and signaling information may be transmitted. The bitstream containing the point cloud data may be transmitted by the transmission device 10000 and the transmitter 10004 of FIG. 1. The signaling information is also referred to as metadata, and may include the above-described syntaxes (including viewport related information). The point cloud data (or the bitstream containing the point cloud data) may be transmitted in the form of a file/segment by the file/segment encapsulator 10003.

In operation 71002 according to the embodiments, all the point cloud data may be encapsulated into a file/segment based on the orientation information and/or viewport related information, or point cloud data indicated by the orientation information and/or viewport related information may be encapsulated into a file/segment. The viewport related information according to the embodiments may include at least one of viewport information, recommended viewport information, or initial viewing orientation information. Since detailed information included in the viewport-related information has been sufficiently described above, description thereof will be omitted. The point cloud data transmission process may be performed by the transmission device of FIG. 18. In addition, the point cloud data may be transmitted by the V-PCC system of FIGS. 20 to 22. Furthermore, the point cloud data may be provided to the user in combination with various devices over the network of FIG. 23.

The point cloud data transmission method/device according to the embodiments may be combined with all/part of the above-described embodiments to provide point cloud content.

Figure 63:
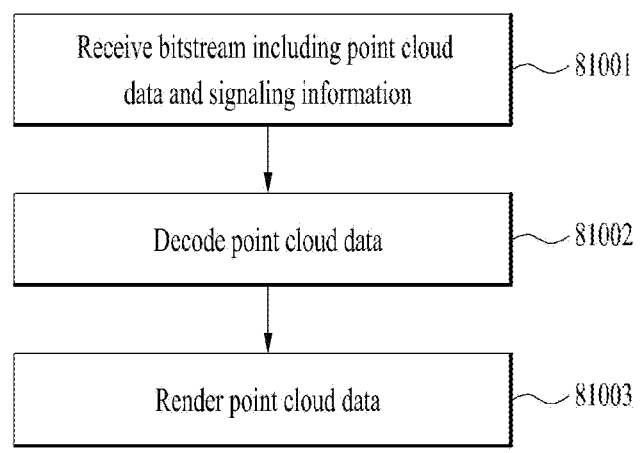
FIG. 63 illustrates an example of a method of receiving point cloud data according to embodiments.

FIG. 63 illustrates an example of a method of receiving point cloud data according to embodiments.

The point cloud data reception method according to the embodiments includes receiving a bitstream containing point cloud data and signaling information (81001), decoding the point cloud data (81002), and/or rendering the point cloud data (81003).

In operation 81001 according to the embodiments, a bitstream containing point cloud data may be received. In the point cloud data reception method, the bitstream containing the point cloud data may be received in the form of a file/segment. According to embodiments, in operation 81001, the file including all point cloud data may be decapsulated based on orientation information and/or viewport related information, or a file including point cloud data indicated by the orientation information and/or viewport related information may be decapsulated. The viewport related information according to the embodiments may include at least one of viewport information, recommended viewport information, or initial viewing orientation information. Since detailed information included in the viewport-related information has been sufficiently described above, description thereof will be omitted. The reception device 10005 and the receiver 10006 of FIG. 1 may receive a bitstream (or a file/segment including the bitstream). The file/segment decapsulator 10007 of FIG. 1 may decapsulate the point cloud data in the form of a file/segment. It has been described above that the reception device according to the embodiments performs the receiving process of FIG. 19 from the receiving operation to the rendering operation.

In operation 81002 according to the embodiments, the point cloud data is decoded. In operation 81002 according to the embodiments, only the media data of a specific region, namely, a region indicated by the orientation information and/or the viewport information, may be efficiently extracted or decoded from the file based on the orientation information and/or the viewport related information indicating the region currently being viewed by the user. The viewport related information according to the embodiments may include at least one of viewport information, recommended viewport information, or initial viewing orientation information. Since detailed information included in the viewport-related information has been sufficiently described above, description thereof will be omitted. The point cloud video decoder 10008 of FIG. 1 may decode the point cloud data. The decoder may perform the V-PCC decoding process by the operations shown in FIG. 16. The bitstream containing the point cloud data may be decoded by a decoder as shown in FIG. 17. The point cloud data may be processed by a system configured to process point cloud data as shown in FIGS. 20 to 22. In addition, as shown in FIG. 23, the point cloud data may be provided to a user through various devices/environments connected over a network.

In operation 81003 according to the embodiments, the point cloud data is rendered/displayed.

In operation 81003 according to the embodiments, the rendering of the point cloud data may be performed by the renderer 10009 of FIG. 1, the point cloud renderer 19007 of FIG. 19, the renderer 2001 of FIG. 20, or the point cloud renderer 22004 of FIG. 22. According to embodiments, the point cloud data may be rendered in a 3D space based on metadata. The user may view all or part of the rendered result through a VR/AR display or a general display. In particular, the point cloud data may be rendered according to a user's viewport or the like.

The viewport related information according to the embodiments may be information on a region currently viewed by the user through a device or an HMD in a 3D space. Based on this information, a gaze analysis may be performed to check the way the user consumes the point cloud video, a region of the point cloud video the user is gazing at, and the time for which the user gazes at the region. The gaze analysis may be performed at the receiving side and the result of the gaze analysis may be transmitted to the transmitting side through a feedback channel. A display device such as VR/AR/MR may extract a viewport region based on orientation information, a position/orientation of the user's head, and a vertical or horizontal FOV supported by the device. The orientation or viewport related information may be extracted or calculated by the reception device. The orientation or viewport related information analyzed by the reception device may be transmitted to the transmission device through a feedback channel.

The viewport related information according to the embodiments may include at least one of viewport information, recommended viewport information, or initial viewing orientation information. Since detailed information included in the viewport-related information has been sufficiently described above, description thereof will be omitted.

The method/device for receiving point cloud data according to the embodiments may be combined with all/part of the above-described embodiments to provide point cloud content.

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as an autonomous driving service.

With a point cloud data transmission method, a point cloud data transmission device, a point cloud data reception method, and a point cloud data reception device according to embodiments, a V-PCC bitstream may be configured, and a file may be transmitted and received and stored. Thereby, an optimal point cloud content service may be provided.

With a point cloud data transmission method, a point cloud data transmission device, a point cloud data reception method, and a point cloud data reception device according to embodiments, metadata for data processing and rendering in a V-PCC bitstream may be transmitted and received in the V-PCC bitstream. Thereby, an optimal point cloud content service may be provided.

With a point cloud data transmission method, a point cloud data transmission device, a point cloud data reception method, and a point cloud data reception device according to embodiments, a player or the like may enable a spatial or partial access of a point cloud object/content according to a user viewport. Accordingly, point cloud bitstreams may be efficiently accessed and processed according to the user viewport.

With a point cloud data transmission method, a point cloud data transmission device, a point cloud data reception method, and a point cloud data reception device according to embodiments, a bounding box for partial access and/or spatial access to point cloud content and signaling information therefor may be provided. Accordingly, the point cloud content may be accessed in various ways on the receiving side in consideration of the player environment or user environment.

A point cloud data transmission method and transmission device according to embodiments may provide 3D region information about the point cloud content and 2D region related metadata in a video or atlas frame associated therewith to support spatial/partial access to the point cloud content according to a user viewport.

A point cloud data transmission method and transmission device according to embodiments may process signaling of 3D region information about a point cloud in a point cloud bitstream and 2D region related metadata in a video or atlas frame associated therewith.

With a point cloud data reception method and reception device according to embodiments, point cloud content may be efficiently accessed based on storage and signaling of 3D region information about a point cloud in a point cloud bitstream and 2D region related metadata in a video or atlas frame associated therewith.

With a point cloud data reception method and reception device according to embodiments, point cloud content may be provided in consideration of a user environment based on 3D region information about a point cloud associated with an image item in a file and 2D region related information in a video or atlas frame associated therewith.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

It will be appreciated by those skilled in the art that various modifications and variations may be made in the embodiments without departing from the scope of the disclosures. Thus, it is intended that the present disclosure cover the modifications and variations of the embodiments provided they come within the scope of the appended claims and their equivalents.

Both apparatus and method disclosures are described in this specification and descriptions of both the apparatus and method disclosures are complementarily applicable.

In this document, the term "I" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

Embodiments may include variations/modifications within the scope of the claims and their equivalents.

It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

As described above, related details have been described in the best mode for carrying out the embodiments.

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A point cloud data transmission method by an apparatus, the method comprising:
encoding point cloud data;
encapsulating a bitstream that includes the encoded point cloud data into a file according to an ISO base media file format (ISOBMFF); and
transmitting the file,
wherein the bitstream is stored in at least one of multiple tracks of the file, each track including a sample entry and a sample,
wherein the file further includes signaling information,
wherein the signaling information includes viewport-related information for the point cloud data,
wherein the viewport-related information includes at least initial viewport-related information or dynamic viewport-related information that changes over time,
wherein a track of the multiple tracks is a timed metadata track with a sample entry type of a value, the value indicating that the timed metadata track is for the viewport-related information,
wherein the initial viewport-related information is carried through a sample entry of the timed metadata track, and
wherein the dynamic viewport-related information is carried through a sample of the timed metadata track.

2. The method of claim 1,
wherein the point cloud data include geometry data, attribute data, and occupancy map data, which are encoded by a video based point cloud compression (V-PCC) scheme.

3. The method of claim 1,
wherein the viewport-related information includes position information of a camera.

4. The method of claim 3,
wherein the viewport-related information further includes direction information of the camera.

5. The method of claim 3,
wherein the viewport-related information further includes horizontal field of view (FOV) information and vertical FOV information for generating a viewport.

6. A point cloud data transmission apparatus, the apparatus comprising:
an encoder for encoding point cloud data;
an encapsulator for encapsulating a bitstream that includes encoded point cloud data into a file according to an ISO base media file format (ISOBMFF); and
a transmitter for transmitting the file,
wherein the bitstream is stored in at least one of multiple tracks of the file, each track including a sample entry and a sample,
wherein the file further includes signaling information,
wherein the signaling information includes viewport-related information for the point cloud data,
wherein the viewport-related information includes at least initial viewport-related information or dynamic viewport-related information that changes over time, wherein a track of the multiple tracks is a timed metadata track with a sample entry type of a value, the value indicating that the timed metadata track is for the viewport-related information, wherein the initial viewport-related information is carried through a sample entry of the timed metadata track, and wherein the dynamic viewport-related information is carried through a sample of the timed metadata track.

7. The apparatus of claim 6,
wherein the point cloud data include geometry data, attribute data, and occupancy map data, which are encoded by a video based point cloud compression (V-PCC) scheme.

8. The apparatus of claim 6,
wherein the viewport-related information includes position information of a camera.

9. The apparatus of claim 8,
wherein the viewport-related information further includes direction information of the camera.

10. The apparatus of claim 8,
wherein the viewport-related information further includes horizontal field of view (FOV) information and vertical FOV information for generating a viewport.

11. A point cloud data reception apparatus, the apparatus comprising:
a receiver for receiving a file of an ISO base media file format (ISOBMFF);
a decapsulator for decapsulating the file into a bitstream that includes encoded point cloud data, wherein the bitstream is stored in at least one of multiple tracks of the file, wherein each track includes a sample entry and a sample, wherein the file further includes signaling information, and wherein the signaling information includes viewport-related information for the point cloud data;
a decoder for decoding the encoded point cloud data; and
a renderer for rendering the decoded point cloud data based on the viewport-related information,
wherein the viewport-related information includes at least initial viewport-related information or dynamic viewport-related information that changes over time,
wherein a track of the multiple tracks is a timed metadata track with a sample entry type of a value, the value indicating that the timed metadata track is for the viewport-related information including a sample entry and a sample,
wherein the initial viewport-related information is carried through a sample entry of the timed metadata track, and
wherein the dynamic viewport-related information is carried through a sample of the timed metadata track.

12. The apparatus of claim 11,
wherein the viewport-related information includes position information of a camera.

13. The apparatus of claim 12,
wherein the viewport-related information further includes direction information of the camera.

14. The apparatus of claim 12,
wherein the viewport-related information further includes horizontal field of view (FOV) information and vertical FOV information for generating a viewport.

15. The apparatus of claim 11,
wherein the decoded point cloud data include geometry data, attribute data, and occupancy map data, which are decoded by a video based point cloud compression (V-PCC) scheme.

16. A point cloud data reception method by an apparatus, the method comprising:
receiving a file of an ISO base media file format (ISOBMFF);
decapsulating the file into a bitstream that includes encoded point cloud data, wherein the bitstream is stored in at least one of multiple tracks of the file, wherein each track includes a sample entry and a sample, wherein the file further includes signaling information, and wherein the signaling information includes viewport-related information for the point cloud data;
decoding the encoded point cloud data; and
rendering the decoded point cloud data based on the viewport-related information,
wherein the viewport-related information includes at least initial viewport-related information or dynamic viewport-related information that changes over time,
wherein a track of the multiple tracks is a timed metadata track with a sample entry type of a value, the value indicating that the timed metadata track is for the viewport-related information,
wherein the initial viewport-related information is carried through a sample entry of the timed metadata track, and
wherein the dynamic viewport-related information is carried through a sample of the timed metadata track.

17. The method of claim 16,
wherein the viewport-related information includes position information of a camera.

18. The method of claim 17,
wherein the viewport-related information further includes direction information of the camera.

19. The method of claim 17,
wherein the viewport-related information further includes horizontal field of view (FOV) information and vertical FOV information for generating a viewport.

20. The method of claim 16,
wherein the decoded point cloud data include geometry data, attribute data, and occupancy map data, which are decoded by a video based point cloud compression (V-PCC) scheme.

* * * * *